(12) United States Patent
Toyoda et al.

(10) Patent No.: US 10,612,162 B2
(45) Date of Patent: Apr. 7, 2020

(54) NANOFIBER PRODUCTION APPARATUS, NANOFIBER PRODUCTION METHOD, AND NANOFIBER MOLDED BODY

(71) Applicant: KAO CORPORATION, Tokyo (JP)

(72) Inventors: Koji Toyoda, Utsunomiya (JP); Shinji Kodama, Chiba (JP); Takehiko Tojo, Utsunomiya (JP); Kenji Iwane, Utsunomiya (JP); Tomohiro Onda, Tokyo (JP)

(73) Assignee: KAO CORPORATION, Tokyo (JP)

( * ) Notice: Subject to any disclaimer, the term of this patent is extended or adjusted under 35 U.S.C. 154(b) by 622 days.

(21) Appl. No.: 14/910,356

(22) PCT Filed: Aug. 7, 2014

(86) PCT No.: PCT/JP2014/070820
§ 371 (c)(1),
(2) Date: Feb. 5, 2016

(87) PCT Pub. No.: WO2015/020129
PCT Pub. Date: Feb. 12, 2015

(65) Prior Publication Data
US 2016/0168755 A1 Jun. 16, 2016

(30) Foreign Application Priority Data

Aug. 8, 2013 (JP) .................................. 2013-165142
Jun. 9, 2014 (JP) .................................. 2014-118569

(51) Int. Cl.
*D01D 5/00* (2006.01)
*D04H 1/728* (2012.01)
*C08B 37/00* (2006.01)

(52) U.S. Cl.
CPC ....... *D01D 5/0069* (2013.01); *C08B 37/0018* (2013.01); *D01D 5/0076* (2013.01); *D01D 5/0092* (2013.01); *D04H 1/728* (2013.01)

(58) Field of Classification Search
CPC ... D01D 5/0092; D01D 5/0069; D01D 5/0076
See application file for complete search history.

(56) References Cited

U.S. PATENT DOCUMENTS 6,318,647 B1 * 11/2001 Gaw ..................... B05B 5/1691
239/690
7,390,760 B1 * 6/2008 Chen ..................... A61F 13/514
442/340

(Continued)

FOREIGN PATENT DOCUMENTS

CN          1849418 B       7/2012
CN        102597341 A       7/2012

(Continued)

OTHER PUBLICATIONS

Yu. V. Serdyuk, S. M. Gubanski, J. Blennow, M. Sjoberg, Electrical Discharge in an Air Gap with Dielectric-Covered Electrodes, 2000, 2000 Conference on Electrical Insulation and Dielectric Phenomena (Year: 2000).*

(Continued)

*Primary Examiner* — Alison L Hindenlang
*Assistant Examiner* — George W. Brady
(74) *Attorney, Agent, or Firm* — Birch, Stewart, Kolasch & Birch, LLP

(57) ABSTRACT

A nanofiber producing apparatus 10 includes a spinning solution jetting means 11 having a conductive nozzle 13 for jetting a stock spinning solution for nanofiber production, an electrode 14 located away from the nozzle 13, a voltage generating means 101 generating a voltage between the nozzle 13 and the electrode 14, an air jetting means 15 located at such a position as to direct an air jet between the (Continued)

nozzle 13 and the electrode 14, and a nanofiber collecting means. The voltage generating means 101 generates a voltage so that the nozzle 13 serves as a positive pole and the electrode 14 as a negative pole. The electrode 14 is covered, on almost the entire area of its side facing the nozzle 13, with a covering 17 having a dielectric exposed on the surface thereof. The dielectric exposed on the surface of the covering has a thickness of 0.8 mm or greater.

15 Claims, 22 Drawing Sheets

(56) References Cited

U.S. PATENT DOCUMENTS

| | | | |
|---|---|---|---|
| 8,157,554 B2 * | 4/2012 | Petras | D01D 5/18 425/174.8 E |
| 2002/0122840 A1 | 9/2002 | Lee et al. | |
| 2003/0211135 A1 * | 11/2003 | Greenhalgh | A61F 2/07 424/443 |
| 2004/0076661 A1 * | 4/2004 | Chu | A61K 9/0024 424/443 |
| 2005/0258360 A1 * | 11/2005 | Whitehouse | B01D 61/00 250/288 |
| 2006/0290031 A1 | 12/2006 | Jirsak et al. | |
| 2007/0031607 A1 * | 2/2007 | Dubson | B05D 1/007 427/458 |
| 2007/0298072 A1 * | 12/2007 | Kitazono | A61F 2/06 424/426 |
| 2008/0029617 A1 | 2/2008 | Marshall et al. | |
| 2008/0258351 A1 | 10/2008 | Shieh et al. | |
| 2010/0072674 A1 | 3/2010 | Takahashi et al. | |
| 2010/0173035 A1 | 7/2010 | Shieh et al. | |
| 2011/0135806 A1 | 6/2011 | Grewe et al. | |
| 2011/0250308 A1 | 10/2011 | Jun et al. | |
| 2012/0242010 A1 | 9/2012 | Ishikawa et al. | |
| 2013/0011508 A1 | 1/2013 | Kim | |
| 2013/0142852 A1 | 6/2013 | Tojo et al. | |
| 2014/0030370 A1 * | 1/2014 | Pokorn | D01D 5/0069 425/72.2 |
| 2015/0122651 A1 * | 5/2015 | Baret | B01L 3/0268 204/452 |
| 2015/0275399 A1 | 10/2015 | Kodama | |

FOREIGN PATENT DOCUMENTS

| | | |
|---|---|---|
| CN | 102652189 A | 8/2012 |
| CN | 102776582 A | 11/2012 |
| EP | 2617879 A1 | 7/2013 |
| JP | 2006-283240 A | 10/2006 |
| JP | 2008-223186 A | 9/2008 |
| JP | 2009-13535 A | 1/2009 |
| JP | 2009-531561 A | 9/2009 |
| JP | 2010-59557 A | 3/2010 |
| JP | 2010-180499 A | 8/2010 |
| JP | 2010-189782 A | 9/2010 |
| JP | 2011-102455 A | 5/2011 |
| JP | 2011-127234 A | 6/2011 |
| JP | 2011-127262 A | 6/2011 |
| JP | 2011-140740 A | 7/2011 |
| JP | 2012-12317 A | 1/2012 |
| JP | 2012-107364 A | 6/2012 |
| JP | 2014-111850 A | 6/2014 |
| KR | 10-2010-0078784 A | 7/2010 |
| WO | WO 02/092888 A1 | 11/2002 |
| WO | WO 2005/042813 A1 | 5/2005 |
| WO | WO-2008062784 A1 * | 5/2008 ........... D01D 5/0038 |
| WO | WO 2012/066929 A1 | 5/2012 |
| WO | WO 2014/057927 A1 | 4/2014 |

OTHER PUBLICATIONS

Tong et Al., "Negative Voltage Electrospinning and Positive Voltage Electrospinning of Tissue Engineering Scaffolds: A Comparative Study and Charge Retention on Scaffolds", Apr. 2012, Nano LIFE vol. 2 No. 1 (Year: 2012).*
International Search Report, issued in PCT/JP2014/070820, dated Nov. 11, 2014.
International Search Report (Form PCT/ISA/210), dated Jan. 14, 2014, for International Application No. PCT/JP2013/077314.
Written Opinion of the International Searching Authority and English translation thereof (Form PCT/ISA/237), dated Jan. 14, 2014, for International Application No. PCT/JP2013/077314.
Extended European Search Report, dated Dec. 6, 2016, for European Application No. 14834044.1.
Extended European Search Report, dated May 13, 2016, for European Application No. 13844962.4.
Kim, "Electrospinning process using field-controllable electrodes," Journal of Polymer Science: Part B: Polymer Physics, vol. 44, No. 10, Apr. 7, 2006, pp. 1426-1433.
An English translation of the Written Opinion of the International Searching Authority issued in the International Application No. PCT/JP2014/070820 dated Nov. 11, 2014.

* cited by examiner

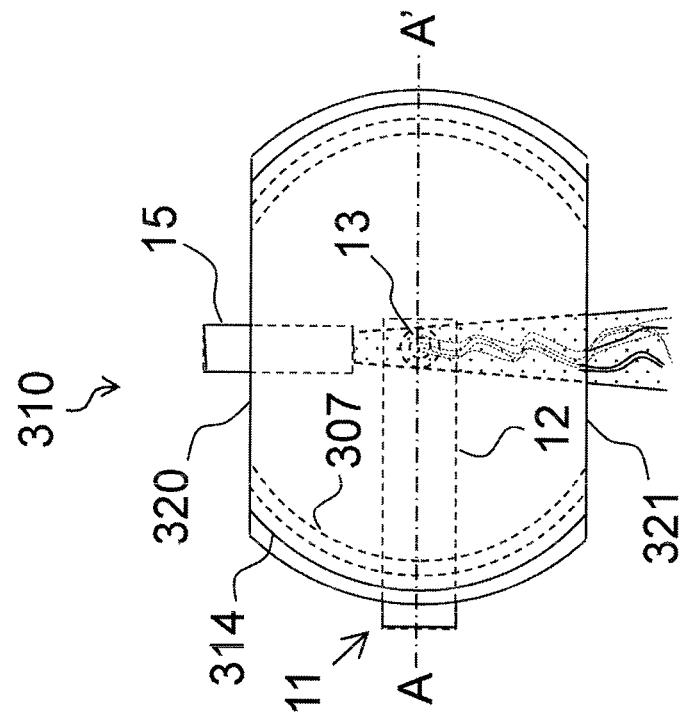
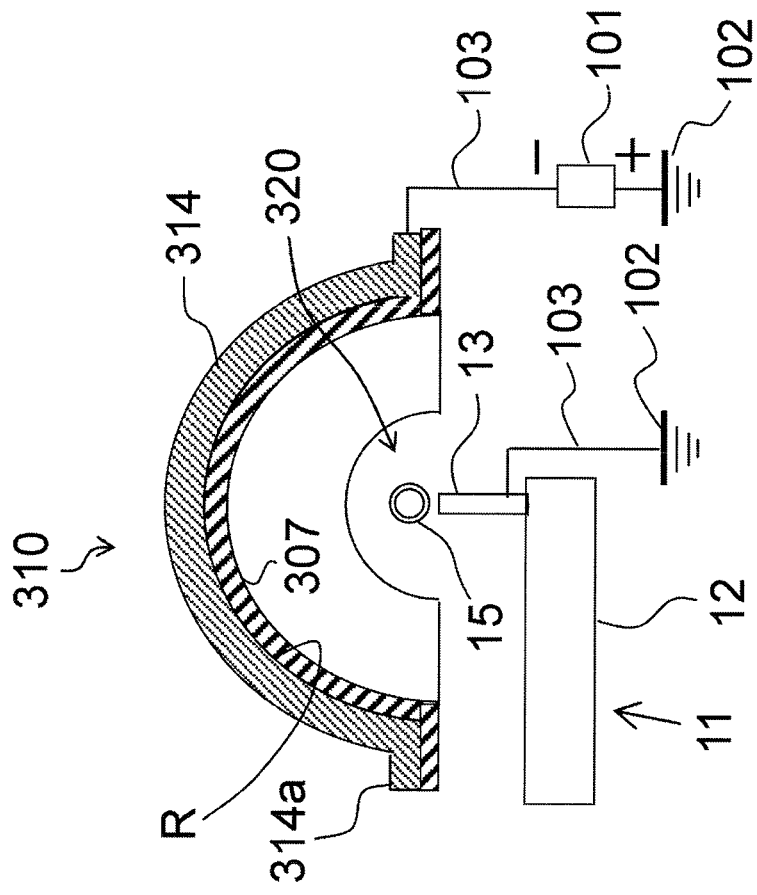
Fig. 5(a)
Fig. 5(b)

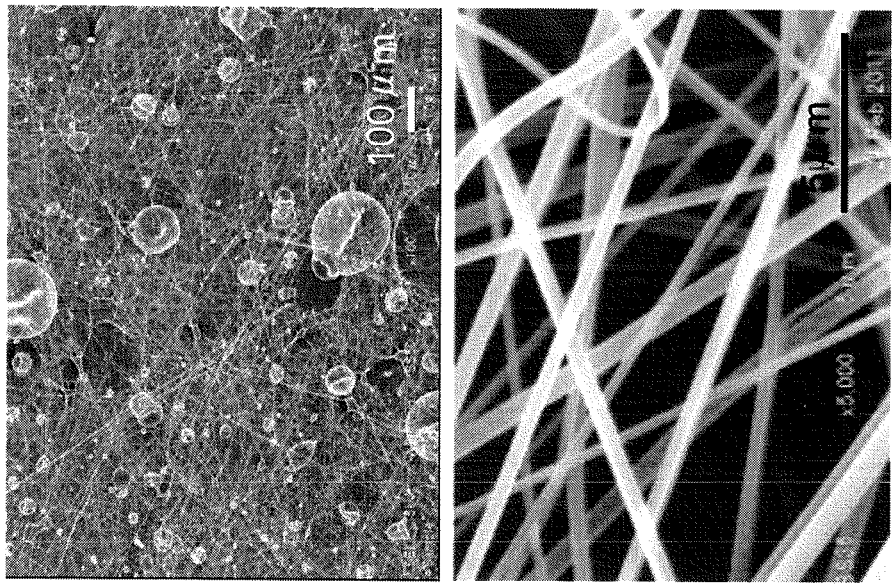
Fig. 21(b) Comparative Example 8
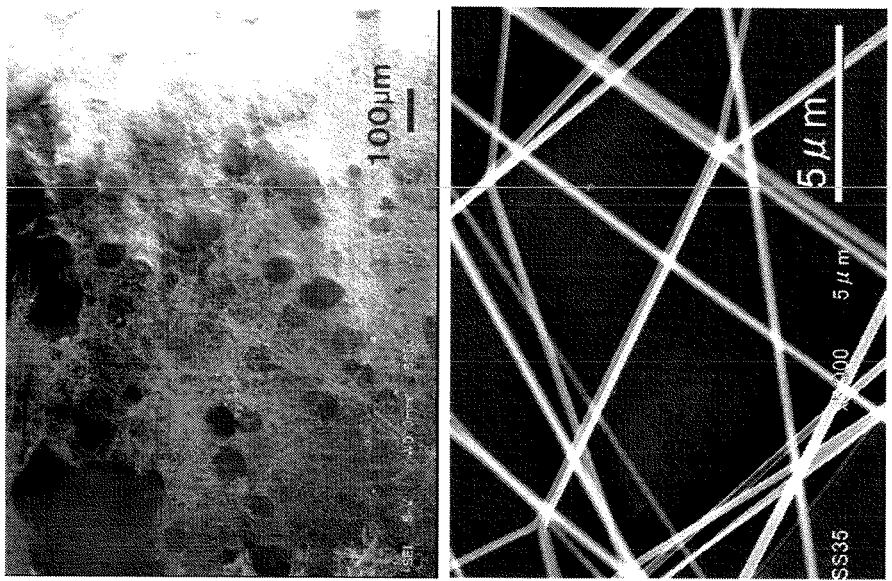
Fig. 21(a) Example 9

Fig. 22
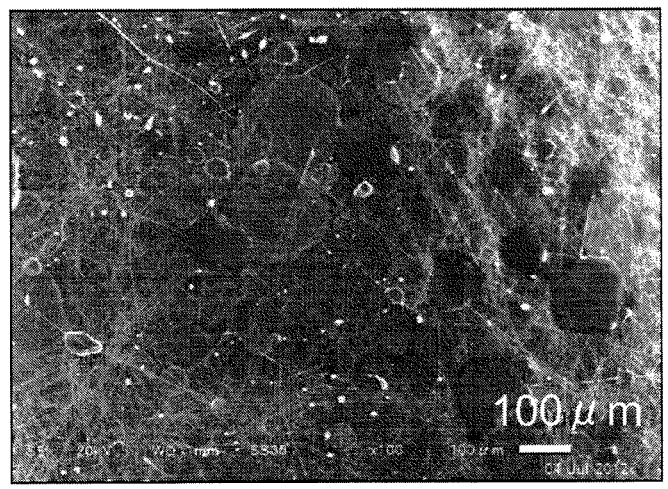
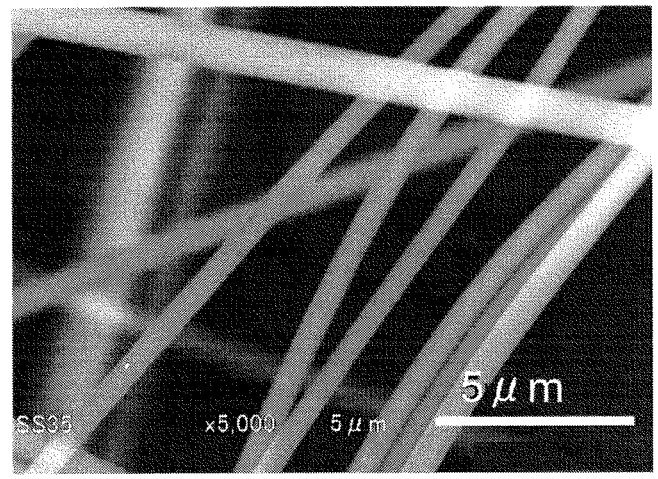

NANOFIBER PRODUCTION APPARATUS, NANOFIBER PRODUCTION METHOD, AND NANOFIBER MOLDED BODY

TECHNICAL FIELD

The present invention relates to an apparatus and a method for producing nanofiber and a nanofiber structure.

BACKGROUND ART

An electrospinning process is attracting attention as a technique that allows for relatively easy production of nano-diameter fiber (i.e., nanofiber) without using a mechanical or thermal force. A conventional Electrospinning process includes loading a solution of a nanofiber material into a syringe having a needle at its tip and jetting the solution from the needle toward a facing collecting electrode while applying a high direct voltage between the needle and the collecting electrode. The solvent of the jetted solution evaporates instantaneously, and the material is drawn by the coulomb force while coagulating into a nanofiber, which deposits on the collecting electrode.

The above described conventional electrospinning process is capable of producing only one or a few nanofibers from one needle. A technology for quantity production of nanofibers has not yet been established, and practical application of the electrospinning process has made only slow progress.

With the object of increasing the productivity in nanofiber manufacturing, Patent Literature 1 below discloses a method for producing nanofiber including providing a plurality of electrospinning devices arranged in parallel with one another and a nanofiber collector. The devices each include: a small-diametered metallic ball; a metallic spinning nozzle which is placed in such a manner that a distance between the metallic ball and the opening of the spinning nozzle is reduced; and a high speed air jet nozzle which is configured to direct a high speed air jet perpendicular to the line connecting the metallic ball and the opening of the spinning nozzle. A high voltage is applied between the metallic ball and the spinning nozzle to make a nanofiber, and the nanofibers spun from the nozzles are gathered and collected on the collector.

Patent Literature 2 below discloses an apparatus for nanofiber production including: a jet spinning nozzle grounded through selected one of two rectifiers; a dielectric composed of an electrode having, thereon, a dielectric insulating covering and a conducting covering; and an alternating-current source for applying AC current to the dielectric. The polarity of the charge of the spinning nozzle as grounded is reversed alternately so that nanofibers of opposite polarities are produced alternately, thereby to prevent the atmosphere from being charged to a single polarity. This allows for simplifying the system for insulation and safety of the production apparatus, and nearby members are prevented from being charged, making nanofiber collection easier.

Patent Literature 3 below discloses an apparatus for nanofiber production having, in place of a spinning nozzle, a conductive cylinder having a diameter of 10 mm to 300 mm and a large number of orifices through its wall. A voltage is applied between the cylinder and an electrode having an insulating covering on its side facing the cylinder to form nanofibers, which are attracted by two collector electrodes (attracting electrodes) having opposite polarities and deposited on a collector. The insulating covering, being as thin as 0.2 mm, protects the electrode from adhesion of the nanofibers and changes the charged state of the nanofibers, and the nanofibers are collected efficiently by using two collector electrodes (attracting electrodes).

Patent Literature 4 proposes using a resin-made jet spinning nozzle instead of a metallic nozzle. By the use of a resin-made nozzle, the solidification of the spinning solution at the nozzle is made controllable, which makes the nozzle cleaning operation easier and prevents a discharge from the nozzle. According to this technique, the spinning solution is charged by placing an electrode of whatever shape in the container containing the stock spinning solution or in the path between the container and the nozzle.

CITATION LIST

Patent Literature

Patent Literature 1: JP 2012-107364A
Patent Literature 2: JP 2009-13535A
Patent Literature 3: JP 2010-59557A
Patent Literature 4: JP 2011-102455A

SUMMARY OF INVENTION

Technical Problem

Nanofiber productivity primarily depends on the output of the spinning solution from one nozzle per unit time. A large quantity of a spinning solution may be fed to a nozzle per unit time, provided that spinning continues normally and stably. This could be achieved, in the case of a nanofiber production apparatus using electrospinning process, by increasing the amount of charges of the spinning solution. However, the above described conventional techniques cannot be said to be sufficient in terms of increasing the amount of chargers of the spinning solution. It has been hard to obtain nanofiber with satisfactory productivity.

Furthermore, some of the above described various electrospinning techniques still have insufficient mass-productivity, or some of them are not economically advantageous because of the need of complicated equipment or a large equipment space.

The invention relates to an apparatus for producing a nanofiber that eliminates the disadvantages of the conventional techniques.

Solution to Problem

The present invention provides an apparatus for producing a nanofiber including:
  a spinning solution jetting means having a conductive nozzle for jetting a stock spinning solution for nanofiber production,
  an electrode located away from the nozzle,
  a voltage generating means generating a voltage between the nozzle and the electrode,
  an air jetting means located at such a position as to direct an air jet between the nozzle and the electrode, and
  a nanofiber collecting means,
  the voltage generating means generating a voltage in such a manner that the nozzle serves as a positive pole and the electrode as a negative pole,
  the electrode being covered, on almost the entire area of the side, facing the nozzle, of the electrode with a covering having a dielectric exposed on the surface of the covering, and the dielectric exposed on the surface of the covering having a thickness of 0.8 mm or greater.

The invention also provides an apparatus for producing a nanofiber including:
- a spinning solution jetting means having a conductive nozzle for jetting a stock spinning solution for nanofiber production,
- an electrode located away from the nozzle,
- a voltage generating means generating a voltage between the nozzle and the electrode,
- an air jetting means located at such a position as to direct an air jet between the nozzle and the electrode, and
- a nanofiber collecting means,
- the voltage generating means generating a voltage in such a manner that the nozzle serves as a positive pole and the electrode as a negative pole,
- the nozzle being covered, on almost the entire area of the outer side of the nozzle, with a covering having a dielectric exposed on the surface of the covering, and the covering extending beyond the tip of the nozzle.

The invention also provides an apparatus for producing a nanofiber including:
- a spinning solution jetting means having a conductive nozzle for jetting a stock spinning solution for nanofiber production,
- an electrode located away from the nozzle,
- a voltage generating means generating a voltage between the nozzle and the electrode,
- an air jetting means located at such a position as to direct an air jet between the nozzle and the electrode, and
- a nanofiber collecting means,
- the voltage generating means generating a voltage in such a manner that the nozzle serves as a negative pole and the electrode as a positive pole, and
- the nozzle being covered, on almost the entire area of the outer side of the nozzle, with a covering having a dielectric exposed on the surface of the covering.

The invention also provides an apparatus for producing a nanofiber including:
- a spinning solution jetting means having a conductive nozzle for jetting a stock spinning solution for nanofiber production,
- an electrode located away from the nozzle,
- a voltage generating means generating a voltage between the nozzle and the electrode,
- an air jetting means located at such a position as to direct an air jet between the nozzle and the electrode, and
- a nanofiber collecting means,
- the voltage generating means generating a voltage in such a manner that the nozzle serves as a negative pole and the electrode as a positive pole,
- the electrode being covered, on almost the entire area of the side, facing the nozzle, of the electrode with a covering having a dielectric exposed on the surface of the covering, and
- the dielectric exposed on the surface of the covering having a thickness of 0.8 mm or greater.

The invention also provides An apparatus for producing a nanofiber comprising:
- a spinning solution jetting means having a conductive nozzle for jetting a stock spinning solution for nanofiber production,
- an electrode located away from the nozzle,
- a voltage generating means generating a voltage between the nozzle and the electrode,
- an air jetting means located at such a position as to direct an air jet between the nozzle and the electrode, and
- a nanofiber collecting means,
- the collecting means having a collecting electrode, the collecting electrode being covered, on almost the entire area of the collecting electrode, with a covering having a dielectric exposed on the surface of the covering.

The invention also provides a method for producing a nanofiber including using the apparatus of the invention.

The invention also provides a nanofiber structure including the nanofiber produced by using the apparatus of the invention.

According to the invention, the amount of charge of a spinning solution used to make nanofibers is increased over conventionally achieved levels. As a consequence, an electrospinning device and a nanofiber production apparatus having the electrospinning device are provided, which achieve increased nanofiber productivity over conventional techniques and space saving.

BRIEF DESCRIPTION OF DRAWINGS

FIG. 5(a) is a cross-sectional side view of still another embodiment of the nanofiber production apparatus of the invention, and FIG. 5(b) is a top view of the apparatus of FIG. 5(a).

FIG. 21(a) is a scanning electron micrograph of the nanofibers obtained using an embodiment of the nanofiber production apparatus of the invention, and FIG. 21(b) is a scanning electron micrograph of the nanofibers obtained using a nanofiber production apparatus out of the scope of the invention.

FIG. 22 is a scanning electron micrograph of the nanofibers obtained using another embodiment of the nanofiber production apparatus of the invention.

DESCRIPTION OF EMBODIMENTS

Figure 1B:
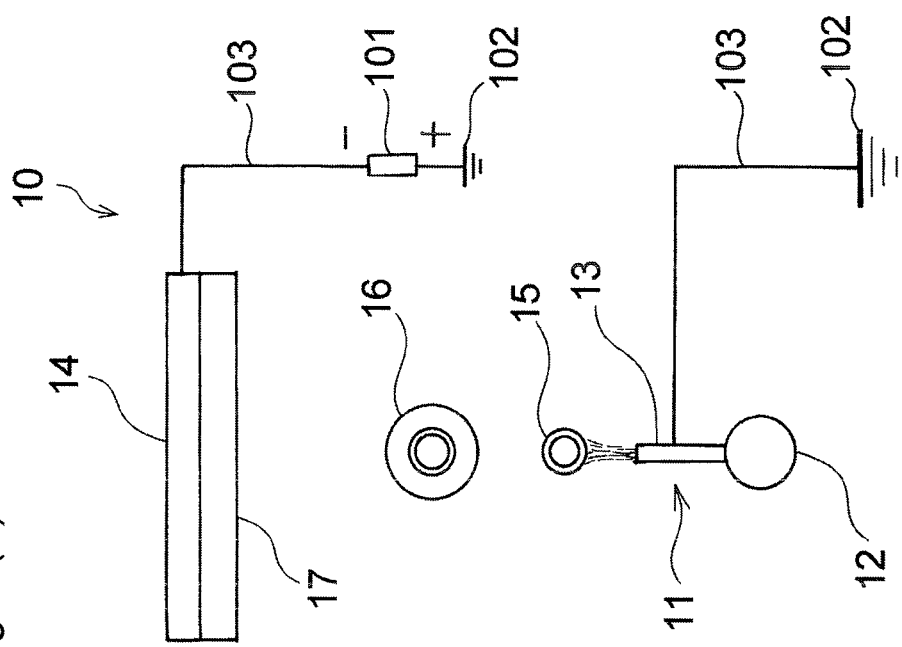
FIG. 1(b) is a front view of the apparatus of FIG. 1(a).
Figure 1A:
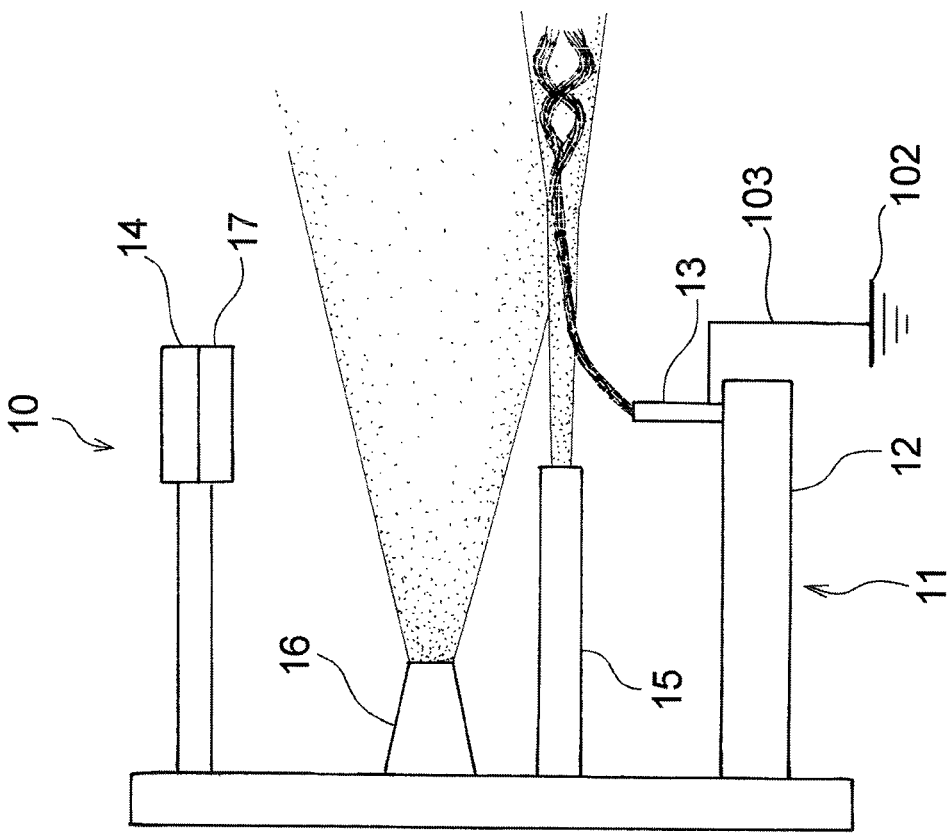
FIG. 1(a) is a side view of an embodiment of the nanofiber production apparatus of the invention.

The invention will be described based on its preferred embodiments with reference to the accompanying drawings. FIG. 1(a) is a side view of an embodiment of the nanofiber production apparatus according to the invention. FIG. 1(b) is a front view of the apparatus of FIG. 1(a). As shown in FIGS. 1(a) and 1(b), the nanofiber production apparatus 10 of the embodiment is based on a jet-ESD (electrospray deposition) process using a combination of electrospray deposition and high-speed air jet. The apparatus 10 has a spinning solution jetting means 11 for jetting a stock solution for producing nanofiber. The spinning solution jetting means 11 includes a solution feeding part 12 and a nozzle 13. The nozzle 13 is connected upright to the front end of the solution feeding part 12. The nozzle 13 is open at the upper end thereof, through which a spinning solution is to be jetted. The nozzle 13 is made of a conductive material, such as metal, and is therefore conductive. The solution feeding part 12 is designed to jet the spinning solution from the nozzle 13 at a predetermined rate per unit time.

The nozzle 13 is a needle-like straight tube through which a spinning solution is allowed to flow. The inner diameter of the nozzle 13 is preferably 200 μm or more, more preferably 300 μm or more, and preferably 3000 μm or less, more preferably 2000 μm or less. For example, the inner diameter of the nozzle 13 preferably ranges from 200 μm to 3000 μm, more preferably from 300 μm to 2000 μm. The outer diameter of the nozzle 13 is preferably 300 μm or more, more preferably 400 μm or more, and preferably 4000 μm or less, more preferably 3000 μm or less. The outer diameter of the nozzle 13 preferably ranges from 300 μm to 4000 μm, more preferably from 400 μm to 3000 μm, for example. When the nozzle's inner and outer diameters are in the above respective ranges, a spinning solution containing a polymer and having a high viscosity is delivered smoothly at a constant rate, and an electric field concentrates within a small space around the nozzle to charge the spinning solution efficiently.

An electrode 14 is set away from the nozzle 13. In detail, the electrode 14 is located right above the opening of the nozzle 13 to face the opening. The electrode 14 is plate-like, having two flat surfaces and four edge surfaces. One of the two flat surfaces (the lower side in FIG. 1) faces the nozzle 13. The direction in which the nozzle 13 extends and the flat surfaces of the electrode 14 are substantially perpendicular to each other. The electrode 14 is made, e.g., of metal and has conductivity. The distance (shortest distance) between the tip of the nozzle 13 and the electrode 14 is preferably 20 mm or greater, more preferably 30 mm or greater. If the distance is smaller than that, the spinning solution jetted from the tip of the nozzle 13 into the form of fiber tends to adhere to the electrode 14. The upper limit of the distance between the tip of the nozzle 13 and the electrode 14 is preferably 100 mm, more preferably 50 mm. If the distance exceeds the upper limit, the electric field generated between the nozzle 13 and the electrode 14 will be too weak to give a sufficient charge quantity to the spinning solution. The distance between them is preferably 20 mm to 100 mm, more preferably 30 mm to 50 mm, for example.

A voltage generating means 101 is provided to apply a direct current between the nozzle 13 and the electrode 14 each made of a conductive material through a ground 102 and a metallic lead wire 103. The nozzle 13 is grounded as shown in FIG. 1. A negative voltage is applied to the electrode 14. Accordingly, the electrode 14 serves as a negative pole, and the nozzle 13 serves as a positive pole, whereby a voltage is generated between the electrode 14 and the nozzle 13 to form an electric field. Instead of the voltage application shown in FIG. 1, a positive voltage may be applied to the nozzle 13, and the electrode 14 is grounded. Nevertheless, grounding the nozzle 13 is preferable to applying a positive voltage to the nozzle 13 in terms of simpler and easier insulation. The voltage generated by the voltage generating means 101 may be a changing voltage composed of AC voltage superimposed on DC voltage as long as the electrode 14 serves as a negative electrode and the nozzle 13 as a positive electrode, i.e., as long as the nozzle 13 maintains a higher potential than the electrode 14. The voltage to be applied is preferably DC, though, with the view to maintaining the charge quantity of the spinning solution constant and producing nanofibers of uniform thickness.

The voltage generating means 101 may be a known device, such as a high voltage power supply. In order to sufficiently charge the spinning solution, the potential difference between the electrode 14 and the nozzle 13 is preferably 1 kV or greater, more preferably 10 kV or more. In order to prevent a discharge between the nozzle 13 and the electrode 14, the potential difference is preferably 100 kv or less, more preferably 50 kV or less. For example, the potential difference is preferably 1 kV to 100 kV, more preferably 10 kV to 50 kV. When the voltage applied by the voltage generating means 101 is a changing voltage, it is preferred that the time-averaged potential difference between the electrode 14 and the nozzle 13 be within the above range.

The production apparatus 10 includes an air jetting means 15. The air jetting means 15 is configured to jet a primary high-speed air jet. The air jetting means 15 is placed at such a position as to direct an air jet between the nozzle 13 and the electrode 14. The nanofiber formed of the spinning solution has positive charges and is destined to travel from the nozzle 13 serving as a positive pole toward the electrode 14 serving as a negative pole. The air jet from the air jetting means 15 changes the travelling direction of the nanofiber and carries the fiber to the collecting means (to the right in FIG. 1(a)) while contributing to drawing (stretching) the nanofiber.

The air jet spouted from the air jetting means 15 may have been dried to a humidity of 30% RH or less using, e.g., a dryer. The air jet is preferably kept at a constant temperature so as to maintain the condition of the produced nanofiber uniform. The flow rate of the air jet is preferably 200 m/sec or more, more preferably 250 m/sec or more, for example. At lower flow rates, it is difficult to divert the advancing direction of the nanofiber toward the collecting means against the electric field between the nozzle 13 and the electrode 14. The upper limit of the flow rate is preferably 600 m/sec, more preferably 530 m/sec, for example. To create a higher air flow rate than that increases the load on the equipment. In addition, such a high flow rate can break off the nanofiber. The flow rate is preferably 200 m/sec to 600 m/sec, more preferably 250 m/sec to 530 m/sec.

The production apparatus 10 further includes a second air jetting means 16 in addition to the air jetting means 15. The second air jetting means 16 jets a secondary high-speed air jet at a lower flow rate than that of the primary high-speed air jet from the air jetting means 15 in such a manner that the secondary high-speed air jet may spread wide to entrain the primary high-speed air jet. Because the secondary high-speed air jet is spouted in a large quantity to entrain the primary high-speed air jet, turbulence of the primary high-speed air jet is prevented, thereby enabling stable nanofiber production.

The apparatus 10 of the embodiment has a nanofiber collecting means located to face the air jetting means 15 and the second air jetting means 16. In particular, a collecting electrode (not shown) may be provided as part of the collecting means. The collecting electrode can be a plate-like electrode made of a conductive material such as metal. The collecting electrode is set in such a manner that its major surface is substantially perpendicular to the air jetting direction. As will be described, the collecting electrode may be covered, on almost the entire area thereof, preferably on the entire area thereof, with a covering having a dielectric exposed on the surface thereof. As used herein, the phrase "almost the entire area" is intended to mean at least 90% of the entire area, and the phrase "the entire area" means 100% of the entire area. In order to attract positively charged nanofibers toward the collecting electrode, the collecting electrode is given a lower (more negative) potential than the nozzle 13 as a positive pole. To increase the efficiency of attraction, the collecting electrode is preferably given a lower (more negative) potential than the electrode 14 as a negative pole. The distance (shortest distance) between the collecting electrode (the surface of the collecting electrode) and the tip of the nozzle 13 is preferably 100 mm or greater, more preferably 500 mm or greater. The nanofiber is allowed to solidify sufficiently while travelling that distance until it reaches the collecting electrode. The upper limit of the distance is preferably 3000 mm, more preferably 1000 mm. Within that upper limit, the electrical attractive force by from the collecting electrode is strong enough to obtain improved nanofiber collection efficiency. For example, the distance is preferably 100 mm to 3000 mm, more preferably 500 mm to 1000 mm.

The apparatus 10 of the embodiment may include a collector (not shown) for collecting the nanofiber, which is disposed between the collecting electrode and the nozzle 13 and adjacent to the collecting electrode. The collector may be made of an insulating substance, such as film, mesh, nonwoven fabric, or paper.

The apparatus 10 of the embodiment may further include an air venting means (not shown) for venting the jetted air, which is disposed to face the air jetting means 15 and the second air jetting means 16. The air venting means is preferably disposed in the rear of the collecting electrode, i.e., father from the nozzle 13 than the collecting electrode. A known unit, such as a suction box, may be used as the air venting means.

The apparatus 10 of the embodiment has the above described basic structure. Of the two flat surfaces of the plate-like electrode 14, the surface facing the nozzle 13 (the lower side of the electrode 14 in FIG. 1) is covered with a covering 17 having a dielectric exposed on its surface. In the embodiment shown in FIG. 1, the covering 17 is made of a single kind of a dielectric.

According to the invention, almost the entire area of the side of the electrode that faces the nozzle is covered with a covering on which a dielectric is exposed. More preferably, the entire area of the side of the electrode that faces the nozzle is covered with a covering on which a dielectric is exposed. The term "the side facing (that faces) the nozzle" means the surface of the electrode that can be viewed from the tip of the nozzle (the orifice through which a spinning solution is jetted). More specifically, "the side facing the nozzle" is a series of points at which straight lines drawn from every point on the tip of the nozzle toward the electrode first contact the electrode. As used herein, the phrase "almost the entire area" is intended to mean at least 90% of the entire area, and the phrase "the entire area" means 100% of the entire area. The phrase "a covering having a dielectric exposed on the surface" or "a covering on which a dielectric is exposed" means a covering having almost the entire area thereof (at least 90% of the entire surface thereof) made solely of a dielectric. As will be described later, it is preferred that the entire area (100% area) of the surface of the covering be made solely of a dielectric. In other words, it is preferred for the covering to have a dielectric exposed thereon and contain no conductive substance such as metal on its surface. Such a covering is typically exemplified by a covering made of a single kind of a dielectric. The covering may be a composite composed of a plurality of dielectric sheets stacked one on top of another. The covering may be a composite that contains metallic particles or an air layer in the inside thereof (i.e., the portion that is not exposed on the surface) as long as the surface is made solely of a dielectric. For example, an air layer may be present in part of the joint between the electrode and the covering. Nevertheless, it is preferred that the electrode and the covering be in intimate contact with each other to secure the joint therebetween. In the invention, it is assumed that there is no substance further covering the surface of the covering. Should any conductive covering, e.g., of metal exist to cover the surface of the covering, the effects of the invention are lessened.

While the electrode 14 shown in FIG. 1 has the covering 17 on only the side facing the nozzle 13, it is preferred that part of the other sides that do not face the nozzle 13 be also covered with the covering 17 having the dielectric exposed thereon. It is more preferred that all the sides that do not face the nozzle 13 be covered with the covering 17 having the dielectric exposed thereon. The "sides that do not face the nozzle" are the sides one cannot view from the tip of the nozzle (the opening through which a spinning solution is jetted), more specifically all the sides other than the side that faces the nozzle.

The inventors have found that the amount of charge of the spinning solution jetted from the nozzle 13 markedly increases when the surface of the electrode 14 that faces the nozzle 13 is covered with a covering as described above. The mechanism is considered as follows. In the electrospinning device 10 of the embodiment, cations in the spinning solution are attracted toward the electrode 14 (negative pole), and the anions to the inner wall of the nozzle 13 (positive pole), by the electric field formed between the electrode 14 and the nozzle 13. Consequently, the spinning solution jetted toward the electrode 14 contains many cations, and the spinning solution is charged positively. At the same time, with the voltage applied between the electrode 14 and the nozzle 13, electrons are emitted from the electrode 14 (negative pole) into the atmosphere and fly to the nozzle 13 (positive pole). The flying (negatively charged) electrons strike against the jetted (positively charged) spinning solution to neutralize the charge of the spinning solution, resulting in reduction of charge quantity of the spinning solution. When the surface of the electrode 14 as a negative pole is covered with the covering 17 having a dielectric exposed on its surface, the emission of electrons from the electrode 14 reduces. As a result, the neutralization of the spinning solution, i.e., the reduction in charge quantity, by the flying electrons can be reduced, whereby the charge quantity increases. In addition, since the number of the electrons flying from the electrode 14 to the nozzle 13 decreases, a discharge between the electrode 14 and the nozzle 13 is prevented. This permits raising the voltage to be applied between the electrode 14 and the nozzle 13 or decreasing the distance therebetween. Consequently, the intensity of the electric field between the electrode 14 and the nozzle 13 can be increased thereby to increase the amount of charge of the spinning solution. Furthermore, the electrode 14 (negative pole) and the nozzle 13 (positive pole) having air therebetween may be regarded as a capacitor. Because the electrical capacity of the capacitor is increased by inserting a dielectric between the two poles, there is expected to be the effect of increasing the amount of charge of the spinning solution. With the decrease of the electrons flying from the electrode 14 to the nozzle 13, the current (leakage current) flowing between the electrode 14 and the nozzle 13 decreases, whereby the power required for the nanofiber production is expected to reduce.

To ensure these effects, it is preferred to cover almost the entire area (at least 90% of the area) of the side of the electrode 14 facing the nozzle 13, particularly the entire area (100% of the area) of that side, with the covering 17. If a large proportion of the surface is uncovered with the covering 17, electrons will be emitted into the atmosphere from the uncovered area, and the flying electrons will reduce the amount of charge of the spinning solution. The above effects are further enhanced when not only the side facing the nozzle 13 but the other non-facing sides are covered with the covering 17 because more than a few electrons are emitted into the atmosphere from those surfaces that do not face the nozzle 13. With the view to increasing the amount of charge of the spinning solution, it is preferred that all the sides of the electrode 14 be covered with the covering 17.

According to Patent Literature 2 cited above disclosing a nanofiber production apparatus, the spinning electrode has an insulating layer made of a dielectric on its surface facing the spinning solution jetting means with the intension of lowering the possibility of electrical shock from contact with the electrode. However, the electrode disclosed used Patent Literature 2 additionally has a conductive layer on the surface of the insulating layer. In other words, the covering used in Patent Literature 2 has a conductive layer exposed on its surface. Since electrons are apt to be emitted from such a conductive layer into the atmosphere, it is believed that the effect of the covering having a dielectric exposed thereon according to the invention, i.e., the inhibitory effect on electron emission cannot be expected. From that viewpoint, it is preferred that the covering of the invention be made solely of a dielectric over the entire surface thereof (100% area), i.e., have a dielectric exposed on its surface and not contain any conductive substance such as metal on its surface.

Examples of the dielectric that can be used in the covering include ceramic materials, such as mica, alumina, zirconia, and barium titanate, and resinous materials, such as Bakelite (phenolic resins), nylons (polyamides), vinyl chloride resins, polystyrene, polyester, polypropylene, polytetrafluoroethylene, and polyphenylene sulfide. It is preferred to use at least one insulating material selected from alumina, Bakelite, nylons, and vinyl chloride resins. Nylons are particularly preferred. Examples of suitable nylons are polyamides such as nylon 6 and nylon 66. Commercially available nylons may be used, such as MONOMER CAST Nylon (registered trade name). The dielectric used in the covering 17 may contain an antistatic so as to reduce charging of the covering 17 even if a charged spinning solution, charged nanofiber, or the like adheres to the covering 17. Commercially available antistatics may be utilized, including Pelectron available from Sanyo Chemical Industries, Ltd., Electrostripper available from Kao Corp., Elestmaster from Kao Corp., Rikemal available from Riken Vitamin Co., Ltd.; and Rikemaster available from Riken Vitamin Co., Ltd.

The covering 17 on the electrode 14 preferably has a uniform thickness. The dielectric exposed on the surface of the covering 17 preferably has a thickness of 0.8 mm or larger, more preferably 2 mm or larger, even more preferably 8 mm or larger. With that thickness, electron emission from the electrode 14 is prevented or reduced sufficiently to increase the amount of charge of the spinning solution. With a thickness smaller than that, the covering 17 can fail to sufficiently reduce the electron emission from the electrode 14, tending to result in a failure to increase the amount of charge of the spinning solution. In the case where the covering 17 is made of a single kind of a dielectric or a plurality of kinds of dielectrics, the thickness of the dielectric exposed on the surface of the covering 17 corresponds to (is equal to) the thickness of the covering 17. In the case where the covering 17 is a composite containing metallic particles, an air layer, or the like in its inside (in the portion unexposed on the surface), the thickness is defined to the depth from the surface up to the metal or air. The upper limit of the thickness of the covering 17 is preferably 25 mm, more preferably 20 mm, even more preferably 15 mm. Within the upper limit, the spinning solution jetted from the tip of the nozzle into the form of fiber is prevented from being attracted and adhering to the dielectric. To reduce adhesion of the spinning solution to the electrode allows increasing the voltage to be applied, thereby increasing the amount of charge of the spinning solution. If the thickness exceeds the upper limit, the spinning solution jetted from the tip of the nozzle 13 into the form of fiber is liable to adhere to the covering 17. When the covering 17 is made of a single kind or two or more kinds of dielectrics, the thickness of the covering 17 is preferably, for example, 0.8 mm to 25 mm, more preferably 2 mm to 20 mm, even more preferably 8 mm to 15 mm.

The nanofiber production apparatus disclosed in Patent Literature 3 cited above includes an electrode having a thin insulating layer on the surface thereof. This apparatus essentially differs from the apparatus of the present invention in that a conductive cylinder having a diameter of 10 mm to 300 mm and a large number of orifices through its wall is used instead of a spinning solution jetting nozzle. Be that as it may, the electrode has a thin insulating layer on its side facing the cylinder. The purpose of providing the insulating layer is to prevent adhesion of nanofiber to the electrode and to change the charged state of the nanofiber. To accomplish the purpose, the insulating layer is as thin as 0.2 mm. It is considered that such a thin insulating layer is incapable of sufficiently reducing the electron emission from the electrode, so that the effects of the present invention cannot be expected.

Figure 2:
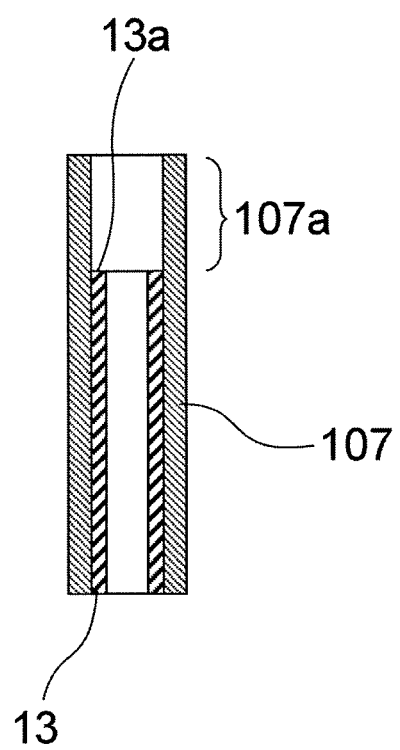
FIG. 2 is a cross-sectional view of a nozzle usable in the apparatus of FIG. 1.

According to the apparatus of the embodiment, the amount of charge of the spinning solution may also be increased by covering almost the entire area of the outer side of the nozzle 13 with a covering having a dielectric exposed on the surface thereof instead of, or in addition to, disposing the covering 17 on almost the entire area of the side of the electrode 14 that faces the nozzle 13. In detail, as shown in FIG. 2, the nozzle 13 is covered with a covering 107 on its entire outer surface. The covering 107 has an extension 107a that extends from the tip 13a of the nozzle 13. The extension 107a is a hollow cylinder surrounding the nozzle 13, and the hollow of the extension 107a connects to the hollow of the nozzle 13. As used herein, the term "outer side" of the nozzle 13 denotes the side other than (i) the inner wall side with which the spinning solution is to come into contact, (ii) the front end side of the tip 13a from which the spinning solution is to be jetted, and (iii) the rear end side of the nozzle 13 opposite to the front end side. The covering 107 is made of a single kind or a plurality of kinds of dielectrics.

The number of electrons flying from the electrode 14 and entering the nozzle 13 is reduced by covering almost the entire area of the outer side of the nozzle 13 with the covering 107 having a dielectric exposed thereon. Consequently, a discharge between the electrode 14 an the nozzle 13 is less likely to occur, which allows increasing the voltage to be applied between the electrode 14 and the nozzle 13 or decreasing the distance between them, thereby to intensify the electric field between the electrode 14 and the nozzle 13 to increase the amount of charge of the spinning solution. To ensure the above effect, it is preferred to cover almost the entire area (at least 90% of the entire area) of the outer side of the nozzle 13 with the covering 107, and it is preferred to cover the entire area (100% of the entire area) of the outer side of the nozzle 13 with the covering 107. When the covering 107 is provided to extend beyond the tip 13a of the nozzle 13, flying electrons are prevented from reaching the tip 13a of the nozzle 13, and, as a result, the amount of charge of the spinning solution is further increased.

The length of the extension 107a of the covering 107 is preferably 1 mm or more, more preferably 10 mm or more. With an extension length smaller than that, the effect of the extension is smaller. The upper limit of the length is preferably 15 mm, more preferably 12 mm. With an extension length greater than that, the spinning solution jetted from the tip of the covering 107 into the form of fiber is liable to adhere to the electrode 14 or the covering 17. For example, the length of the extension 107a is preferably 1 mm to 15 mm, more preferably 10 mm to 12 mm. A discharge between the electrode 14 and the nozzle 13 is reduced or eliminated to effectively increase the amount of charge of the spinning solution by providing the extension 107a of that length.

The dielectric that can be used to form the covering 107 covering the nozzle 14 may be chosen from those described above with respect to the covering 17 covering the electrode 14. The dielectric used to make the covering 107 may contain an antistatic similarly to the dielectric used to make the covering 17. The preference about the thickness of the covering 17 on the electrode 14 also applies to that of the covering 107 on the nozzle 13.

According to the apparatus of the embodiment, the amount of charge of the spinning solution may also be increased by covering almost the entire area of the collecting electrode constituting part of the collecting means with a covering having a dielectric exposed on the surface thereof. As previously stated, the collecting electrode (not shown) is given a lower (more negative) potential than the nozzle 13 (positive pole) so as to attract positively charged nanofibers. Therefore, electrons are also emitted from the surface of the collecting electrode into the atmosphere and fly to the nozzle 13. The electron emission from the collecting electrode is reduced by covering almost the entire area of the collecting electrode with a covering having a dielectric exposed thereon. As a result, neutralization of the spinning solution with the incoming electrons, i.e., reduction in amount of charge of the spinning solution is reduced, thereby increasing the amount of charge of the spinning solution. To ensure the effect, it is preferred to cover almost the entire area (at least 90% of the entire area), more preferably the entire area (100% of the entire area), of the collecting electrode. The dielectric that can be used to cover the collecting electrode may be chosen from those described with respect to the covering 17 on the electrode 14. The dielectric may contain an antistatic similarly to the dielectric used to make the covering 17. In order to stabilize the electric field between the electrode and the nozzle, the covering preferably covers the collecting electrode with a uniform thickness. The thickness of the dielectric exposed on the surface of the covering is preferably 0.8 mm or more, more preferably 2 mm or more, even more preferably 8 mm or more. With that thickness, electron emission from the electrode is prevented or reduced sufficiently to increase the amount of charge of the spinning solution. With a thickness smaller than that, the covering can fail to sufficiently reduce the electron emission from the collecting electrode, tending to result in a failure to increase the amount of charge of the spinning solution. While the thickness of the covering has no particular upper limit, the upper limit is preferably 25 mm, more preferably 20 mm, even more preferably 15 mm, from the economical standpoint (material saving). Within the upper limit, the spinning solution jetted from the tip of the nozzle into the form of fiber is prevented from being attracted and adhering to the dielectric. To reduce adhesion of the spinning solution to the electrode allows increasing the voltage to be applied, thereby increasing the amount of charge of the spinning solution. When the covering is made of a single kind or two or more kinds of dielectrics, the thickness of the covering is preferably, for example, 0.8 mm to 25 mm, more preferably 2 mm to 20 mm, even more preferably 8 mm to 15 mm.

In the apparatus of the embodiment, covering the collecting electrode with the covering may be combined with (a) covering the electrode 14 with the covering 17, (b) covering the nozzle 13 with the covering 107, or (c) covering the electrode 14 with the covering 17 and the nozzle 13 with the covering 107.

The nanofiber production method using the apparatus 10 of the embodiment is carried out as follows. With an electric field generated between the electrode 14 and the nozzle 13, a spinning solution is jetted from the tip of the nozzle 13. Because the cations in the spinning solution are attracted to the side of the electrode 14 (negative pole) in the electric field, the spinning solution jetted from the nozzle 13 toward the electrode 14 is cation-rich and charged positively. As described earlier, the amount of charge of the spinning solution per unit mass is very large owing to the electrode 14 being covered with the covering 17. The thus charged spinning solution at the tip of the nozzle deforms to form a Taylor cone by the action of the electric field. When the electric field strength exceeds the critical surface tension of the spinning solution, a jet of the spinning solution is drawn toward the electrode 14 at a burst. At this time, an air stream is jetted from the air jetting means 15 to the jet of the spinning solution, whereby the spinning solution veers off to the collector (not shown). Meantime, the jetted stream of the spinning solution decreases in thickness to the order of nano size by a chain of self-repulsion of charges possessed by the spinning solution, and volatilization of the solvent and solidification of the polymer proceed simultaneously to form a nanofiber. The thus formed nanofiber taps into the air jets from the air jetting means 15 and the second air jetting means 16, while being drawn by the electric field generated by the collecting electrode (not shown), and deposits on the surface of the collector disposed to face the air jetting means 15. In order to draw the positively charged spinning solution onto the collector, the collecting electrode is given a lower (more negative) potential than that given to the nozzle 13 (positive pole). To further increase the efficiency of fiber drawing, the collecting electrode is given a lower (more negative) potential than that given to the electrode 14 (negative pole).

According to the nanofiber production method described, since the charge quantity of the spinning solution jetted from the tip of the nozzle 13 is very high, there is exerted a great attractive drawing force on the spinning solution toward the electrode 14. Accordingly, even when the amount of the spinning solution jetted per unit time is increased over the conventional system, it is possible to produce nanofibers of the same fineness as conventionally achieved. Moreover, an increase in the rate of jetting the spinning solution is less likely to cause product defects, such as a solidified droplet of the spinning solution and a bead formed by solidification of an insufficiently drawn droplet of the spinning solution.

Figure 3:
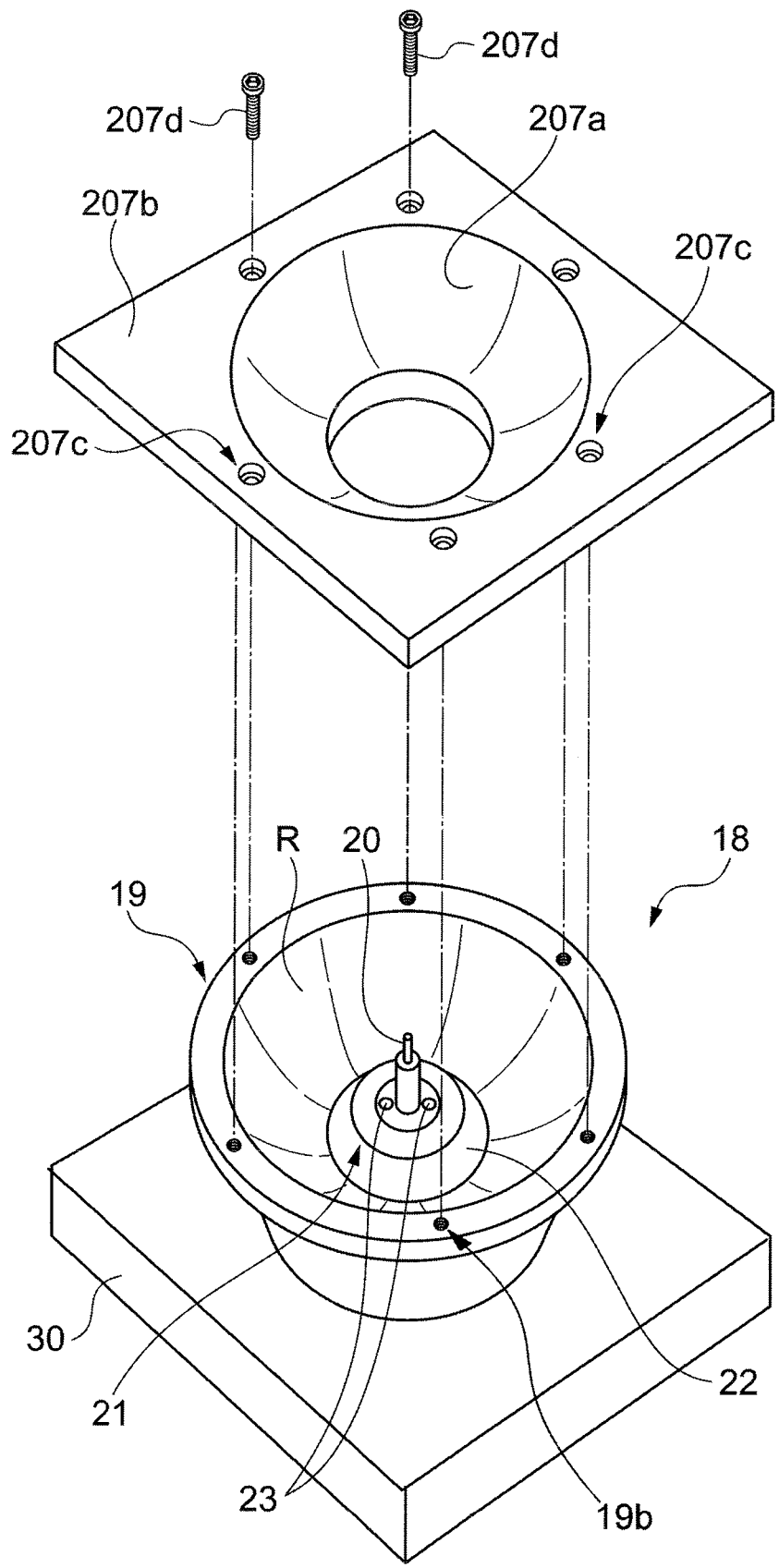
FIG. 3 is an exploded perspective view of another embodiment of the nanofiber production apparatus of the invention.
Figure 4:
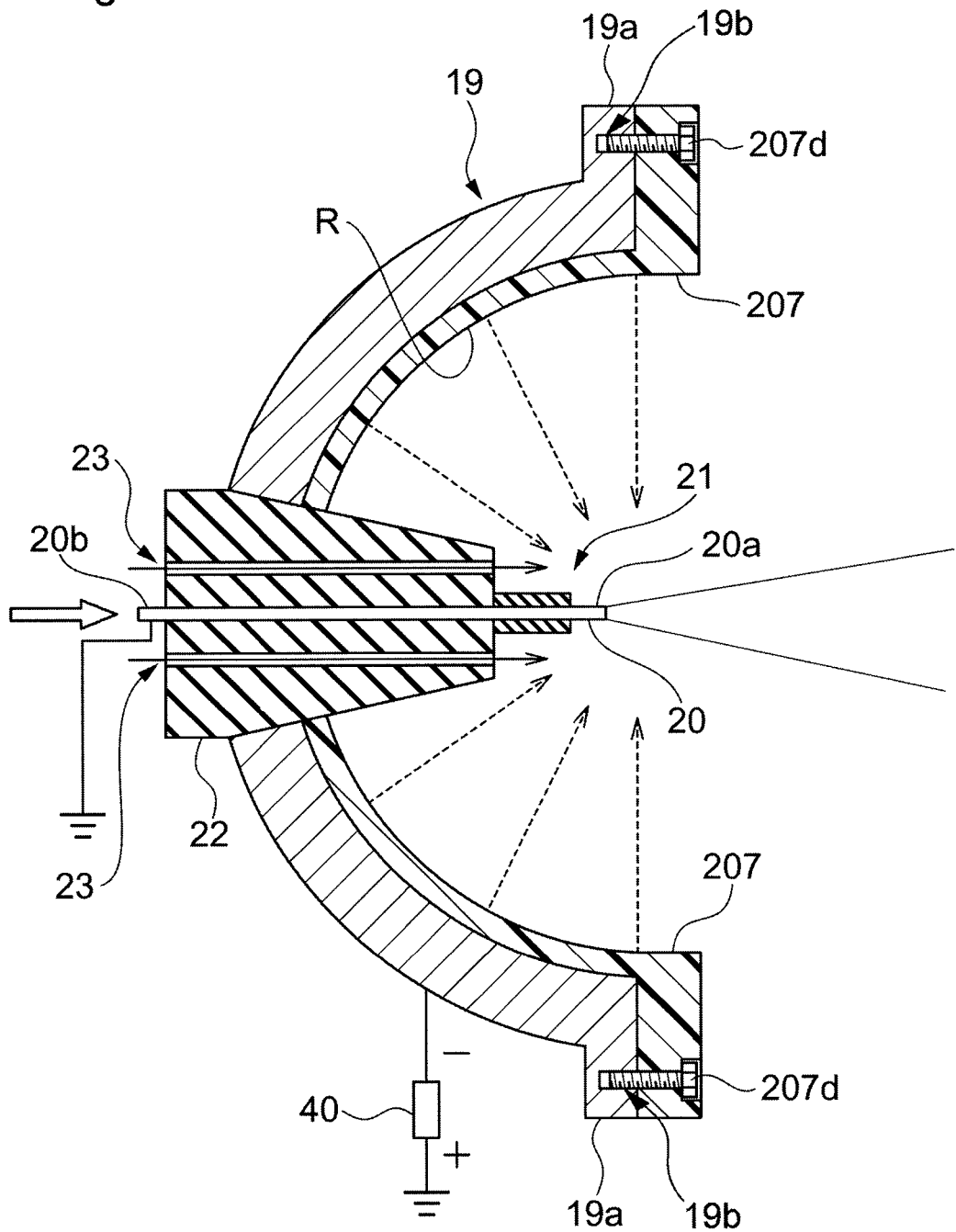
FIG. 4 is a schematic cross-sectional view of the nanofiber production apparatus shown in FIG. 3.

In FIGS. 3 and 4 is shown another embodiment of the apparatus of the invention. Unless the context is specifically otherwise, the description about the embodiment shown in FIGS. 1 and 2 applies to the embodiment of FIGS. 3 and 4 appropriately.

The apparatus 18 of the present embodiment has an electrode 19 and a nozzle 20 for jetting a spinning solution. The electrode 19 generally has a concave spherical shape, specifically the general shape of a bowl with a concave curved surface R on its inner side. The electrode 19 having the concave curved surface R has a flat flange 19a around the open end edge thereof. As long as the inner surface of the electrode 19 is a concave curved surface R, the electrode 19 does not need to be generally bowl-shaped and may have other shapes. The electrode 19 is formed of a conductive material and is usually made of metal. The electrode 19 is fixed to a base 30 made of an insulating material. As shown in FIG. 4, the electrode 19 is connected to a high direct voltage power source 40 as a voltage generating means, and a negative voltage is applied to the electrode 19.

The open end of the concave curved surface R is circular when viewed from the open end side. As used herein, the term "circular" includes not only true circular but also elliptic. In order to concentrate the electric field at the tip of the nozzle 20, the shape of the open end of the concave curved surface R is preferably true circular as will be discussed later. The concave curved surface R is curved at any position. As used herein, the term "curved surface" is meant to include (i) a curved surface having no flat portion, (ii) a concave, seemingly curved surface that is formed by connecting a plurality of segments each having a flat surface, and (iii) a concave, seemingly curved surface formed by connecting a plurality of annular segments each having a belt-like portion with no curvature on one of three perpendicular axes. In the case of (ii), the concave curved surface R is preferably formed by connecting segments each having a rectangular flat surface of the same or different sizes, e.g., with a length and a width ranging from about 0.5 mm to 5 mm. In the case of (iii), the concave curved surface R is preferably formed by connecting annular segments having the shape of a flattened cylinder, e.g., with a height of 0.001 mm to 5 mm and a varied radius. Of the three perpendicular axes (x-, y-, and z-axes) of each annular segment, the x-axis and y-axis containing a transverse cross-section of the cylinder have a curvature, and the z-axis (the direction of height of the cylinder) has no curvature.

The distance (shortest distance) between the tip 20a of the nozzle 20 and the concave curved surface R may be the same as that between the nozzle 13 and the electrode 14 of the apparatus 10.

The concave curved surface R preferably has such a curvature that a normal at any position of the concave curved surface R passes through or near the tip of the nozzle 20. From that viewpoint, the concave curved surface R is preferably shaped to the inner surface of a true spherical shell.

As shown in FIGS. 3 and 4, the concave curved surface R has an opening at the bottom, and a nozzle assembly 21 is fitted into the opening.

The nozzle assembly 21 includes the nozzle 20 and a support 22 supporting the nozzle 20. The nozzle 20 is made of a conductive material, usually metal. The support 22 is made of an insulating material. Therefore, the electrode 19 and the nozzle 20 are electrically insulated from each other by the support 22. The nozzle 20 is grounded. The nozzle 20 goes completely through the support 22 with its tip 20a exposed to the space surrounded by the concave curved surface 11 of the electrode 10. The opposite bottom (rear) end 20b is exposed on the back side (i.e., the opposite side to the concave curved surface R) of the electrode 19. The nozzle 20 does not always need to go through the support 22 and may have its rear end 20b located in the middle of a through-hole for feeding the stock spinning solution drilled through the support 22. The rear end 20b of the nozzle 20 or the through-hole for feeding the stock spinning solution drilled through the support 22 is connected to a spinning solution feed source (not shown). The nozzle assembly 21 constitutes the spinning solution jetting means together with the spinning solution feed source.

As shown in FIGS. 3 and 4, the apparatus 18 of the embodiment has an air jetting means 23 near the base of the nozzle 20 of the nozzle assembly 21. The air jetting means 23 is a through-hole. The air jetting means 23 is provided along the direction in which the nozzle 20 extends and is configured to jet air therethrough toward the tip 20a of the nozzle 20. When the nozzle assembly 21 is viewed from the open end side of the electrode 19, there are two air jetting means 23 formed so as to surround the nozzle 20. The air jetting means 23 are formed symmetrically about the nozzle 20. Each air jetting means 23, which is a through-hole, has its rear open end connected to an air feed source (not shown). The air jetting means 23 are configured to jet air fed from the air feed source from around the nozzle 20. The jetted air carries a spinning solution jetted from the tip 20a of the nozzle 20 and drawn into a fine fiber by the action of the electric field to a collecting electrode (not shown) located at a position to face the air jetting means 23. While the apparatus shown in FIGS. 3 and 4 has two air jetting means 23, the number of the air jetting means 23 to be provided is not limited to two and may be one or three or more. The cross-sectional shape of the through-hole being the air jetting means is not limited to circular as shown and may be rectangular, elliptical, dual circular, triangular, or honey-comb. From the standpoint of forming a uniform air stream, a ring-shaped through-hole encircling the nozzle is desirable.

According to the apparatus of the embodiment of FIGS. 3 and 4, the electrode 19 has a covering 207 having a dielectric exposed thereon provided on its entire surface facing the nozzle 20 and part of its surface that does not face the nozzle 20. The electrode 19 and the covering 207 are in direct contact with each other. The covering 207 has a hollow convexity 207a that is complementary to the concave curved surface R of the electrode 19. The convexity 207a has an opening at the top, and the nozzle assembly 21 is fitted into the opening. The convexity 207a covers the side of the electrode 19 that faces the nozzle 20. The covering 207 has a flange 207b extending horizontally from the edge of the open end of the hollow convexity 107a. The flange 207b covers the flange 19a of the electrode 19, i.e., part of the sides of the electrode 19 that do not face the nozzle 20. The convex covering 207 is fitted into the concavity of the electrode 19 and secured to the electrode 19 by a predetermined fastener.

The fastener is preferably made of a dielectric. Electricity does not flow in a dielectric fastener so that lines of electric force emanated from the joint between the electrode 19 and the covering 207 can be reduced or eliminated, thereby to prevent disturbance of the electric field between the electrode 19 and the nozzle 20. In the case where the electrode 19 and the covering 207 are joined together using the fastener, the covering 207 can easily be changed over from one type to another where needed, so that the apparatus 18 is easy to operate.

The fastener may be, for example, a pressure sensitive adhesive. The fastener may be a screw as will be described below. The pressure sensitive adhesive may be, for example, an epoxy resin adhesive or external adhesive tape. A releasable adhesive, like a denture fixative, is particularly suitable so that the covering 207 is easily detached from the electrode 19, which provides easier maintenance of the apparatus 18. In using a screw, the screw may be of a dielectric material that may be the same or different from that making the covering 207 or wood. By joining the electrode 19 and the covering 207 using a fastener made of such materials, a layer of air is hardly formed between them, and the electric field between the electrode 19 and the nozzle 20 is thus stabilized.

In the embodiment shown in FIGS. 3 and 4, a screw 207d as a fastener is inserted through a through-hole 207c of the flange 207b, and the screw 207d is screwed into a screw hole 19b made in the flange 19a of the electrode 19 to secure the covering 207 to the electrode 19.

Each through-hole 207c is provided with a counterbore having a larger diameter than the head of the screw 207d so that the head of the screw 207d screwed to fasten the electrode 19 and the covering 207 may be positioned below the surface of the covering 207 without sticking out of the surface of the covering 207. The electric field between the electrode 19 and the nozzle 20 is stabilized by avoiding the screw 207d sticking out of the surface of the covering 207. A screw may be inserted from the back side of the electrode 19 to fasten the electrode 19 and the covering 207 together.

In that case, the electric field is stabilized more because there is no need to form a counterbore on the front side of the covering 207.

With a view to stabilizing the electric field between the electrode 19 and the nozzle 20, the screw 207d is preferably made of a dielectric. Examples of useful dielectrics include polyether ether ketone, polyphenylene sulfide, glass fiber-reinforced polyamide MXD6, polycarbonate, polypropylene, ceramics, Teflon (registered trade name), polyvinylidene fluoride, non-thermoplastic polyimide resins, and rigid polyvinyl chloride.

The dielectric making the covering 207 used in the embodiment may be selected from those used to make the covering 17 covering the electrode 14. It is convenient to use a molded part obtained by melt molding a thermoplastic resin of various kinds. The dielectric may contain an antistatic similarly to the dielectric used to make the covering 17. The preference about the thickness of the covering 17 on the electrode 14 also applies to that of the covering 207 on the electrode 19.

Similarly to the apparatus 10 of the previously described embodiment, the apparatus 18 of the present embodiment is capable of increasing the charge quantity of the spinning solution by the action of the covering 207. In addition to that, since the electrode 19 of the apparatus 18 has a concave spherical shape, the increase in charge quantity of the spinning solution is more noticeable. In the apparatus 18, an electrode surface far larger than the area of the nozzle 20 is provided at substantially the same distance from the tip 20a of the nozzle 20. Because the total charge quantity accumulated in the electrode 19 as a negative pole and that accumulated in the nozzle 20 as a positive pole are equal, the charges are distributed on the surface of the nozzle 20 at a much higher density than on the electrode 19 to provide an intensified electric field around the nozzle 20. The intensified electric field brings a further increase of charge quantity of the spinning solution. From that viewpoint, the nozzle 20 preferably has as small an area as possible. In particular, the nozzle 20 preferably has as small a length (a distance between the tip 20a and the rear end 20b of the nozzle 20) as possible. Specifically, the length of the nozzle 20 is preferably 50 mm or shorter, more preferably 10 mm or shorter, even more preferably 5 mm or shorter. For the electrode 19 to have a concave spherical shape is also advantageous in that the bulk of the electrode is made smaller compared with a flat-shape electrode, and so is the apparatus 18 in size.

The nozzle 20 is preferably disposed in such a manner that the direction in which the nozzle 20 extends passes through or near the center of the circle defined by the open end of the concave curved surface R of the electrode 19 and also passes through or near the center of the opening formed at the bottom of the concave curved surface R. It is especially preferred that the direction in which the nozzle 20 extends be perpendicular to the plane containing the circle defined by the open end of the concave curved surface R. When the nozzle 20 is so disposed, concentration of the charges (electric field) at the tip 20a of the nozzle 20 is further ensured.

With regard to the position of the tip 20a of the nozzle 20, the nozzle 20 is preferably set up in such a manner that the tip 20a is positioned in or near the plane containing the circle defined by the open end of the concave curved surface R of the electrode 19. It is particularly preferred for the nozzle 20 to be set up in such a manner that the tip 20a is positioned inwardly of the plane, specifically 1 to 10 mm inward of the plane. By so positioning the tip 20a of the nozzle 20, it is less likely that the spinning solution jetted from the tip 20*a* is attracted to the concave curved surface R of the electrode 19 so that the concave curved surface R is contaminated with the spinning solution. From that point of view, it is particularly preferred for the concave curved surface R of the electrode 19 be shaped to nearly a half of the inner surface of a true spherical shell.

From the same standpoint as above, it is also preferred for the tip 20*a* of the nozzle 20 be positioned in the plane containing the circle defined by the open end of the concave curved surface R. In that case, the tip 20*a* of the nozzle 20 is preferably positioned at a radial distance of 10 mm or less, more preferably 5 mm or less, from the center of the circle, even more preferably at the center of the circle.

In the apparatus of the embodiment, the electrode 19 may be covered on all its sides (surfaces) that do not face the nozzle 20 with the covering having a dielectric exposed on the surface thereof. In detail, with reference to FIG. 4, the outer side (opposite to the concave curved surface R) of the electrode 19 and the end face of the flange 19*a* may also be covered with the covering. Similarly to the apparatus 10 of the previous embodiment, the amount of charge of the spinning solution may also be increased by covering almost the entire area of the outer side of the nozzle 13 with a covering having a dielectric exposed on the surface thereof instead of, or in addition to, disposing the covering 207 on the concave curved surface R of the electrode 19. In detail, the structure shown in FIG. 2 may be adopted. In addition to that, almost the entire area of the collecting electrode constituting part of the collecting means may also be covered with a covering having a dielectric exposed on the surface thereof.

In FIG. 5 is shown still another embodiment of the apparatus according to the invention. FIG. 5(*b*) is a top view of the apparatus 310 of the embodiment, and FIG. 5(*a*) is a cross-sectional view taken along line A-A' of FIG. 5(*b*), seen from the lower side of FIG. 5(*b*). As shown in these figures, the apparatus 310 is basically similar to the apparatus 10 shown in FIGS. 1 and 2, except for replacing the plate-like electrode 14 of the apparatus 10 with an electrode 314 having a concave spherical shape. Unless the context specifically states otherwise, the description about the embodiments shown in FIGS. 1 through 4 applies equally to the embodiment of FIG. 5. Members in FIG. 5 that are similar to those in FIGS. 1 to 4 are indicated by similar numerals.

The apparatus 310 has a spinning solution jetting means 11 for jetting a stock spinning solution for nanofiber production. The spinning solution jetting means 11 includes a solution feeding part 12 and a nozzle 13. An electrode 314 having a concave spherical shape is disposed right above the opening of the nozzle 13 with its inner side facing down. The nozzle 13 and the electrode 314 are made of, e.g., metal and have conductivity. A direct-current high-voltage power supply 101 is provided as a voltage generating means to apply a direct voltage between the nozzle 13 and the electrode 314 through a ground 102 and a metallic lead wire 103. The nozzle 13 is grounded as shown in FIG. 5(*a*) and serves as a positive pole. A negative voltage is applied to the electrode 314. Accordingly, the electrode 314 serves as a negative pole.

The electrode 314 has the general shape of a concave sphere, specifically the general shape of a bowl with a concave curved surface R on its inner side and a flat flange 314*a* around the open end edge thereof. The electrode 314 has an opening 320 in which an air jetting means 15 is fitted on one side thereof and, on the opposite side, an opening 321 for letting the air jet jetted from an air jetting means 15 and the spinning solution jetted from the nozzle 13 into the form of fiber pass through. As long as the inner surface of the electrode 314 is a concave curved surface R, the electrode 314 does not need to be generally bowl-shaped and may have other shapes.

The apparatus 310 has an air jetting means 15. The air jetting means 15 is set, through the opening 320 of the electrode 314, at such a position as to direct an air jet between the nozzle 13 and the electrode 314. Although a fiber formed is positively charged and is therefore drawn from the nozzle 13 (positive pole) toward the electrode 314 (negative pole), the air jet jetted from the air jetting means 15 changes the direction of travel of the fiber and carries the fiber through the opening 321 to the collecting means (downward in FIG. 5(*b*)).

According to the apparatus 310 of the present embodiment, the entire concave curved surface R of the electrode 314 (negative pole) and part of the surface of the flange 314*a* are covered with a covering 307 having a dielectric exposed on its surface. Because the tip of the nozzle 13 is positioned outside of the concave curved surface R, both the concave curved surface R and part of the surface of the flange 314*a* face the nozzle 13. The covering 307 has almost a uniform thickness. The electrode 314 and the covering 307 are in direct contact with each other. Similarly to the electrode 19 and the covering 207 shown in FIG. 3, the electrode 314 and the covering 307 are fastened to each other by screwing screws into through-holes formed through the flange 314*a* of the electrode 314 and the flange of the covering 307.

The dielectric making the covering 307 used in the embodiment may be selected from those used to make the covering 17 used in the apparatus 10 shown in FIG. 1. It is convenient to use a molded part obtained by melt molding a thermoplastic resin of various kinds. The dielectric may contain an antistatic similarly to the dielectric used to make the covering 17. The preference about the thickness of the covering 17 covering the electrode 14 applies equally to that of the covering 307 covering the electrode 314.

Similarly to the apparatus 10 and 18 of the previously described embodiments, the apparatus 310 of the present embodiment is capable of increasing the charge quantity of the spinning solution by the action of the covering 307. In addition to that, since the electrode 314 of the apparatus 310 has a concave spherical shape similarly to the apparatus 18, the increase in charge quantity of the spinning solution is more noticeable, and the size of the apparatus can be made smaller. The length of the nozzle 13 is preferably 50 mm or shorter, more preferably 10 mm or shorter, even more preferably 5 mm or shorter.

Figure 6:
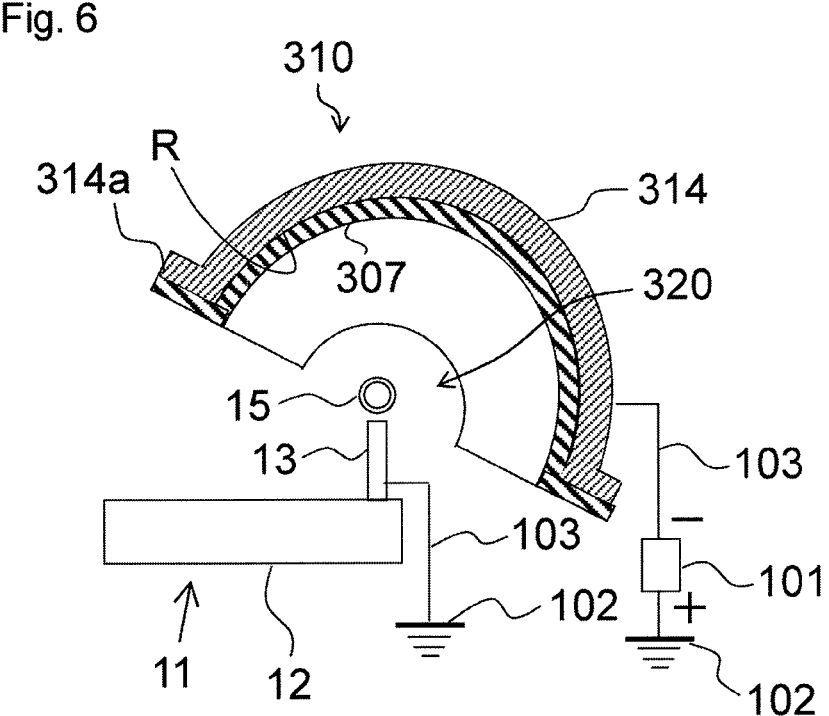
FIG. 6 is a cross-sectional side view of a modification of the nanofiber production apparatus shown in FIG. 5(a).

The distance (shortest distance) between the tip of the nozzle 13 and the concave curved surface R may be the same as the distance (shortest distance) between the nozzle 13 and the electrode 14 of the apparatus 10. The tip of the nozzle 13 is preferably positioned at or near the center of the concave curved surface R of the electrode 314, specifically at a distance of 10 mm or less from the center of the concave curved surface R. By so positioning the tip of the nozzle 13, the electric field around the tip of the nozzle 13 is intensified to further increase the charge quantity of the spinning solution. From that point of view, it is particularly preferred for the concave curved surface R of the electrode 314 be shaped to nearly a half of the inner surface of a true spherical shell. In the apparatus 310 of the embodiment, the electrode 314 is set up in such a manner that the plane containing a circle defined by the open end of the concave curved surface R is substantially perpendicular to the direction in which the nozzle 13 extends as shown in FIG. 5(*a*). Instead of such a configuration, the electrode 314 may be set in such a manner that the plane defined above intersects the direction in which the nozzle 13 extends at other than 90 degrees as shown in FIG. 6.

In the apparatus 310 of the embodiment, the electrode 314 may be covered on part of or all of the other sides that do not face the nozzle 13 with a covering having a dielectric exposed on the surface thereof. In detail, with reference to FIG. 5(a), the outer side (opposite to the concave curved surface R) of the electrode 314 and the end face of the flange 314a may also be covered with the covering. Similarly to the apparatus 10 of the previous embodiment, the amount of charge of the spinning solution may also be increased by covering almost the entire area of the outer side of the nozzle 13 with a covering having a dielectric exposed on the surface thereof instead of, or in addition to, disposing the coveting 307 on the concave curved surface R of the electrode 314. In detail, the structure shown in FIG. 2 may be adopted. In addition to that, almost the entire area of the collecting electrode constituting part of the collecting means may also be covered with a covering having a dielectric exposed on the surface thereof.

Figure 7B:
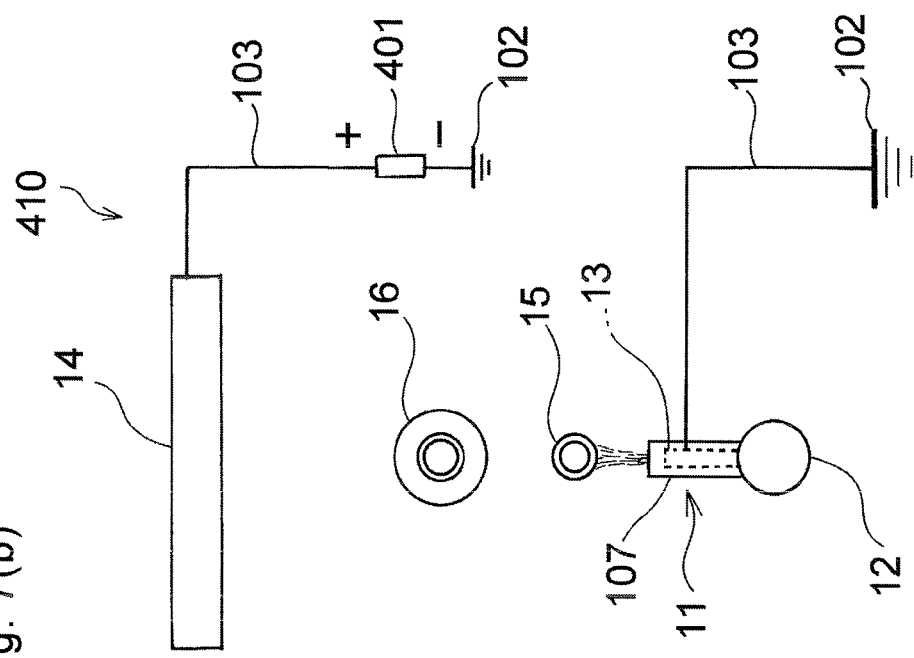
FIG. 7(b) is a front view of the apparatus of FIG. 7(a).
Figure 7A:
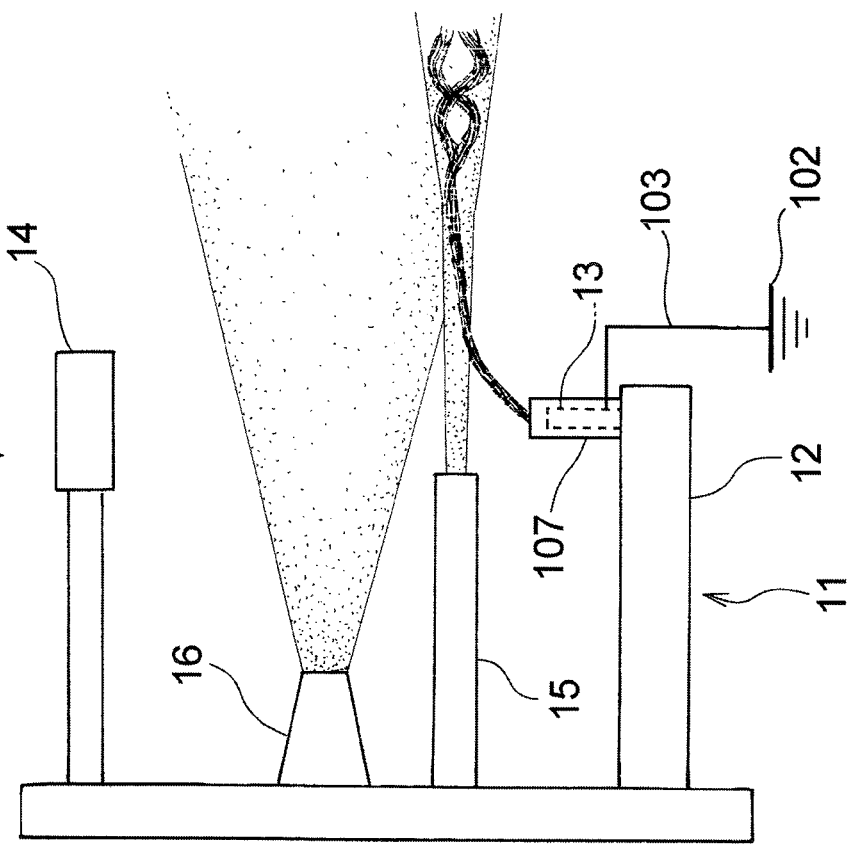
FIG. 7(a) is a cross-sectional side view of yet another embodiment of the nanofiber production apparatus of the invention.

In FIG. 7 is shown yet another embodiment of the production apparatus of the invention. FIG. 7(a) is a side view of an apparatus 410 of the embodiment, and FIG. 7(b) is a front view of the apparatus of FIG. 7(a). As shown in these figures, the apparatus 410 is basically similar to the apparatus 10 shown in FIGS. 1 and 2, except that the covering 17 covering the electrode 14 is replaced by a covering 107 covering the nozzle 13 and that the polarity of the voltage generating means 101 is reversed. Unless the context specifically states otherwise, the description about the embodiments shown in FIGS. 1 through 5 applies equally to the embodiment of FIG. 7. Members in FIG. 7 that are similar to those in FIGS. 1 to 5 are indicated by similar numerals.

The production apparatus 410 has a spinning solution jetting means 11 for jetting a stock spinning solution for nanofiber production. The spinning solution jetting means 11 includes a solution feeding part 12 and a nozzle 13.

A plate-like electrode 14 is disposed right above the opening of the nozzle 13 so as to face the opening of the nozzle 13. The nozzle 13 and the electrode 14 are made of, e.g., metal and have conductivity. A direct-current high-voltage power supply 401 is provided as a voltage generating means to apply a direct voltage between the nozzle 13 and the electrode 14 through a ground 102 and a metallic lead wire 103. The nozzle 13 is grounded as shown in FIG. 7(a) and serves as a negative pole. A positive voltage is applied to the electrode 14, so that the electrode 14 serves as a positive pole.

The apparatus 410 includes an air jetting means 15. The nanofiber formed of the spinning solution is negatively charged as will be described and is destined to travel from the nozzle 13 (negative pole) toward the electrode 14 (positive pole). The air jet from the air jetting means 15 changes the travelling direction of the nanofiber and carries the fiber to the collecting means (to the right in FIG. 7(a)) toward a collecting means (to the right in FIG. 1(a)) while contributing to drawing or stretching the nanofiber.

The production apparatus 410 further includes a second air jetting means 16, a nanofiber collecting means including a collecting electrode and a collector, and an air venting means similarly to the apparatus 10. In order to attract the negatively charged nanofiber to the collecting electrode, the collecting electrode is given a higher (more positive) potential than the nozzle 13 serving as a negative pole. To make the attraction more efficient, the collecting electrode is preferably given a higher (more positive) potential than the electrode 14 serving as a positive pole.

While the basic structure of the apparatus 410 of the embodiment is as described above, the apparatus 410 is characterized in that the almost the entire area of the outer side of the nozzle is covered with a covering 107 having a dielectric exposed thereon. To enhance the effect of the covering 107, the covering preferably extends beyond the tip 13a of the nozzle 13 as described in FIG. 2.

As described above, the amount of charge of the spinning solution jetted from the nozzle 13 markedly increases when the outer surface of the nozzle 13 is covered with a covering having a dielectric exposed thereon. The mechanism is considered as follows. In the electrospinning device 410 of the embodiment, anions in the spinning solution are attracted toward the electrode 14 (positive pole), and the cations to the inner wall of the nozzle 13 (negative pole), by the electric field formed between the electrode 14 and the nozzle 13. Consequently, the spinning solution jetted toward the electrode 14 contains an increased amount of the anions, and the spinning solution is charged negatively. At the same time, with the voltage applied between the electrode 14 and the nozzle 13, electrons are emitted into the atmosphere from the outer surface of the nozzle 13 (negative pole) and fly toward the electrode 14 (positive pole). The negative charges of the nozzle 13 are thus consumed through the electron emission, so that the ability of the nozzle 13 to negatively charge the spinning solution decreases. As a result, the charge quantity of the spinning solution decreases. When the outer surface of the nozzle 13 as a negative pole is covered with the covering 107 having a dielectric exposed on the surface, the emission of electrons from the nozzle 13 is reduced, whereby reduction in charging ability at the nozzle 13 is reduced, and the charge quantity of the spinning solution increases. In addition, since the number of the electrons flying from the nozzle 13 to the electrode 14 decreases, a discharge between the electrode 14 and the nozzle 13 is reduced, which makes it feasible to increase the voltage applied between the electrode 14 and the nozzle 13 and/or reduce the distance therebetween. This allows for increasing the intensity of the electric field between the electrode 14 and the nozzle 13 thereby to increase the amount of charge of the spinning solution. Furthermore, owing to the decrease of the electrons flying from the nozzle 13 to the electrode 14, the current (leakage current) flowing between the electrode 14 and the nozzle 13 decreases, whereby the power required for the nanofiber production is expected to reduce.

To ensure these effects, it is preferred to cover almost the entire area (at least 90% of the area) of the outer side of the nozzle 13, particularly the entire area (100% of the area) of that side, with the covering 107. When the covering 107 is provided to extend beyond the tip of the nozzle 13, electron emission from the tip of the nozzle is prevented, which permits a further increase in charge quantity of the spinning solution. A preferred range of the length of the extension of the covering 107 beyond the tip of the nozzle 13 is the same as that described with reference to the apparatus 10.

According to the embodiment, the amount of charge of the spinning solution may also be increased by covering almost the entire area of the side of the electrode 14 that faces the nozzle 13 with a covering having a dielectric exposed on the surface thereof instead of, or in addition to, disposing the covering 107 having a dielectric exposed thereon on the outer surface of the nozzle 13. The number of the electrons flying from the nozzle 13 to the electrode 14 is reduced by covering the electrode 14 with a covering having a dielectric exposed thereon. As a result, a discharge between the electrode 14 and the nozzle 13 is less likely to occur, permitting an increase in the voltage applied between the electrode 14 and the nozzle 13 and/or a decrease in the distance therebetween. This allows for increasing the intensity of the electric field between the electrode 14 and the nozzle 13 to increase the amount of charge of the spinning solution. With the decrease of the electrons flying from the nozzle 13 to the electrode 14, the current (leakage current) flowing between the electrode 14 and the nozzle 13 decreases, whereby the power required for the nanofiber production is expected to decrease.

To ensure these effects, it is preferred to cover almost the entire area (at least 90% of the area), particularly the entire area (100% of the area), of the side facing the nozzle 13 with the covering. If a large proportion of the surface is uncovered, electrons will enter the electrode 14 through the uncovered area to impede effective inhibition on a discharge or leakage current. When not only the side facing the nozzle 13 but the other non-facing sides are covered with the covering, the above effects are further enhanced because more than a few electrons enter through the surface of these sides that do not face the nozzle 13. With the view to increasing the amount of charge of the spinning solution and reducing the power required in the nanofiber production, it is preferred that all the sides of the electrode 14 be covered with the covering.

In addition to the above, almost the entire area of the collecting electrode constituting part of the collecting means may also be covered with a covering having a dielectric exposed on the surface thereof. The collecting electrode is given a higher (more positive) potential than the nozzle 13 (negative pole) so as to draw negatively charged nanofibers. Therefore, the electrons emitted from the nozzle 13 fly also to the collecting electrode. The flying electrons are prevented from entering the collecting electrode by covering almost the entire area of the collecting electrode with a covering having a dielectric exposed thereon. As a result, the current (leakage current) flowing between the collecting electrode and the nozzle 13 decreases, whereby the power required for the nanofiber production is expected to decrease.

Figure 8A:
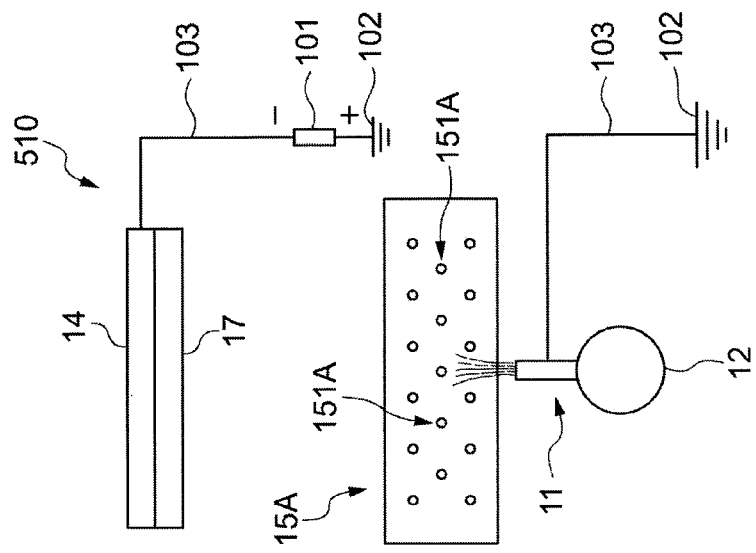
FIG. 8(a) is a side view of still another embodiment of the nanofiber production apparatus of the invention.
Figure 8B:
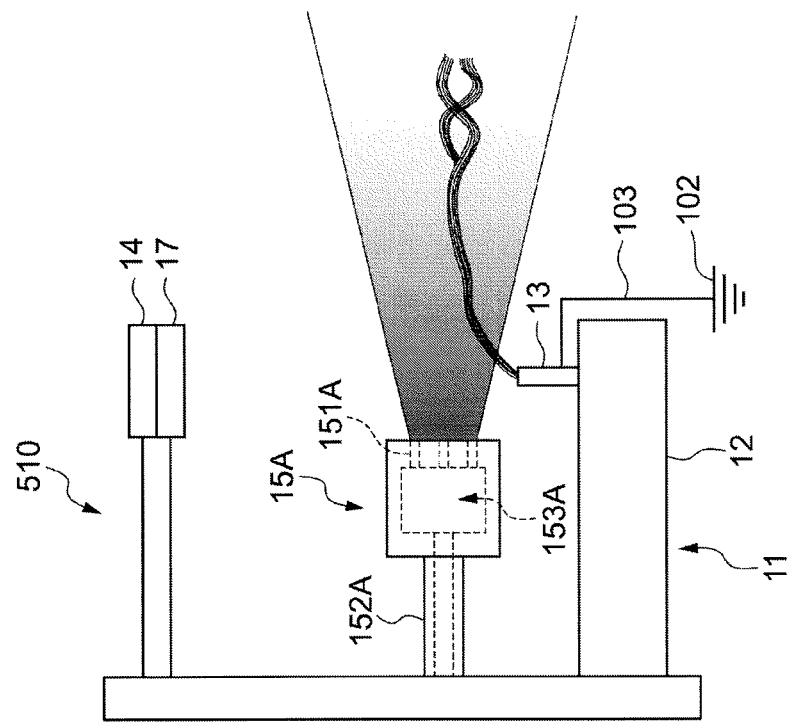
FIG. 8(b) is a front view of the apparatus of FIG. 8(a).

FIG. 8 illustrates still another embodiment of the invention. FIG. 8(*a*) is a side view of a production apparatus 510 of the embodiment, and FIG. 8(*b*) is a front view of the apparatus of FIG. 8(*a*). As shown, the apparatus 510 of the embodiment basically has the same structure as the apparatus 10 and 410 shown in FIGS. 1 and 7. The difference between the apparatus 510 and the apparatus 10 and 410 of FIGS. 1 and 7 resides in the structure of the air jetting means. The apparatus 10 and 410 of FIGS. 1 and 7 use two air jetting means, while the apparatus 510 of the present embodiment adopts a single air jetting means 15A.

Figure 9:
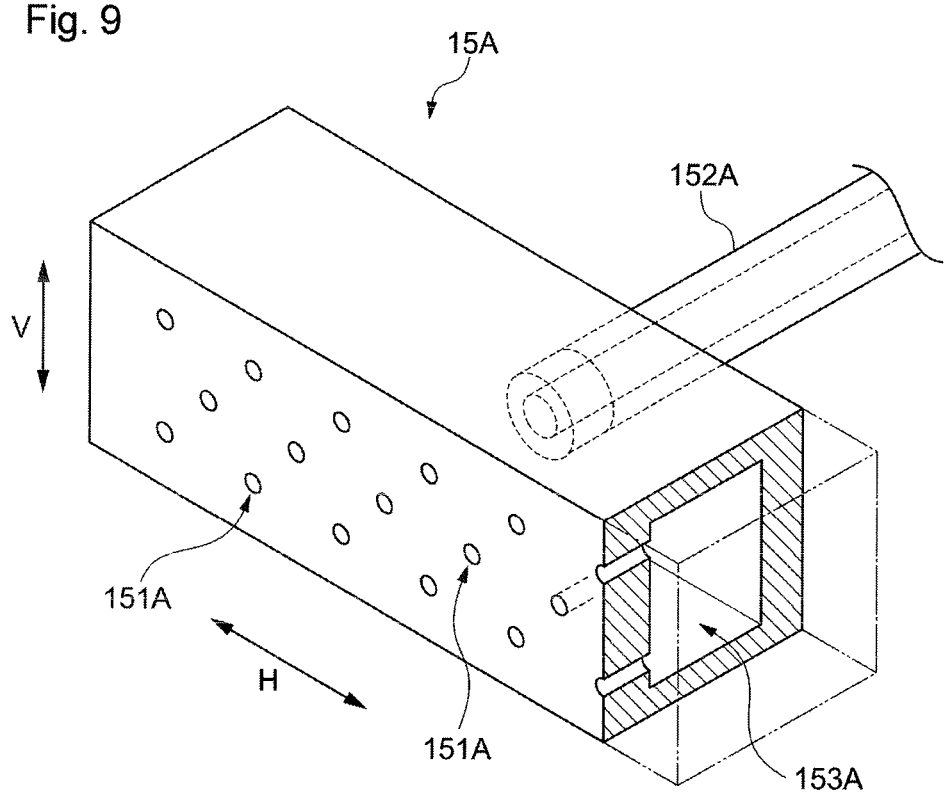
FIG. 9 is a perspective view of the air jetting means in FIG. 8(a) with part cut away.

FIG. 9 is a perspective view of the air jetting means 15A of the apparatus 510 shown in FIG. 8 with part broken away. The air jetting means 15A has, on the front thereof, a plurality of holes 151A from which air is jetted out. The air jetting means 15A has an air feed pipe 152A connected to the back side thereof. The air jetting means 15A has a manifold structure, having a space for keeping air, namely a manifold 153A. Providing the manifold 153A allows for uniformly spouting air jets from the holes 151A to make an air stream flow in the space between the electrode 14 and the nozzle 132 without forming gaps between the individual jets. Therefore, the spinning solution jetted from the nozzle 13 is effectively prevented from being attracted to and adhering to the electrode 14, and a higher voltage is permitted to be applied to increase the amount of charge of the spinning solution.

The air jetting means 15A is preferably made of a dielectric so as to avoid disturbing the electric field between the electrode 14 and the nozzle 13. The dielectric material to be used may be chosen from those useful to cover the electrode 14. To prevent electric field disturbance, the air jetting means 15A is preferably made of the same material as that used to cover the electrode 14.

As shown in FIG. 8, the air jetting means 15A is set in such a manner that the holes 151A face the space between the electrode 14 and the nozzle 13, whereby an air stream flows in the space between the electrode 14 and the nozzle 13 without making gaps between air jets. As consequence, the spinning solution jetted from the nozzle 13 is effectively prevented from being attracted to and adhering to the electrode 14, and a voltage to be applied is allowed to be increased to increase the charge quantity of the spinning solution.

The holes 151A formed on the front of the air jetting means 15A interconnect the manifold 153A and the external space. The holes 151A are arranged as desired with no restrictions. For example, the holes 151A may be arranged in a staggered pattern as shown in FIG. 9, in which a plurality of (three in the case of FIG. 9) horizontal rows of holes (rows extending in the horizontal direction H) are arrayed in the vertical direction V. By such an arrangement, an air stream flows in the space between the electrode 14 and the nozzle 13 without making a gap between jets of air. As consequence, the spinning solution jetted from the nozzle 13 is effectively prevented from being attracted to and adhering to the electrode 14, and a voltage to be applied is allowed to be increased to increase the charge quantity of the spinning solution.

The hole 151A may be, for example, a slit-like space or a generally pillar-like space. Accordingly, the frontal shape, in the air jetting means 15A, of the hole 151A may be a slit, a circle, an ellipse, a polygon such as a triangle or a tetragon, or the like. A circular shape is preferred in terms of ease of shaping. When the holes 151A have such a shape, an air stream flows in the space between the electrode 14 and the nozzle 13 without making a gap between jets of air. As consequence, the spinning solution jetted from the nozzle 13 is effectively prevented from being attracted to and adhering to the electrode 14, and a voltage to be applied is allowed to be increased to increase the charge quantity of the spinning solution. Furthermore, the air consumption is reduced.

In the case where the hole 151A is a slit-like space, the width of the slit is preferably 0.1 mm or more, more preferably 0.3 mm or more, so as to jet air while minimizing pressure loss. The upper limit of the slit width is preferably 1.5 mm, more preferably 1.2 mm. At or below the upper limit of the width, a sufficient flow rate of air to blow off the spinning solution jetted from the nozzle 13 to the collecting means is secured, thereby enabling spinning, and the air consumption is reduced. From the same standpoint, the slit width is preferably 0.1 mm to 1.5 mm, more preferably 0.3 mm to 1.2 mm.

In the case where the hole 151A is a generally pillar-like space, for example, a generally columnar space, the diameter is preferably 0.1 mm or more, more preferably 0.3 mm or more, and preferably 1.5 mm or less, more preferably 1.2 mm or less, for the same reasons described above. Specifically, the diameter is preferably 0.1 mm to 1.5 mm, more preferably 0.3 mm to 1.2 mm.

When the holes 151A are regularly arranged on the front of the air jetting means 15A, for example, in a staggered pattern, the pitch of arrangement is preferably 3 mm or more, more preferably 5 mm or more, so as to avoid forming an excessive number of holes 151A thereby to hold down the shaping cost. The pitch is preferably 15 mm or less, more preferably 12 mm or less, so as to reduce or eliminate gaps between jets of air jetted from the individual holes 151A thereby to prevent the spinning solution jetted from the nozzle 13 from adhering to the electrode 14 effectively.

Figure 10:
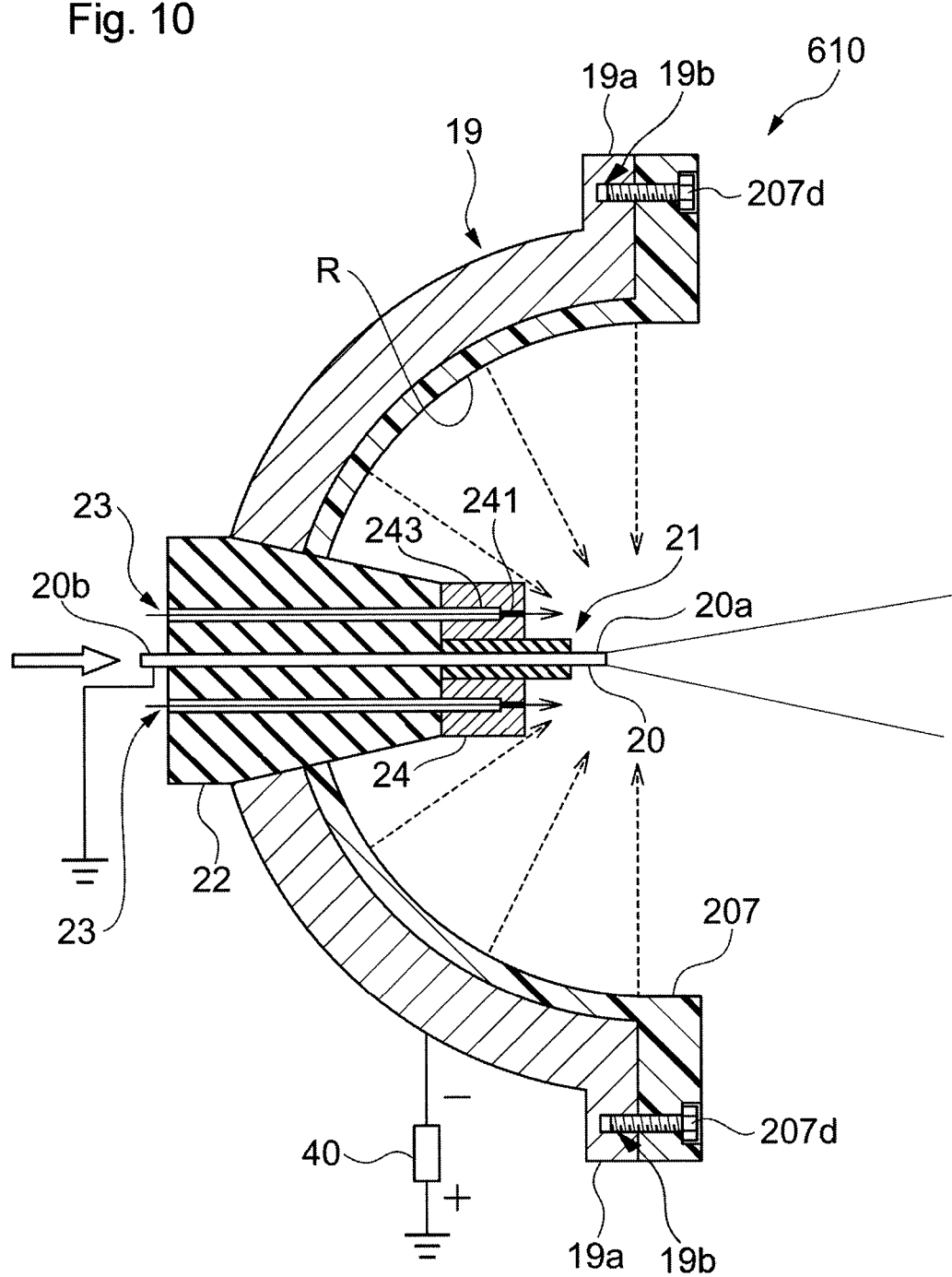
FIG. 10 is a schematic cross-sectional view of still another embodiment of the nanofiber production apparatus of the invention.

FIG. 10 represents still another embodiment of the invention. A production apparatus 610 according to the embodiment basically has the same structure as the apparatus 18 shown in FIGS. 3 and 4. The difference between the apparatus 610 of the embodiment and the apparatus 18 of FIGS. 3 and 4 consists in the structure of the air jetting means. While the apparatus 18 of FIGS. 3 and 4 has the air jetting means 23, each of which is a through-hole, near the base of the nozzle 20 of the nozzle assembly 21, the apparatus 610 of the present embodiment has a manifold member 24 as an air jetting means at the front of the nozzle assembly 21.

Figure 11:
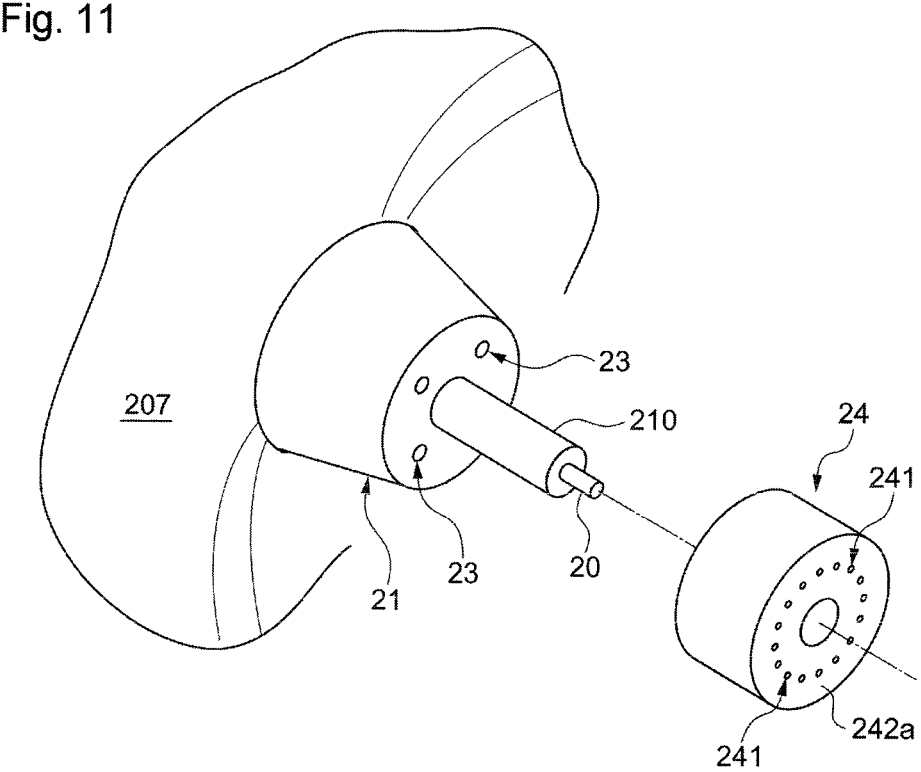
FIG. 11 is an exploded perspective view of the essential part of the nanofiber production apparatus shown in FIG. 10.
Figure 12A:
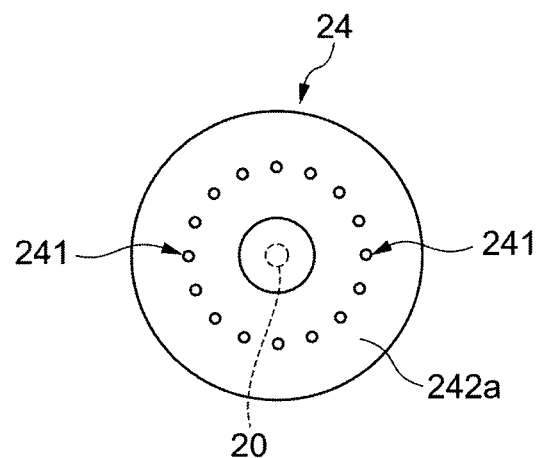
FIG. 12(a) is a front view of the air jetting means used in the nanofiber production apparatus shown in FIG. 10.
Figure 12B:
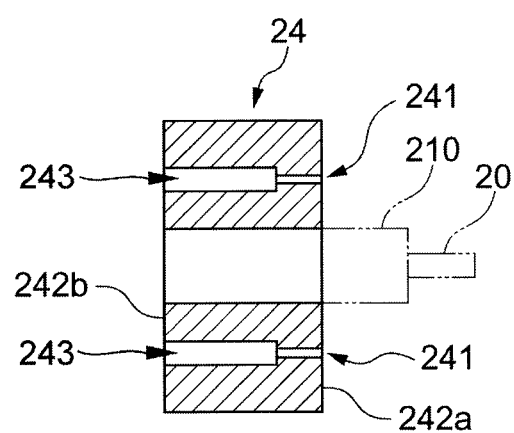
FIG. 12(b) is a cross-sectional view of the air jetting means taken along the longitudinal direction of the nozzle.

FIG. 11 is an exploded perspective view of the essential part of FIG. 10. As shown in FIG. 11, the manifold member 24 has the general shape of a hollow cylinder. A nozzle front portion 210 including the nozzle 20 is inserted through the hollow of the cylinder. As shown in FIGS. 12(a) and (b), the manifold member 24 having the general shape of a hollow cylinder has two opposite annular sides 242a and 242b and a number of air jet holes 241 open on the front side 242a. The air jet holes 241 extend in the height direction of the cylinder. The manifold member 24 has a space for keeping air, namely a manifold 243, open on the rear annular side 242b opposite to the front side 242a. The manifold 243 is an annular space. As shown in FIG. 12(b), the manifold 243 connects to the air jet holes 241. As shown in FIG. 10, upon attaching the manifold member 24 to the front of the nozzle assembly 21, the through-holes formed through the nozzle assembly 21 and the manifold 243 connect to each other.

As shown in FIG. 12(a), the air jet holes 241 formed on the front side 242a of the manifold member 24 are arranged in a circle concentric with the nozzle 20 to surround the nozzle 20 when viewed from the front. By such an arrangement, an air stream flows in the space between the electrode 19 and the nozzle 20 without making a gap between jets of air. As a result, the spinning solution jetted from the nozzle 20 is effectively prevented from being attracted to and adhering to the electrode 19, and a voltage to be applied is allowed to be increased to increase the charge quantity of the spinning solution.

When the air jet holes 241 are arranged in a concentric circle pattern, the pitch circle radius is preferably 6 mm or more, more preferably 7.5 mm or more, so as to generate an air stream with no gaps between the individual air jets around the nozzle 20 without causing interference with the nozzle 20. The pitch circle radius is preferably 15 mm or less, more preferably 12.5 mm or less, so as to effectively prevent a back-flow of air at the tip of the nozzle 20 thereby to accomplish spinning. From the same viewpoint, the pitch circle radius preferably ranges from 6 mm to 15 mm, more preferably from 7.5 mm to 12.5 mm.

When the air jet holes 241 are arranged in a concentric circle pattern, the center angle between adjacent air jet holes 241 is preferably 5° or more, more preferably 8° or more, so as to make an air stream around the nozzle without gaps between air jets and to hold down the shaping cost. The center angle is preferably 60° or less, more preferably 30° or less, so that an air stream may flow between the electrode 19 and the nozzle 20 without leaving gaps between adjacent air jets and that the spinning solution jetted from the nozzle 20 is effectively prevented from being attracted to and adhering to the electrode. Furthermore, a higher voltage is allowed to be applied to increase the amount of charge of the spinning solution. From the same viewpoint, the center angle between adjacent air jet holes preferably ranges from 5° to 60°, more preferably 8° to 30°.

The air jet hole 241 is a generally pillar-like space, for example, a generally columnar space, the diameter of which is preferably 0.1 mm or more, more preferably 0.3 mm or more, and preferably 1.5 mm or less, more preferably 1.2 mm or less. Specifically, the diameter is preferably 0.1 mm to 1.5 mm, more preferably 0.3 mm to 1.2 mm. By this design, air is jetted while minimizing pressure loss; a sufficient flow rate of air to blow off the spinning solution jetted from the nozzle 20 to the collecting means is secured, thereby enabling spinning; and the air consumption is held down.

The apparatus 610 according to the embodiment of FIGS. 10 through 12 achieves jetting air in the same direction as the direction in which the nozzle 20 extends. Therefore, applying too much force to the spinning solution is prevented effectively, and the spinning solution is less likely to break off, bringing about improved nanofiber productivity.

Figure 13:
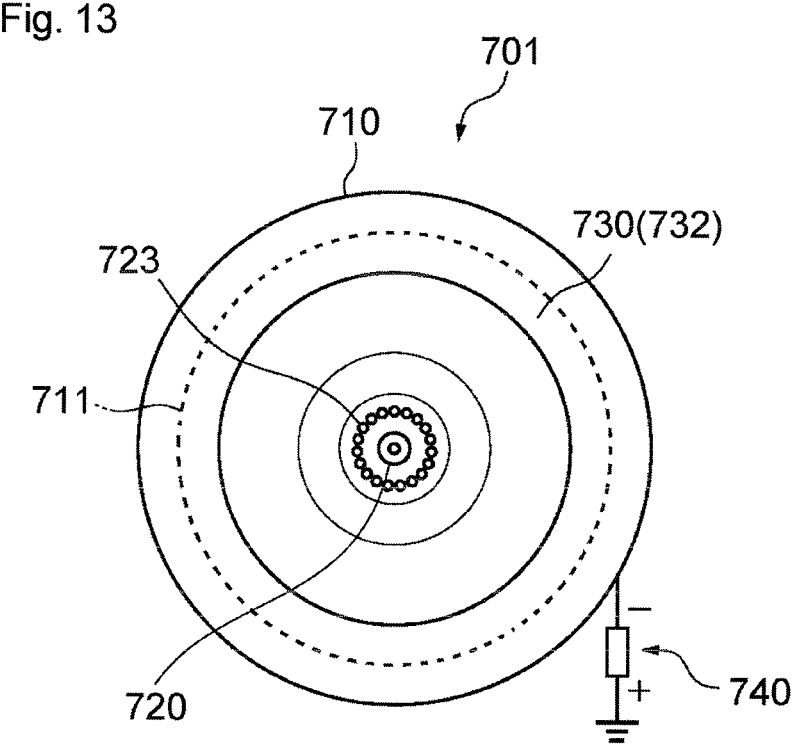
FIG. 13 is a front view of an embodiment of the electrospinning device of the invention.
Figure 14:
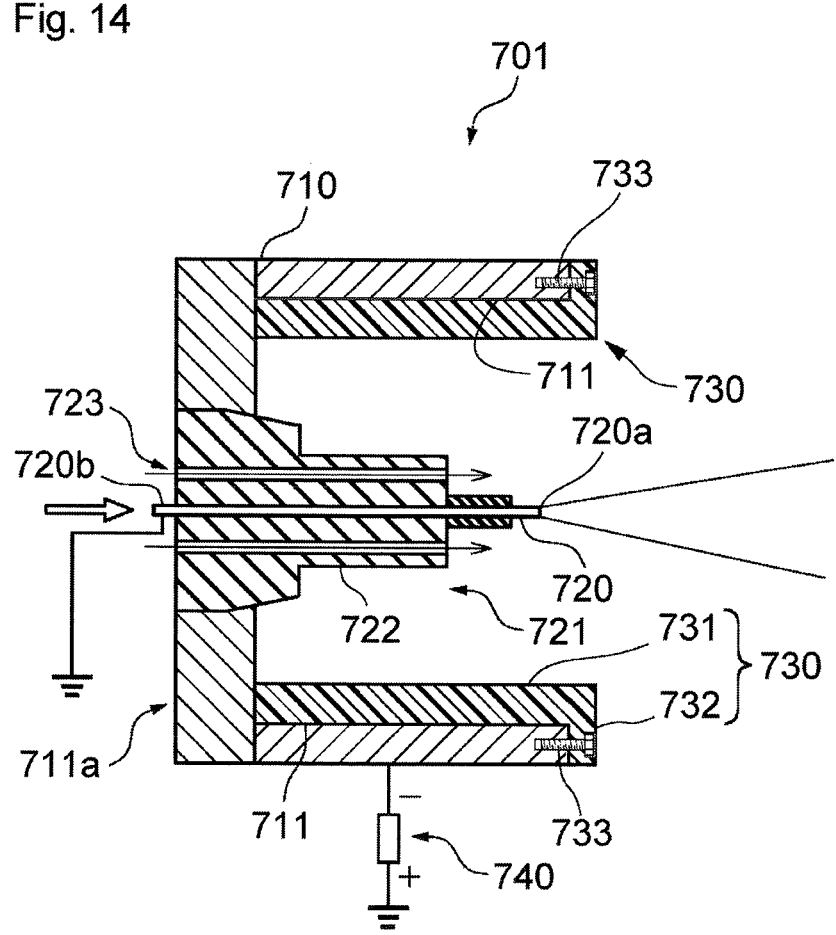
FIG. 14 is a schematic cross-sectional view of the electrospinning device shown in FIG. 13.

FIG. 13 is a front view of still another embodiment of the electrospinning device of the invention. FIG. 14 is a schematic cross-section of the electrospinning device shown in FIG. 13. An electrospinning device 701 shown in FIG. 13 includes an electrode 710 and a spinning solution jetting nozzle 720. Unless the context specifically states otherwise, the description about the embodiments shown in FIGS. 1 through 12 applies equally to the embodiment of FIGS. 13 to 17.

The electrode 710 has a hollow cylindrical shape as a whole, and has a cylindrical concave curved surface 711 on its inner wall. As long as the electrode 710 has a concave curved surface 711 on its inner wall, the electrode 710 does not need to have the general shape of a hollow cylinder as a whole and may have other shapes. The cylindrical concave curved surface 711 is formed of a conductive material and is usually made of metal. The electrode 710 is connected to a high direct voltage power source 740 as shown in FIGS. 13 and 14.

Figure 16:
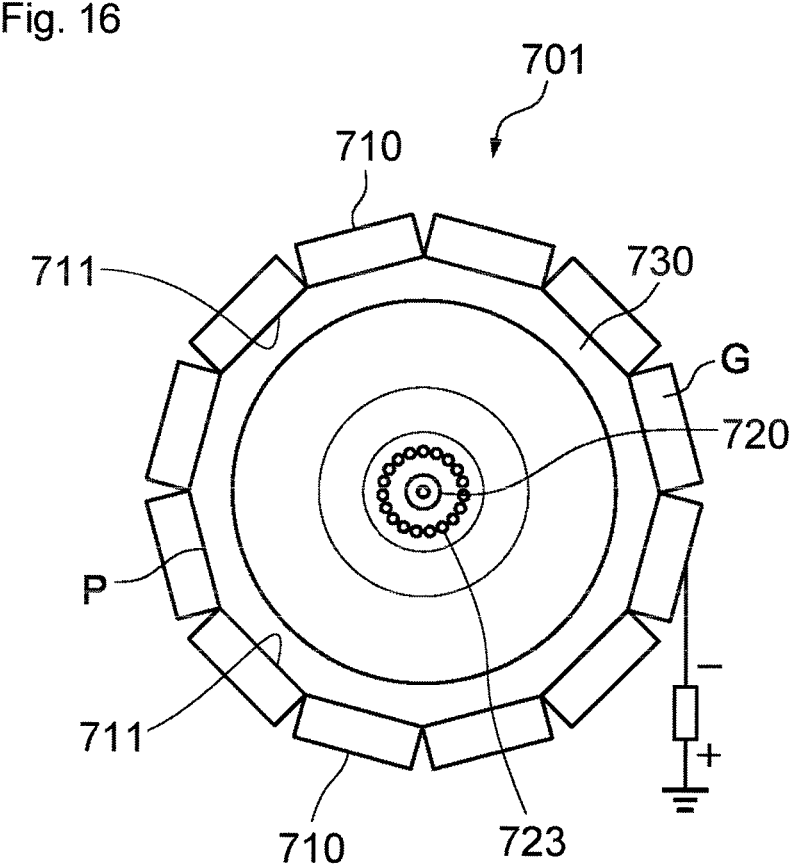
FIG. 16 is a schematic cross-sectional view of another embodiment of the electrospinning device of the invention (equivalent to FIG. 13).

The open end of the cylindrical concave curved surface 711 is circular when viewed from the open end side. As used herein, the term "circular" includes not only true circular but also elliptic. In order to concentrate the electric charges at the tip of the nozzle 720, the shape of the open end of the cylindrical concave curved surface 711 is preferably true circular as will be discussed. The cylindrical concave curved surface 711 has a curved surface at any position. As used herein, the term "curved surface" denotes either one of (i) a curved surface having no flat portion and (ii) a concave, seemingly curved surface that is formed by connecting a plurality of segments G each having a flat surface P as shown in FIG. 16. In the case of (ii), the concave curved surface 711 is preferably formed by connecting segments G each having a rectangular flat surface of the same or different sizes, e.g., having a length and a width which independently range from about 0.5 mm to 150 mm.

The cylindrical concave curved surface 711 preferably has such curvature that, a normal at any position on a line of intersection between the concave curved surface 711 and a plane containing the tip 720a of the nozzle and perpendicular to the axial direction of the cylinder passes at or near the tip of the nozzle 720. From that viewpoint, a cross-section of the cylindrical concave curved surface 711 taken along a plane perpendicular to its axial direction is preferably a true circle.

The electrode 710, the inner wall of which is cylindrical as a whole, may be made by cutting a metallic pipe to length, drilling a concentric through-hole through a solid metallic cylinder, joining semicircular hollow cylinders, or being a flat plate into a cylinder. Such a cylindrical electrode is made through simple machining at low cost.

The cross-section of the inner surface taken perpendicular to the axial direction of the electrode 710 may be an ellipse or may have a small irregularity resulting from bending of a plate, but is preferably a true circle to enable concentration of the electric field at the nozzle tip 720*a* thereby to increase the charge quantity.

When the electrode 710 is made by joining semicircular cylinders or bending a flat plate into a cylinder, the edges of the workpiece(s) to be joined together do not need to be joined over their full length but are preferably joined together without leaving any unjoined gap so that the electric field may be centered at the nozzle tip 720*a* to secure an increased charge quantity.

When the cross-section of the inner surface of the electrode 710 taken perpendicular to the axial direction is circular or elliptic, the eccentricity of the circle or ellipse is preferably 0 to less than 0.6, more preferably 0 to less than 0.3, even more preferably 0 (=eccentricity of a true circle), so that the electric field may be centered at the nozzle tip 720*a* to secure an increased charge quantity.

The axial length of the electrode 710 is preferably 10 mm or more, more preferably 20 mm or more, even more preferably 30 mm or more. With that length of the electrode 710, a strong electric field is generated between the nozzle tip 720*a* and the electrode 710 to provide a large charge quantity. The upper limit of the length is preferably 150 mm, more preferably 80 mm, even more preferably 60 mm. With the length less than that, the spinning solution jetted from the nozzle tip 720*a* into the form of fiber is less likely to adhere to the electrode 710. For example, the length of the electrode 710 is preferably 10 mm to 150 mm, more preferably 20 mm to 150 mm, even more preferably 20 mm to 80 mm, yet more preferably 30 mm to 80 mm, still yet more preferably 30 mm to 60 mm. When the length of the electrode 710 is within that range, the electric field is efficiently centered at the tip 720*a* of the nozzle 720 to increase the charge quantity.

When the cross-section of the inner surface of the electrode 710 taken perpendicular to the axial direction of the electrode 710 is a circle, the radius of the circle is preferably 10 mm or more, more preferably 20 mm or more, even more preferably 30 mm or more. With that radius, the spinning solution jetted from the nozzle tip 720*a* into the form of fiber is less likely to adhere to the electrode 710. The upper limit of the radius is preferably 200 mm, more preferably 100 mm, even more preferably 50 mm. With that radius, a strong electric field is generated between the nozzle tip 720*a* and the electrode 710 to provide a large charge quantity. For example, the radius of the cylindrical concave curved surface 711 of the electrode 710 is preferably 10 mm to 200 mm, more preferably 20 mm to 100 mm, even more preferably 30 mm to 50 mm. When the inner radius of the electrode 710 is within that range, the electric field is efficiently centered at the tip 720*a* of the nozzle 720 to increase the charge quantity. Additionally, even when a plurality of the electrospinning devices 701 are adjacently arrayed, their electric fields do not interfere with each other. As used herein, the term "radius" is defined to be the distance between the nozzle 720 and the electrode 710 on a plane perpendicular to the axial direction of the electrode 710.

As shown in FIGS. 13 and 14, the other end of the cylindrical concave curved surface 711 (the bottom of the electrode 710) has an opening, into which a nozzle assembly 721 is fitted. The nozzle assembly 721 includes the nozzle 720 and a support 722 supporting the nozzle 720. The electrode 710 and the nozzle 720 are electrically insulated from each other by the support 722. The nozzle 720 has its tip 720*a* exposed in the inner space of the electrode 710, and has its rear end 720*b* exposed on the side opposite to the open-ended side of the electrode 710. The rear end 720*b* connects to a stock spinning solution supply (not shown).

The nozzle 720 is grounded as shown in FIG. 14. Since a negative voltage is applied to the electrode 710, an electric field generates between the electrode 710 and the nozzle 720. Instead of the way of voltage application shown in FIG. 14, a positive electrode may be applied to the nozzle 720, and the electrode 710 may be grounded.

The electrospinning device 701 of the embodiment achieves charging using the principle of electrostatic induction. Electrostatic induction is a phenomenon that causes a conducting object in a stable state to be polarized when a charged object is brought near the uncharged conducting object. For example, if a positively charged object is brought near the conducting object, internal negative charges in the conducting object will be attracted toward it, while internal positive charges move away from it. With the charged object near the conducting object, when the positively charged side of the conducting object is connected to ground, the internal positive charges are electrically neutralized, and the conducting object becomes a negatively charged object. In the embodiment shown in FIGS. 13 and 14, since the electrode 710 is used as a negatively charged object, the nozzle 720 becomes a positively charged object. Therefore, while a spinning solution flows in the positively charged nozzle 720, positive charges are supplied from the nozzle 720 to positively charge the spinning solution.

In the embodiment, the charge quantity of the spinning solution increases by the action of a dielectric 730 as will be described. Moreover, since the electrode 710 of the electrospinning device 701 of the embodiment has a cylindrical concave curved surface 711, the increase in charge quantity of the spinning solution is remarkable. In the electrospinning device 701, an electrode surface that is far larger than the area of the nozzle 720 is provided at substantially the same distance from the tip 720*a* of the nozzle 720. Because the total charge quantity accumulated in the electrode 710 as a negative pole and that accumulated in the nozzle 720 as a positive pole are equal, the charges are distributed on the surface of the nozzle 720 at a much higher density than on the electrode 710 to provide an intensified electric field around the nozzle 720. The thus intensified electric field brings a further increase of charge quantity of the spinning solution. From that viewpoint, the exposed area of the nozzle 720 is preferably as small as possible. In particular, the exposed length of the nozzle 720 (a distance from the support 722 to the tip 720*a* of the nozzle 720) is preferably as short as possible. Specifically, the exposed length of the nozzle 720 is preferably 50 mm or shorter, more preferably 10 mm or shorter, even more preferably 5 mm or shorter. For the electrode 710 to have the cylindrical concave curved surface 711 is also advantageous in that the bulk of the electrode is made smaller compared with a flat-shape electrode, and so is the electrospinning device 701 in size. Moreover, the device 701 has no moving member unlike the electrospinning device of Patent Literature 3 cited supra. This is advantageous in that the device is not complicated.

In order to further concentrate the charges at the tip 720a of the nozzle 720, it is preferred that the nozzle 720 be set in such a manner that the direction in which it extends passes through or near the center of the circle defined by the open end of the cylindrical concave curved surface 711 of the electrode 710 and that the tip 720a of the nozzle 720 is located in the plane containing the circle defined by the open end of the concave curved surface 711. It is particularly preferred that the tip 720a of the nozzle 720 be positioned at a radial distance of 10 mm or less, more preferably 5 mm or less, from the center of the circle defined by the open end, most preferably at the center of the circle.

For the same purpose, it is preferred that the tip 720a of the nozzle 720 be positioned at or near the center of a circular cross-section of the cylindrical electrode 710 taken perpendicular to the axial direction of the cylindrical electrode 710 and, be positioned, with respect to the position in the axial direction, within the columnar space of the cylinder. In particular, when seen along the axial direction of the cylindrical electrode 710, tip 720a of the nozzle 720 is preferably located within the columnar space of the cylinder, and is preferably located between the front end of the electrode 710 (the end on the side from which the spinning solution comes out) and the longitudinal center of the axis of the cylinder. Specifically, the tip 720a of the nozzle 720 is preferably located within the space inward of the plane defined by the open end of the cylindrical concave curved surface 711 of the electrode 710 and near the plane. The term "near the plane" as used above is intended to mean that less than r/5 inward of the center of the circle defined by the open end of the cylindrical concave curved surface 711 of the electrode 710, wherein r is a radius of that circle. Specifically, the nozzle tip 720a is preferably located 1 mm to 20 mm, more preferably 1 mm to 15 mm, even more preferably 1 mm to 10 mm, inward of the plane. By so positioning the tip 720a of the nozzle 720, the spinning solution is ready to travel forward of the open end of the cylindrical electrode; the spinning solution jetted from the tip 720a of the nozzle 720 is less likely attracted to the cylindrical concave curved surface 711 of the electrode 710 to contaminate the concave curved surface 711; and the electric field is concentrated at the tip 720a of the nozzle 720 to increase the charge quantity.

It is desirable, in particular, that the direction in which the nozzle 720 extends pass through or near the center of the circle defined by the open end of the cylindrical concave curved surface 711 of the electrode 710 and also through or near the center of a circle defined by the opposite end of the cylindrical concave curved surface 711. It is especially desirable that the direction in which the nozzle 720 extends be perpendicular to the plane containing the circle defined by the open end of the cylindrical concave curved surface 711. By so setting the nozzle 720, charges are assuredly concentrated at the tip 720a of the nozzle 720. From that point of view, it is particularly preferred for the cylindrical concave curved surface 711 of the electrode 710 to have a true circular shaped.

The radius of the circle defined by the open end of the cylindrical concave curved surface 711 of the electrode 710 being taken as r, upon drawing an imaginary circle having a radius of r/5 on the same plane as, and concentric with, the circle defined by the open end, it is preferred that the direction in which the nozzle 720 extends pass inside the imaginary circle and the bottom 711a of the cylindrical concave curved surface 711. Upon drawing an imaginary circle having a radius of r/10, it is more preferred that the direction in which the nozzle 720 extends pass through inside the imaginary circle having a radius of r/10 and the bottom 711a of the cylindrical concave curved surface 711. It is even more preferred that the direction in which the nozzle 720 extends pass through the center of the circle defined by the open end of the cylindrical concave curved surface 711 and the bottom 711a of the cylindrical concave curved surface 711. When the nozzle 720 is so assembled, the electric field is centered at the tip 720a to generate an increased amount of charge.

As previously discussed, the electrospinning device 701 of the present embodiment is designed to reduce the area of the metallic part (conductive part) of the nozzle 720 that is exposed to the inside space of the electrode 710 and increase the area of the inner surface of the electrode 710, thereby to increase the charge density at the tip 720a of the nozzle 720. From that viewpoint, the ratio of the area of the inner surface of the electrode 710 to the area of the metallic part (conductive part) of the nozzle 720 exposed to the inside space of the electrode 710 is preferably 30 or higher, more preferably 100 or higher, and preferably 90,000 or lower, more preferably 5,000 or lower. For example, the area ratio is preferably 30 to 90,000, more preferably 100 to 5,000. As used herein, the term "area" of the metallic part (conductive part) of the nozzle 720 that is exposed to the inside space of the electrode 710 refers to the area of the lateral surface of the nozzle 720 and does not include the area of the inner wall of the nozzle 720. The "area" of the inner surface of the electrode 710 does not include the area of the opening into which the nozzle assembly 721 is fitted.

The area of the inner surface of the electrode 710 is preferably 500 mm$^2$ or more, more preferably 1000 mm$^2$ or more, and preferably 2000×10$^2$ mm$^2$ or less, more preferably 4000×10$^1$ mm$^2$ or less. For example, the area is preferably 500 mm$^2$ to 2000×10$^2$ mm$^2$, more preferably 1000 mm$^2$ to 4000×10$^1$ mm$^2$. The area of the metallic part (conductive part) of the nozzle 720 exposed to the inside space of the electrode 710 is preferably 2 mm$^2$ or more, more preferably 5 mm$^2$ or more, and preferably 1000 mm$^2$ or less, more preferably 100 mm$^2$ or less. For example, the area is preferably 2 mm$^2$ to 1000 mm$^2$, more preferably 5 mm$^2$ to 100 mm$^2$.

As shown in FIGS. 13 and 14, an air jetting part 723, which is a through-hole, is provided near the support 722 supporting the nozzle 720 of the nozzle assembly 721. The air jetting part 723 extends along the direction in which the nozzle 720 extends. When the nozzle assembly 721 is viewed from the open end side of the electrode 710, there are a plurality of air jetting parts 723 arranged to surround the nozzle 720. The individual air jetting parts 723 are symmetric about the nozzle 720.

The electrospinning device 701 of the embodiment has the above described basic structure. In the device 701, the cylindrical concave curved surface 711 of the electrode 710, which faces the nozzle 720, is covered with a dielectric 730. In the embodiment shown in FIGS. 13 and 14, the dielectric 730 is made of a single kind or two or more kinds of dielectrics.

According to the invention, almost the entire area of the side of the electrode that faces the nozzle is covered with a dielectric. More preferably, the entire area of the side of the electrode facing the nozzle is covered with a dielectric. The term "the side facing the nozzle" means the electrode's surface that can be viewed from the tip of the nozzle (the orifice through which a spinning solution is jetted). More specifically, "the side facing the nozzle" is a series of points at which straight lines drawn from every point on the tip of the nozzle toward the electrode first contact the electrode. As used herein, the phrase "almost the entire area" is intended to mean at least 90% of the entire area of the side, and the phrase "the entire area" means 100% of the entire area of the side. Almost the entire (90% or more) area of the dielectric is made solely of a dielectric. It is preferred that the entire (100%) area of the dielectric be made solely of a dielectric. In other words, it is preferred for the dielectric to have no conductive substance such as metal on its surface. Such a dielectric is typically exemplified by a dielectric consisting of a single kind of a dielectric. The dielectric may be a composite composed of a plurality of dielectric sheets stacked one on top of another or a composite that contains metallic particles, a metallic layer, or a layer of air in the inside thereof (i.e., the portion that is not exposed on the surface) as long as the surface is made solely of a dielectric. For example, an air layer may be present in part of the joint between the electrode and the dielectric. Nevertheless, it is preferred that the electrode and the dielectric be in intimate contact with each other to secure the joint therebetween. In the invention, it is assumed that there is no substance further covering the surface of the dielectric. Should any conductive covering, e.g., of metal exist to cover the surface of the dielectric, the effects of the invention would reduce.

While the electrode 710 shown in FIGS. 13 and 14 has only the side thereof that faces the nozzle 720 covered with the dielectric 730, it is preferred that part of the other sides that do not face the nozzle 720 be also covered with the dielectric 730. It is more preferred that all the sides that do not face the nozzle 720 be covered with the dielectric 730. The "sides that do not face the nozzle" are the sides one cannot view from the nozzle tip 720a (the orifice through which a spinning solution is jetted), more specifically all the sides other than the side that faces the nozzle.

Figure 15:
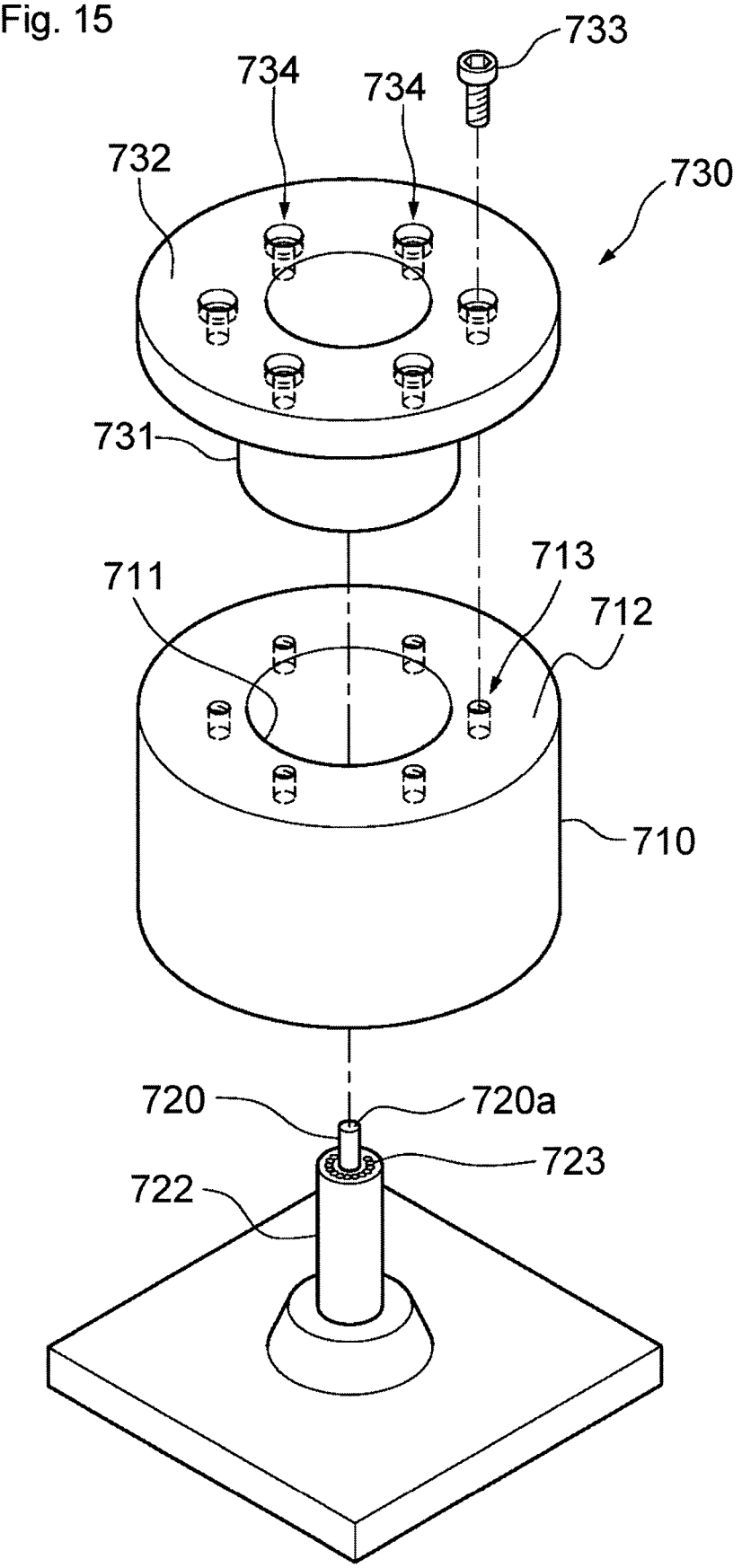
FIG. 15 is an exploded perspective of the electrospinning device shown in FIG. 13.

As shown in FIG. 15, the dielectric 730 and the electrode 710 have mutual mating structures. The dielectric 730 shown is composed of a cylindrical portion 731 matching the concave curved surface 711 of the cylindrical electrode 710 and a flange 732 overhanging horizontally from the upper end of the cylindrical portion 731. On fitting the dielectric 730 into the electrode 710, the flange 732 covers the edge face 712 of one of the open ends of the electrode 710.

With the dielectric 730 fitted along the concave curved surface 711 of the electrode 710, they are secured to each other by a predetermined fastener.

The fastener is preferably made of a dielectric. Electricity does not flow in a dielectric fastener so that lines of electric force emanated from the joint between the electrode 710 and the dielectric 730 can be reduced or eliminated, thereby to prevent disturbance of the electric field between the electrode 710 and the nozzle 720. In the case where the electrode 710 and the dielectric 730 are joined together using the fastener, the dielectric 730 covering the electrode 710 can easily be changed over from one type to another where needed, so that the electrospinning device 701 is easy to operate.

The fastener may be a pressure sensitive adhesive as used in the previously described embodiment. Otherwise, the fastener may be screws 733 as shown in FIG. 15. In using screws 733, the screw 733 may be of a dielectric material that may be the same or different from that making the dielectric 730 or wood. In the embodiment shown in FIG. 15, the screw 733 as a fastener is inserted through a through-hole 734 of the flange 732, the screw 733 is screwed into a screw hole 713 made into the edge face 712 of the one of the open ends of the cylindrical electrode 710 to secure the dielectric 730 to the electrode 710.

Each through-hole 734 is provided with a counterbore having a larger diameter than the head of the screw 733 so that the head of the screw 733 screwed to fasten the electrode 710 and the dielectric 730 may be positioned below the surface of the flange 732 of the dielectric 730 without sticking out of the surface.

The nanofiber production method using the electrospinning device 701 of the embodiment is carried out as follows. With an electric field generated between the electrode 710 and the nozzle 720, a spinning solution is jetted from the tip 720a of the nozzle 720. The spinning solution is charged by electrostatic induction while it is flowing in the nozzle 720 and jetted as it is charged. Because the charges are concentrated at the tip 720a of the nozzle 720, the amount of charge of the spinning solution per unit mass is very large. The thus charged spinning solution at the tip of the nozzle deforms to form a Taylor cone by the action of the electric field. When the electric field strength attracting the spinning solution toward the electrode 710 exceeds the critical surface tension of the spinning solution, a jet of the spinning solution is drawn toward the electrode 710 at a burst. At this time, air is jetted from the air jetting part 723 to the jet of the spinning solution, whereby the jetted stream of the spinning solution decreases in thickness to the order of nano size through chain of self-repulsion. At the same time, the fiber increases in specific surface area, and evaporation of the solvent is thus accelerated. As a result, a nanofiber formed on drying reaches and deposits randomly on a collector (not shown) disposed to face the nozzle 720. To secure deposition of the nanofiber on the collector, a nanofiber-collecting electrode (not shown) may be disposed to face the tip 720a of the nozzle 720, and the collector is disposed between the collecting electrode and the nozzle 720 adjacently to the collecting electrode. It is preferred to apply a voltage of the polarity opposite to the charges of the charged spinning solution to the collecting electrode. For example, when the spinning solution is positively charged, the collecting electrode may be grounded, or a negative voltage is applied to the collecting electrode.

Figure 17:
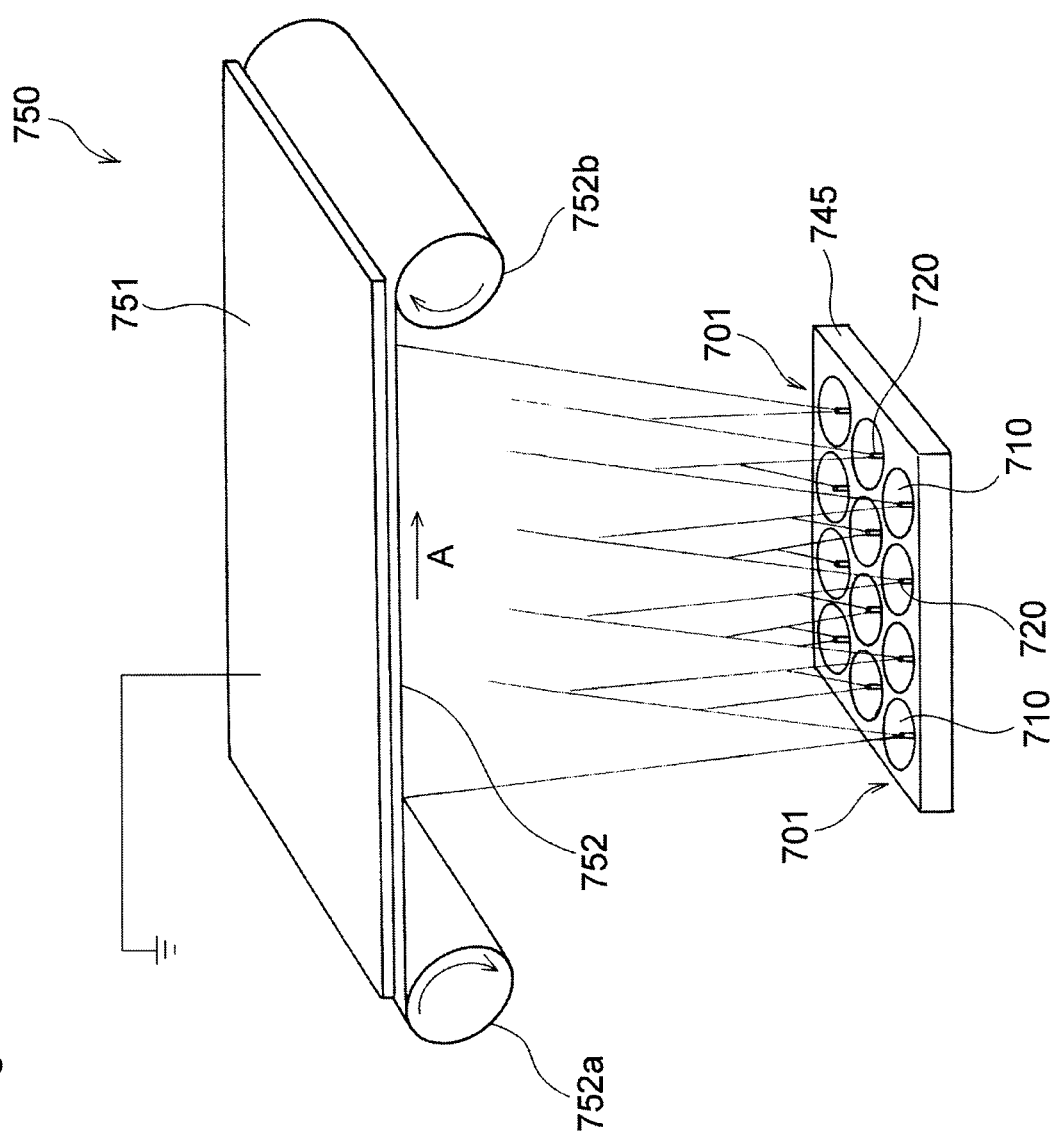
FIG. 17 is a schematic view of a nanofiber production apparatus having the electrospinning device of FIG. 13.

FIG. 17 illustrates an example of a nanofiber-producing apparatus 750 using the electrospinning device 701 of the present embodiment. The production apparatus 750 of FIG. 17 includes a plurality of the electrospinning devices 701 shown in FIGS. 13 and 14. Each electrospinning device 701 is fixed into a plate-shaped base 745. The plurality of the electrospinning devices 701 are arrayed two-dimensionally in the planar direction of the base 745 with their nozzles 720 pointing in the same direction (upward in FIG. 17). In each electrospinning device 701, a negative direct voltage is applied to the electrode 710 while the nozzle 720 is grounded.

Above the electrospinning devices 701 is provided a nanofiber collecting electrode 751 to face the tip 720a of the nozzles 720. The collecting electrode 751 is a plate made of a conductor, such as metal. The main surface of the platy collecting electrode 751 is substantially perpendicular to the direction in which the nozzles 720 extends. As will be described, almost the entire area of the collecting electrode may be covered with a dielectric. Preferably, the entire area of the collecting electrode is covered with a dielectric. As used herein, the phrase "almost the entire area" is intended to mean at least 90% of the entire area, and the phrase "the entire area" means 100% of the entire area. In order to draw positively charged nanofibers toward the collecting electrode, the collecting electrode is given a lower (more negative) potential than the nozzle 720 as a positive pole. To further increase the efficiency of drawing, the collecting electrode is preferably given a lower (more negative) potential than the electrode 711 as a negative pole. The distance between the collecting electrode 751 and the tip 720a of the nozzles 720 is preferably 100 mm or longer, more preferably 500 mm or longer, and preferably 3000 mm or shorter, more preferably 1000 mm or shorter. For example, the distance is preferably 100 mm to 3000 mm, more preferably 500 mm to 1000 mm.

The production apparatus 750 has a collector 752, on which nanofibers are collected, between the collecting electrode 751 and the nozzles 720 adjacently to the collecting electrode 751. The collector 752 has a continuous length and is unrolled from a stock roll 752a. The unrolled collector 752 runs in arrowed direction A in FIG. 17, passes above and in front of the nozzles 720, and is wound in a winder 752b. The collector 752 may be film, mesh, nonwoven fabric, paper, and the like.

In operating the production apparatus 750 shown in FIG. 17, the collector 752 is unrolled and moved in the arrowed direction A, a negative direct voltage is applied to the electrodes 710, and the nozzles 720 and the collecting electrode 751 are ground. In this state, a spinning solution is jetted from the tip 720a of the nozzle 720 while jetting air from the air jetting part 723 of each electrospinning device 701. Nanofibers are formed from the jets of the spinning solution and continuously deposited on the moving collector 752. Having the plurality of electrospinning devices 701, the apparatus 750 is capable of manufacturing a large quantity of nanofibers. Since the jetted spinning solution has an extremely large charge quantity, the rate of jetting the spinning solution is permitted to be increased to produce nanofibers with a thickness equal to that of conventionally produced nanofibers, which also contributes to large volume production of nano fibers.

The spinning solution that can be used in each of the apparatus of the embodiment may be a solution of a fiber-forming polymer dissolved or dispersed in a solvent or a melt of such a polymer prepared by heating the polymer. Electrospinning using a polymer solution as a spinning solution is sometimes called a solution process, and electrospinning using a polymer melt as a spinning solution is sometimes called a melt process. The solution or melt may contain, as appropriate, inorganic particles, organic particles, plant extracts, surfactants, oils, electrolytes for ion concentration adjustment, and so forth.

Examples of the polymers commonly used to produce nanofibers include polypropylene, polyethylene, polystyrene, polyvinyl alcohol, polyurethane, polyethylene oxide, polyethylene terephthalate, polybutylene terephthalate, polyethylene naphthalate, poly-m-phenylene terephthalate, poly-p-phenylene isophthalate, polyvinylidene fluoride, polyvinylidene fluoride-hexafluoropropylene copolymers, polyvinyl chloride, polyvinylidene chloride-acrylate copolymers, polyacrylonitrile, polyacrylonitrile-methacrylate copolymers, polycarbonate, polyallylate, polyester carbonate, nylon, aramid, polycaprolactone, polylactic acid, polyglycolic acid, collagen, polyhydroxybutyric acid, polyvinyl acetate, and polypeptide. These polymers may be used either individually or as a mixture of two or more thereof.

In using a solution having a polymer dissolved or dispersed in a solvent, examples of useful solvents include water, methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl n-hexyl ketone, methyl n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylylene, p-xylene, m-xylene, acetonitrile, tetrahydrofuran, N,N-dimethylformamide, and pyridine. These solvents may be used either individually or, two or more solvents chosen from the above may be used as a mixture.

When water is used as a solvent, a naturally occurring or synthetic polymer having high water solubility is suitably used. Examples of such a naturally occurring polymer include mucopolysaccharides, e.g., pullulan, hyaluronic acid, chondroitin sulfate, poly-γ-glutamic acid, modified corn starch, β-glucan, gluco-oligosaccharide, heparin, and keratosulfate, cellulose, pectin, xylan, lignin, glucomannan, galacturonic acid, psyllium seed gum, tamarind seed gum, gum arabic, tragacanth gum, soybean water-soluble polysaccharide, alginic acid, carrageenan, laminaran, agar (agarose), fucoidan, methyl cellulose, hydroxypropyl cellulose, and hydroxypropylmethyl cellulose. Examples of water soluble synthetic polymers include partially saponified polyvinyl alcohol, low-saponified polyvinyl alcohol, polyvinylpyrrolidone, polyethylene oxide, and sodium polyacrylate. These polymers may be used either individually or in combination of two or more thereof. Preferred of them are naturally occurring polymers, such as pullulan, and synthetic polymers such as partially saponified polyvinyl alcohol, low-saponified polyvinyl alcohol, polyvinylpyrrolidone, and polyethylene oxide in view of ease of nanofiber production.

Polymers that are not so soluble in water are also useful, including completely saponified polyvinyl alcohol that is insolubilizable after formation of nanofiber, partially saponified polyvinyl alcohol that is crosslinkable in the presence of a crosslinking agent after formation of nanofiber, oxazoline-modified silicones (e.g., a poly(N-propanoylethyleneimine) grafted dimethylsiloxane/γ-aminopropylmethylsiloxane copolymer), zein (main component of maize protein), polyesters, polylactic acid (PLA), acrylic resins (e.g., polyacrylonitrile resins and polymethacrylic acid resins), polystyrene resins, polyvinyl butyral resins, polyethylene terephthalate resins, polybutylene terephthalate resins, polyurethane resins, polyamide resins, polyimide resins, and polyamideimide resins. These water insoluble polymers may be used either individually or in combination of two or more thereof.

The nanofiber produced using the apparatus of the above described embodiments usually has a thickness of 10 nm to 3000 nm, preferably 10 nm to 1000 nm, in terms of circle equivalent diameter. The thickness of nanofibers is measured by, for example, observation using a scanning electron microscope (SEM).

The nanofiber produced using the nanofiber producing apparatus of the invention can be deposited into nanofiber structures for various applications. The nanofiber structure may have the form of sheet, fluffy aggregate, string, and the like. The nanofiber structure may be combined with other sheets or various liquids, fine particles, or fibers according to use. For example, a nanofiber sheet is suited for use as attached to human skin, tooth, or gum for medical or non-medical purposes (for example, for cosmetic purpose).

A nanofiber sheet is also suited for use as a high performance filter having high dust collecting capacity and low pressure loss, a separator for batteries that is permitted for use at a high current density, a cell culture substratum having a highly porous structure, and so on. A nanofiber fluffy aggregate is suitable as a sound absorbing material, a heat insulating material, and the like.

While the invention has been described based on its preferred embodiments, it should be understood that the invention is not limited to these embodiments. For example, the nozzle 13 of the embodiment shown in FIG. 1 may be a bent tube having a curvature. While the concave curved surface R of the electrode 19 of the embodiment shown in FIGS. 3 and 4 preferably has the shape of the inner surface of a hemispherical shell, it may have the shape of the inner surface of a spherical crown shell.

While in the embodiment shown in FIGS. 3 and 4 the nozzle 20 is disposed at the bottom of the concave curved surface R, it may be set at other locations.

When in the embodiment shown in FIGS. 13 to 16, the nozzle 720 is located at one of the open ends of the cylinder, it may be set at other locations.

Figure 18:
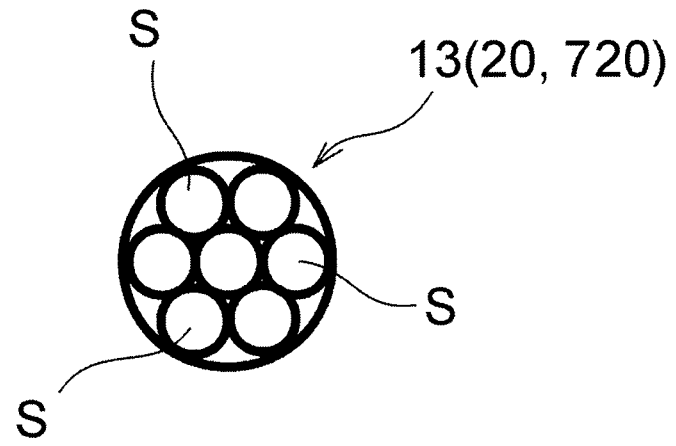
FIG. 18 is a schematic transverse cross-sectional view of a nozzle.

In each of the foregoing embodiments, as shown in FIG. 18, the nozzle 13 (or 20 or 720) may be divided, in its transverse cross-section, into a plurality of sections S, through each of which the spinning solution is made to flow. In this modification, the contact area between the spinning solution and the inner wall of the nozzle increases, thereby facilitating electric charging of the spinning solution. In the case when the nozzle is divided, in its transverse cross-section, into a plurality of sections S, the term "inner diameter" as referred to above with respect to the nozzle means the inner diameter of each section S. The shape and inner diameter of the sections may be the same or different.

constituent features discussed herein are interchangeable between the aforementioned embodiments as long as the advantageous effects of the invention are not impaired. For example, the air jetting means 15A shown in FIG. 8 may be used in the embodiment of FIG. 7.

With regards to the above embodiments, the following nanofiber production apparatus are further disclosed.

[1]
An apparatus for producing a nanofiber comprising:
a spinning solution jetting means having a conductive nozzle for jetting a stock spinning solution for nanofiber production,
an electrode located away from the nozzle,
a voltage generating means generating a voltage between the nozzle and the electrode,
an air jetting means located at such a position as to direct an air jet between the nozzle and the electrode, and
a nanofiber collecting means,
the voltage generating means generating a voltage in such a manner that the nozzle serves as a positive pole and the electrode as a negative pole,
the electrode being covered, on almost the entire area of the side, facing the nozzle, of the electrode with a covering having a dielectric exposed on the surface of the covering, and
the dielectric exposed on the surface of the covering having a thickness of 0.8 mm or greater.

[2]
The apparatus for producing a nanofiber according to clause [1], wherein the electrode is further covered, on part of or all of the other sides that do not face the nozzle, with a covering having a dielectric exposed on the surface of the covering.

[3]
The apparatus for producing a nanofiber according to clauses [1] or [2], wherein the nozzle is covered, on almost the entire area of the outer side of the nozzle, with a covering having a dielectric exposed on the surface of the covering, and the covering extends beyond the tip of the nozzle.

[4]
An apparatus for producing a nanofiber comprising:
a spinning solution jetting means having a conductive nozzle for jetting a stock spinning solution for nanofiber production,
an electrode located away from the nozzle,
a voltage generating means generating a voltage between the nozzle and the electrode,
an air jetting means located at such a position as to direct an air jet between the nozzle and the electrode, and
a nanofiber collecting means,
the voltage generating means generating a voltage in such a manner that the nozzle serves as a positive pole and the electrode as a negative pole,
the nozzle being covered, on almost the entire area of the outer side of the nozzle, with a covering having a dielectric exposed on the surface of the covering, and the covering extending beyond the tip of the nozzle.

[5]
An apparatus for producing a nanofiber comprising:
a spinning solution jetting means having a conductive nozzle for jetting a stock spinning solution for nanofiber production,
an electrode located away from the nozzle,
a voltage generating means generating a voltage between the nozzle and the electrode,
an air jetting means located at such a position as to direct an air jet between the nozzle and the electrode, and
a nanofiber collecting means,
the voltage generating means generating a voltage in such a manner that the nozzle serves as a negative pole and the electrode as a positive pole, and
the nozzle being covered, on almost the entire area of the outer side of the nozzle, with a covering having a dielectric exposed on the surface of the covering.

[6]
The apparatus for producing a nanofiber according to clause [5], wherein the covering extends beyond the tip of the nozzle.

[7]
The apparatus for producing a nanofiber according to clause [5] or [6], wherein the electrode is covered, on almost the entire area of the side, facing the nozzle, of the electrode with a covering having a dielectric exposed on the surface of the covering.

[8]
The apparatus for producing a nanofiber according to clause [7], wherein the electrode is further covered, on part of or all of the other sides that do not face the nozzle, with a covering having a dielectric exposed on the surface of the covering.

[9]
An apparatus for producing a nanofiber comprising:
a spinning solution jetting means having a conductive nozzle for jetting a stock spinning solution for nanofiber production,
an electrode located away from the nozzle,
a voltage generating means generating a voltage between the nozzle and the electrode,
an air jetting means located at such a position as to direct an air jet between the nozzle and the electrode, and a nanofiber collecting means, the voltage generating means generating a voltage in such a manner that the nozzle serves as a negative pole and the electrode as a positive pole, the electrode being covered, on almost the entire area of the side, facing the nozzle, of the electrode with a covering having a dielectric exposed on the surface of the covering, and the dielectric exposed on the surface of the covering having a thickness of 0.8 mm or greater.

[10]

The apparatus for producing a nanofiber according to clause [9], wherein the electrode is further covered, on part of or all of the other sides that do not face the nozzle, with a covering having a dielectric exposed the surface of the covering.

[11]

The apparatus for producing a nanofiber according to any one of clauses [1] to [10], wherein the collecting means has a collecting electrode, and the collecting electrode is covered, on almost the entire area of the collecting electrode, with a covering having a dielectric exposed on the surface of the covering.

[12]

An apparatus for producing a nanofiber comprising:
a spinning solution jetting means having a conductive nozzle for jetting a stock spinning solution for nanofiber production,
an electrode located away from the nozzle,
a voltage generating means generating a voltage between the nozzle and the electrode,
an air jetting means located at such a position as to direct an air jet between the nozzle and the electrode, and
a nanofiber collecting means,
the collecting means having a collecting electrode, the collecting electrode being covered, on almost the entire area of the collecting electrode, with a covering having a dielectric exposed on the surface of the covering.

[13]

The apparatus for producing a nanofiber according to any one of clauses [2] to [8] and [10] to [12], wherein the dielectric exposed on the surface of the covering has a thickness of 0.8 mm or greater.

[14]

The apparatus for producing a nanofiber according to any one of clauses [1] to [13], wherein the dielectric exposed on the surface of the covering has a thickness of 8 mm or greater.

[15]

The apparatus for producing a nanofiber according to any one of clauses [1] to [14], wherein the dielectric exposed on the surface of the covering preferably has a thickness of 0.8 mm or more, more preferably 2 mm or more, even more preferably 8 mm or more, and preferably 25 mm or less, more preferably 20 mm or less, even more preferably 15 mm or less, and, when the covering is made of a single kind or two or more kinds of dielectrics, the thickness of the covering is preferably 0.8 mm to 25 mm, more preferably 2 mm to 20 mm, even more preferably 8 mm to 15 mm.

[16]

The apparatus for producing a nanofiber according to any one of clauses [1] to [15], wherein the electrode is plate-like.

[17]

The apparatus for producing a nanofiber according to any one of clauses [1] to [16], wherein the air jetting means is located at such a position as to jet air between the nozzle and the electrode, a nanofiber formed from the spinning solution travels from the nozzle toward the electrode, and the air jetted from the air jetting means changes the travelling direction of the nanofiber to carry the nanofiber to the collecting means while drawing the nanofiber.

[18]

The apparatus for producing a nanofiber according to any one of clauses [1] to [15], wherein the electrode has a concave spherical shape.

[19]

The apparatus for producing a nanofiber according to clause [18], wherein the concave curved surface of the electrode is a curved surface having no flat portion, a concave, seemingly curved surface formed by connecting a plurality of segments each having a flat surface, or a concave, seemingly curved surface formed by connecting a plurality of annular segments each having a belt-like portion with no curvature on one of three perpendicular axes.

[20]

The apparatus for producing a nanofiber according to clause [18] or [19], wherein the concave curved surface of the electrode has such a curvature that a normal at any position of the concave curved surface passes through or near the tip of the nozzle.

[21]

The apparatus for producing a nanofiber according to any one of clauses [18] to [20], wherein the nozzle is preferably disposed in such a manner that the direction in which the nozzle extends passes through or near the center of the circle defined by the open end of the concave curved surface of the electrode and also passes through or near the center of the opening formed at the bottom of the concave curved surface, and is particularly preferably disposed in such a manner that the direction in which the nozzle extends is perpendicular to the plane containing the circle defined by the open end of the concave curved surface.

[22]

The apparatus for producing a nanofiber according to any one of clauses [18] to [21], wherein the nozzle is preferably set up in such a manner that the tip of the nozzle is positioned in, or inward of, the plane containing the circle defined by the open end of the concave curved surface of the electrode.

[23]

The apparatus for producing a nanofiber according to any one of clauses [18] to [22], wherein the air jetting means is provided along the direction in which the nozzle extends, and is configured to jet air toward the tip of the nozzle, and a plurality of the air jetting means are arranged so as to surround the nozzle when seen from the open end side of the electrode, and the air jetting means are symmetric about the nozzle.

[24]

The apparatus for producing a nanofiber according to clause [22], wherein the tip of the nozzle is located 1 to 10 mm inward of the plane. [25]

The apparatus for producing a nanofiber according to any one of clauses [1] to [15], wherein the electrode has a cylindrical shape. [26]

The apparatus according for producing a nanofiber to clause [25], wherein the electrode has a generally cylindrical inner surface, the tip of the nozzle is positioned at or near the center of a cross-section of the electrode taken perpendicular to the axial direction of the electrode, and is positioned, with respect to the position in the axial direction of the electrode, within the hollow columnar space defined by the cylindrical inner surface.

[27]

The apparatus for producing a nanofiber according to clause [25] or [26], wherein the circle or ellipse of a cross-section of the electrode taken in the direction perpendicular to the axial direction of the electrode has an eccentricity of 0 to less than 0.6, and is preferably a true circle having an eccentricity of 0.

[28]

The apparatus for producing a nanofiber according to any one of clauses [25] to [27], wherein the radius of the electrode is preferably 20 mm to 100 mm, more preferably 30 mm to 50 mm, the radius being defined to be the distance between the nozzle and the electrode in a cross-section of the electrode perpendicular to the axial direction of the electrode.

[29]

The apparatus for producing a nanofiber according to any one of clauses [25] to [28], wherein the axial length of the cylindrical electrode is 20 mm to 150 mm, preferably 30 mm to 80 mm.

[30]

The apparatus for producing a nanofiber according to any one of clauses [25] to [29], wherein the electrode has a generally cylindrical inner surface, the tip of the nozzle is located in the plane containing the circle defined by the open end of the cylindrical inner surface, and the tip of the nozzle is positioned within 10 mm from the center of the circle defined by the open end.

[31]

The apparatus for producing a nanofiber according to any one of clauses [25] to [30], wherein the tip of the nozzle is located, with respect to the position in the axial direction of the cylindrical electrode, within the columnar space of the cylinder, and is located between: the front end, on the side from which the spinning solution comes out, of the electrode; and the longitudinal center of the axis of the cylinder.

[32]

The apparatus for producing a nanofiber according to any one of clauses [25] to [31], wherein the air jetting means is provided along the direction in which the nozzle extends, and is configured to jet air toward the tip of the nozzle, a plurality of the air jetting means are arranged so as to surround the nozzle when seen from the open end side of the electrode, and the plurality of air jetting means are symmetric about the nozzle.

[33]

The apparatus for producing a nanofiber according to any one of clauses [25] to [32], wherein the electrode is covered with a dielectric on the entire area of the electrode.

[34]

The apparatus for producing a nanofiber according to any one of clauses [25] to [33], wherein the dielectric preferably has a thickness of 0.8 mm or more, more preferably 2 mm or more, even more preferably 8 mm or more, preferably 25 mm or less, more preferably 20 mm or less, even more preferably 15 mm or less, preferably 0.8 mm to 25 mm, more preferably 2 mm to 20 mm, and even more preferably 8 mm to 15 mm.

[35]

The apparatus for producing a nanofiber according to any one of clauses [25] to [34], wherein the tip of the nozzle is located 1 mm to 10 mm inward of the plane defined by the open end of the cylindrical shape of the concave curved surface of the electrode.

[36]

The apparatus according to any one of clauses [1] to [35], wherein the dielectric is at least one material selected from alumina, Bakelite, nylons, and vinyl chloride resins.

[37]

The apparatus according to any one of clauses [1] to [36], wherein the dielectric is nylon.

[38]

The apparatus according to any one of clauses [1] to [37], wherein the distance between the tip of the nozzle and the electrode is preferably 20 mm or more, more preferably 30 mm or more, preferably 100 mm or less, more preferably 50 mm or less, for example, preferably 20 mm to 100 mm, and more preferably 30 mm to 50 mm.

[39]

The apparatus according to any one of clauses [1] to [38], wherein the flow rate of the air jet is preferably 200 m/sec or more, more preferably 250 msec or more, preferably 600 m/sec or less, more preferably 530 msec or less, preferably 200 msec to 600 m/sec, and more preferably 250 msec to 530 msec.

[40]

The apparatus according to any one of clauses [3], [4], and [6], wherein the extension, which extends beyond the tip of the nozzle, of the covering is a hollow cylinder surrounding the nozzle, and the hollow of the extension connects to the hollow of the nozzle.

[41]

The apparatus according to any one of clauses [3], [4], and [6], wherein the extension of the covering on the nozzle has a length of 1 mm or more, more preferably 10 mm or more, preferably 15 mm or less, more preferably 12 mm or less, preferably 1 mm to 15 mm, and more preferably 10 mm to 12 mm.

[42]

The apparatus according to any one of clauses [1] to [41], wherein the nozzle preferably has an outer diameter of 300 μm or more, more preferably 400 μm or more, preferably 4000 μm or less, more preferably 3000 μm or less, for example, preferably 300 μm to 4000 μm, more preferably from 400 μm to 3000 μm.

[43]

The apparatus according to any one of clauses [1] to [42], wherein the nozzle preferably has a length of 50 mm or less, more preferably 10 mm or less, even more preferably 5 mm or less.

[44]

The apparatus according to any one of clauses [1] to [43], wherein the electrode or the nozzle is covered with the covering on almost the entire area thereof (90% or more of the entire area thereof), preferably the entire area thereof (100% of the entire area thereof).

[45]

The apparatus according to any one of clauses [1] to [44], wherein the covering having a dielectric exposed on the surface of the covering has almost the entire area of the surface of the covering (at least 90% of the entire area of the surface) made solely of a dielectric, preferably has the entire area (100% area) of the surface made solely of a dielectric.

[46]

The apparatus according to any one of clauses [1] to [45], wherein the spinning solution is a solution of a fiber-forming polymer dissolved or dispersed in a solvent or a melt of such a polymer prepared by heating the polymer.

[47]

The apparatus according to any one of clauses [1] to [46], wherein the electrode and the covering are joined together using a fastener made of a dielectric.

[48]

The apparatus according to clauses [47], wherein the fastener is made of a dielectric.

[49]

The apparatus according to clause [47] or [48], wherein the fastener is a pressure-sensitive adhesive, a screw made of a dielectric or a screw made of wood.

[50]

The apparatus according to clause [49], wherein the fastener is a screw, and the covering has a screw hole, and the screw hole is provided with a counterbore.

[51]

The apparatus according to any one of clauses [1] to [50], wherein the air jetting means is made of a dielectric.

[52]

The apparatus according to any one of clauses [1] to [51], wherein the air jetting means has a plurality of holes from which air is jetted out, the hole being a slit-like space or a generally pillar-like space, and the air jetting means is set up in such a manner that the holes face the space between the electrode and the nozzle.

[53]

The apparatus according to any one of clauses [1] to [52], wherein the air jetting means has a manifold structure.

[54]

The apparatus according to any one of clauses [1] to [53], wherein the holes are arranged as desired with no restrictions.

[55]

The apparatus according to any one of clauses [1] to [54], wherein the holes are each a generally pillar-like space and are arranged in a staggered pattern having three rows of holes so that an air stream flows without making a gap between jets of air.

[56]

The apparatus according to any one of clauses [1] to [55], wherein the electrode has a concave spherical shape, and the holes of the air jetting means are arranged in a circle concentric with the nozzle when viewed from the front of the open end of the electrode.

[57]

The apparatus according to any one of clauses [1] to [56], wherein the hole formed in the air jetting means has the shape of a circle, an ellipse, a triangle, a tetragon, or a polygon.

[58]

The apparatus according to any one of clauses [1] to [57], wherein the hole formed in the air jetting means has a circular shape preferably with a diameter of 0.1 mm to 1.5 mm, more preferably 0.3 mm to 1.2 mm.

[59]

The apparatus according to any one of clauses [1] to [58], wherein the holes formed in the air jetting means are arranged in a staggered pattern preferably at a pitch of 3 mm to 15 mm, more preferably 5 mm to 12 mm.

[60]

The apparatus according to any one of clauses [1] to [59], wherein the holes formed in the air jetting means are arranged in a circle concentric with the nozzle, the center angle between adjacent holes preferably ranging from 5° to 60°, more preferably 8° to 30°.

[61]

The apparatus according to any one of clauses [1] to [60], wherein the holes formed in the air jetting means are arranged in a circle concentric with the nozzle preferably with a pitch circle radius of 6 mm to 15 mm, more preferably 7.5 mm to 12.5 mm.

[62]

A method for producing a nanofiber comprising using the apparatus according to any one of clauses [1] to [61].

[63]

A nanofiber structure comprising the nanofiber produced by using the apparatus according to any one of clauses [1] to [61].

EXAMPLES

The invention will now be shown in greater detail with reference to Examples, but it should be understood that the invention is not construed as being limited thereto. Unless otherwise noted, all the percents and parts are given by mass.

Examples 1 to 3

The ability of the apparatus 10 shown in FIG. 1 to charge a spinning solution was evaluated as follows. Water was used as a model spinning solution of which the amount of charge was measured. The method for the measurement will be described infra. Because water does not form fibers, charged water is easy to collect and be subjected to the charge quantity measurement by the method described later. The rate of jetting water from the nozzle 13 was 1 g/min. The nozzle 13 was 2 mm in inner diameter and 50 mm in length. The flat surface (the side facing the nozzle 13) of the electrode 14 had an area of 81 cm$^2$ (9 cm by 9 cm) and was entirely covered with a covering 17 of a dielectric selected from nylon (MONOMER CAST Nylon MCA-90-90-10, available from Misumi Corp.), Bakelite (BLA-90-90-10, available from Misumi Corp.), and alumina (CEMN-90-90-10, available from Misumi Corp.). All the dielectrics had a thickness of 10 mm. The distance (shortest distance) between the nozzle 13 and the electrode 14 was 50 mm.

A direct voltage (−20 kV, −30 kV, or −40 kV) was applied between the electrode 14 and the nozzle 13, and the current flowing between the electrode 14 and the nozzle 13 (leakage current) was measured while seeing if a discharge occurred. The leakage current was measured using an ammeter built in a high-voltage power supply (HAR-60R1-LF, available from Matsusada Precision Inc.) used as a voltage generating means. In this test, a spinning solution was not jetted so as to eliminate the influence of the spinning solution on the leakage current. The results obtained are shown in Table 1 below.

Comparative Example 1

Comparative Example 1 presents an example in which the electrode 14 used in Example 1 was not covered with the covering 17. Charging tests were carried out otherwise in the same manner as in Example 1. The results obtained are shown in Table 1.

Comparative Examples 2 to 4

Comparative Examples 2 to 4 present examples in which a covering having a metallic conductive layer exposed on its surface was used as a covering 17. The dielectric used in each of Examples 1 to 3 was further covered with 0.2 mm thick aluminum tape (SLIONTEC®). Examples corresponding to these comparative examples are given in Patent Literature 2. Charging tests were carried out otherwise in the same manner as in Example 1. The results are shown in Table 1.

TABLE 1

|  | Dielectric | Conductive Layer on Dielectric Surface | Leakage Current (μA) | | | Charge Quantity (nC/g) |
|---|---|---|---|---|---|---|
|  |  |  | −20 [kV] | −30 [kV] | −40 [kV] | −5 [kV] |
| Example 1 | MONOMER CAST nylon | no | 0 | 5 | 13 | 20.5 |
| Example 2 | Bakelite | no | 3 | 8 | 16 | 21.0 |
| Example 3 | alumina | no | 5 | 15 | 34 | 21.3 |
| Compara. Example 1 | none | no | 27 | discharge | discharge | 16.2 |
| Compara. Example 2 | MONOMER CAST nylon | yes | 2 | discharge | discharge | 19.7 |
| Compara. Example 3 | Bakelite | yes | 4 | 11 | discharge | 19.8 |
| Compara. Example 4 | alumina | yes | 14 | 38 | discharge | 20.1 |

As is apparent from the comparison between Examples 1 to 3 and Comparative Example 1 shown in Table 1, the apparatus of Examples 1 to 3 had a low leakage current even with a high voltage applied, proving that the electrons flying from the electrode 14 to the nozzle 13 were reduced. In Comparative Example 1, a leakage current markedly increased with an increase in voltage applied, and a discharge occurred when a voltage of −30 kV or −40 kV was applied. The amount of charge of water used as a model spinning solution increased significantly in Examples over that of Comparative Example 1

As is apparent from the comparison between Examples 1 to 3 and Comparative Examples 2 to 4, when a covering having a metallic conductive layer exposed on its surface was used (Comparative Examples 2 to 4), a leakage current increased markedly with voltage application, and a discharge occurred with −40 kV application. In Comparative Examples 2 to 4, the amount of charge of water used as a model spinning solution was lower than those obtained in Examples.

Example 4

The charge quantity of charged water and leakage current were measured in the same manner as in Examples 1 to 3, except for using the apparatus 18 shown in FIGS. 3 and 4.

The concave curved surface R of the electrode 19 was a hemisphere with a radius of 45 mm, and the tip 20*a* of the nozzle 20 was located at the center of the hemisphere. The tip 20*a* was positioned in the plane containing the circle defined by the open end of the concave curved surface R. The direction in which the nozzle extended was coincident with the axis of rotation symmetry of the hemisphere. The entire area of the concave curved surface R and part of the flange 19*a* of the electrode 19 were covered with a 10 mm thick covering 207 made of a dielectric (MONOMER CAST nylon, MC901 cut plate (blue), available from Hakudo Corp.). The other conditions of measurements were the same as in Examples 1 to 3. The results obtained are shown in Table 2 below.

TABLE 2

|  | Dielectric | Conductive Layer on Dielectric Surface | Leakage Current (μA) | | | Charge Quantity (nC/g) |
|---|---|---|---|---|---|---|
|  |  |  | −20 [kV] | −30 [kV] | −40 [kV] | −5 [kV] |
| Example 4 | MONOMER CAST nylon | no | 0 | 4 | discharge | 101 |

As shown in Table 2, although a discharge occurred at a voltage of −40 kV, the leakage current was significantly lower than those in Comparative Examples 1 to 4, proving that a discharge was controlled. Since the electrode 19 had a concave spherical shape, the charge quantity of water was markedly higher than those of Comparative Examples 1 to 4, in which the plate-like electrode 14 was used.

Example 5

The leakage current of the apparatus 10 shown in FIG. 1 was measured, in which the covering 17 was a stack of a plurality of 0.2 mm thick polypropylene sheets. The structure of the apparatus 10 was the same as that used in Examples 1 to 3, except for using polypropylene sheets as the covering 17. The covering 17 used in Example 5 was a stack of four 0.2 mm thick polypropylene sheets or a stack of five 0.2 mm thick polypropylene sheets. The stacked sheets were in intimate contact with each other. Since the covering 17 used here was made of a single kind of a dielectric (polypropylene), the total thickness of the stacked sheets corresponded to the thickness of the dielectric exposed on the surface, which was equal to the thickness of the covering 17. Accordingly, the thickness of the covering 17 composed of four sheets was 0.8 mm, and that composed of five sheets was 1.0 mm.

The entire area of the flat surface of the electrode 14 (the side facing the nozzle 13) was covered with the stack of the polypropylene sheets, and a direct voltage of −40 kV was applied between the electrode 14 and the nozzle 13. The leakage current flowing between the electrode 14 and the nozzle 13 was measured while seeing if a discharge occurred in the same manner as in Examples 1 to 3. The results are shown in Table 3 below.

Comparative Example 5

The same tests as in Example 5 were conducted, except for changing the number of the polypropylene sheets to be stacked to 0, 1, 2, and 3. Accordingly, the thickness of the covering 17 (the thickness of the dielectric exposed on the surface) was 0 mm, 0.2 mm, 0.4 mm, and 0.6 mm, respectively. The results obtained are shown in Table 3.

TABLE 3

|  | Thickness of Polypropylene Covering (mm) | Leakage Current (μA) at −40 [kV] |
|---|---|---|
| Comparative Example 5 | 0 | discharge |
|  | 0.2 | 180 |
|  | 0.4 | 174 |
|  | 0.6 | 142 |
| Example 5 | 0.8 | 115 |
|  | 1.0 | 121 |

Example 6

The apparatus 10 shown in FIG. 1 in which the covering 17 was a Bakelite covering having a thickness of 2 mm, 5 mm, 8 mm, and 10 mm was tested to measure the leakage current and the charge quantity of charged water.

The structure of the apparatus 10 used here was the same as in Examples 1 to 3, except for using a Bakelite sheet with a varied thickness as the covering 17. Since the covering 17 was made of a single kind of a dielectric (Bakelite), the thickness of the dielectric exposed on the surface was equal to the thickness of the dielectric (Bakelite), i.e., the covering 17.

The entire area of the flat surface of the electrode 14 (the side facing the nozzle 13) was covered with the Bakelite covering, and a direct voltage of −40 kV was applied between the electrode 14 and the nozzle 13. The leakage current flowing between the electrode 14 and the nozzle 13 was measured while seeing if a discharge occurred in the same manner as in Examples 1 to 3. Furthermore, the amount of charge of water used as a model spinning solution was measured in the same manner as in Examples 1 to 3. The results are shown in Table 4 below.

TABLE 4

|  | Thickness of Bakelite Covering (mm) | Leakage Current (μA) at −40 [kV] | Charge Quantity (nC/g) at −5 [kV] |
|---|---|---|---|
| Example 6 | 2 | 80 | 16.0 |
|  | 5 | 45 | 15.9 |
|  | 8 | 35 | 19.4 |
|  | 10 | 16 | 21.0 |

Figure 19:
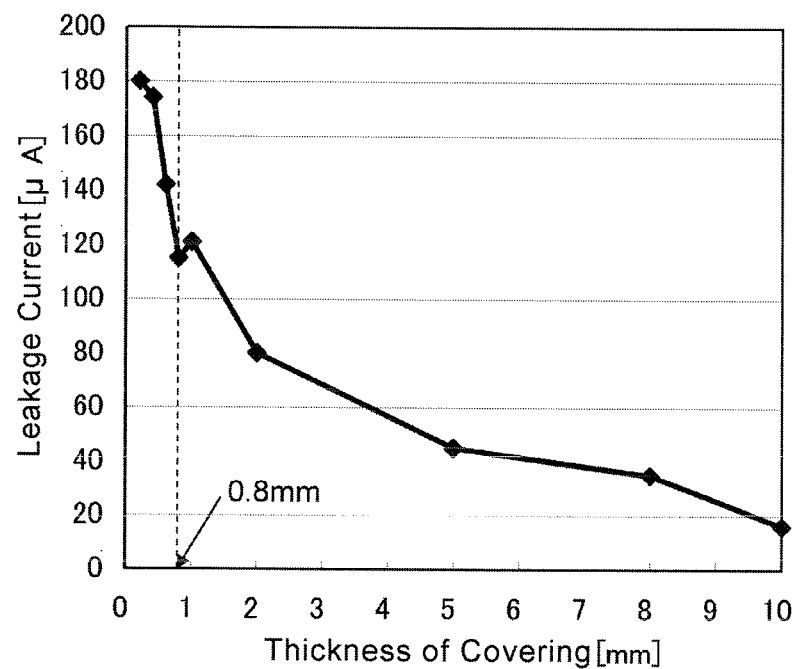
FIG. 19 is a graph showing the relation between the thickness of the covering and a leakage current between the nozzle and the electrode in the nanofiber production apparatus shown in FIG. 1.

The leakage currents in Examples 5 and 6, Comparative Example 5, and Example 6 were plotted against the thickness of the covering 17 (polypropylene or Bakelite) based on the results in Tables 3 and 4 to give the graph of FIG. 19. It is seen from FIG. 19 that the leakage current greatly decreases with an increase in thickness of the covering 17 from 0 mm to 0.8 mm. This proves that emission of electrons from the electrode 14 is effectively reduced when the thickness of the covering 17 that covers the electrode 14 is 0.8 mm or greater. When the covering thickness is further increased from 0.8 mm to 2 mm, the leakage current further decreases, so that occurrence of a discharge between the electrode 14 and the nozzle 13 is reduced, and power consumption due to the leakage current in the nanofiber manufacturing is held down. As can be seen from Table 4, when the thickness of the covering 17 was 8 mm or greater, the amount of charge of water measured at −5 kV increased remarkably, indicating a more noticeable effect of the invention. This is considered to be because for one thing the increase in thickness of the dielectric covering leads to an increase in electrostatic capacity between the nozzle and the electrode and, for another, flying of electrons is reduced owing to the great reduction of leakage current thereby resulting in an increased charge quantity. Such noticeable effects are never obtained by the technique described in Patent Literature 3 (JP 2010-59557A) in which an electrode has a thin dielectric covering.

Example 7

Leakage current measurement was conducted using the apparatus 10 shown in FIG. 1 in which the electrode 14 was not covered with the covering 17 but, instead, the entire area of the outer side of the nozzle 13 was covered with a covering 107.

A 2 mm thick polyvinyl chloride sheet as the covering 107 was applied not only to cover the entire outer side of the nozzle 13 but also to extend 10 mm and 1 mm from the tip of the nozzle 13. The electrode 14 was not covered with the covering 17. Measurement of leakage current and observation of a discharge were carried out in the same manner as in Examples 1 to 3. The results are shown in Table 5.

Comparative Example 6

An apparatus that was the same as used in Example 7 except that the covering 107 covered only the entire outer side or only part of the outer side of the nozzle 13 with no extension from the tip of the nozzle 13 was tested to measure a leakage current.

A 2 mm thick polyvinyl chloride sheet as the covering 107 was applied to cover a part of the outer side of the nozzle 13 having the length of 50 mm that extended 50 mm, 49 mm, and 25 mm from the root (rear end) of the nozzle. The parts covered with the covering will be described as 0 mm, −1 mm, and −25 mm in terms of the length of an extension from the tip of the nozzle for the sake of convenience. For example, a length of the extension of −25 mm means that the part of the nozzle extending 25 mm from the tip of the nozzle 13 was exposed with no covering thereon. Measurement of leakage current and observation of a discharge were carried out in the same manner as in Example 7. The results are shown in Table 5.

TABLE 5

| | Length of Extension (mm) | Leakage Current (µA) | | |
| --- | --- | --- | --- | --- |
| | | −20 [kV] | −30 [kV] | −40 [kV] |
| Example 7 | 10 | 0 | 0 | discharge |
| | 1 | 3 | discharge | discharge |
| Compara. Example 6 | 0 | 7 | discharge | discharge |
| | −1 | 7 | discharge | discharge |
| | −25 | 7 | discharge | discharge |

As shown in Table 5, when a voltage of −40 kV was applied, a discharge occurred in every test. When the applied voltage was −20 kV, the leakage current in Example 7 in which the extension length was 1 mm (or longer), was significantly lower than that of Comparative Example 6, in which there was provided no extension of the covering. When, in particular, the extension length was 10 mm (or longer), the leakage current was zero, and occurrence of a discharge was prevented even at an applied voltage of −30 kV. It is thus seen that a discharge between the electrode 14 and the nozzle 13 is prevented, and power consumption in the nanofiber manufacturing due to leakage current is reduced, by not only covering the outer side of the nozzle with a covering having a dielectric exposed thereon but also providing an extension of the covering beyond the tip of the nozzle.

Example 8

The apparatus 10 shown in FIG. 1 in which not only the electrode 14 was covered with the covering 17 but also the entire area of the outer side of the nozzle 13 was covered with a covering 107 was tested to measure a leakage current. A 2 mm thick polyvinyl chloride sheet was used as the covering 107. The covering 107 covered not only the entire area of the outer surface of the nozzle 13 but also extended from the tip of the nozzle 13 by an increment of 1 mm. The structure of the apparatus was otherwise the same as in Example 1. Measurement of leakage current and observation of a discharge were carried out in the same manner as in Examples 1 to 3. The covering 17 on the electrode 14 was a 10 mm thick MONOMER CAST nylon sheet. The results are shown in Table 6.

Comparative Example 7

The apparatus of Example 8 in which the covering 107 was applied to the entire area or a part of the outer side of the nozzle 13 with no extension beyond the tip of the nozzle was tested to measure a leakage current.

A 2 mm thick polyvinyl chloride sheet as the covering 107 was applied to cover a part of the outer side of the nozzle 13 having the length of 50 mm that extended 50 mm and 25 mm from the root (rear end) of the nozzle. The parts covered with the covering will be described as 0 mm and −25 mm, respectively, in terms of the length of an extension from the tip of the nozzle for the sake of convenience. For example, a length of the extension of −25 mm means that the part of the nozzle extending 25 mm from the tip of the nozzle 13 was exposed with no covering thereon. Measurement of leakage current and observation of a discharge were carried out in the same manner as in Example 8. The results are shown in Table 6.

TABLE 6

| | Length of Extension (mm) | Leakage Current (µA) | | |
| --- | --- | --- | --- | --- |
| | | −20 kV | −30 kV | −40 kV |
| Example 8 | 10 | 0 | 0 | 1 |
| | 9 | 0 | 1 | 6 |
| | 8 | 0 | 2 | 6 |
| | 7 | 0 | 2 | 6 |
| | 6 | 0 | 2 | 6 |
| | 5 | 0 | 2 | 7 |
| | 4 | 0 | 2 | 7 |
| | 3 | 0 | 2 | 8 |
| | 2 | 0 | 3 | 8 |
| | 1 | 0 | 3 | 10 |
| Compara. Example 7 | 0 | 1 | 6 | 14 |
| | −25 | 1 | 6 | 14 |

As shown in Table 6, the leakage current in Example 8, where the length of the extension was 1 mm or longer, was lower with significance than that in Comparative Example 7 (having no extension) at every voltage applied (−20 kV to −40 kV). With an extension of 10 mm (and longer), the reduction in leakage current was conspicuous. Since both the outer side of the nozzle 13 and the electrode 14 were covered with the covering having a dielectric exposed thereon, the leakage current was further held down so that no discharge took place. According to the invention, neutralization of the spinning solution by electrons flying from the electrode, namely, a decrease in charge quantity is reduced, a discharge between the electrode 14 and the nozzle 13 is prevented from occurring, and power consumption due to the leakage current in the nanofiber manufacturing is held down.

Figure 20B:
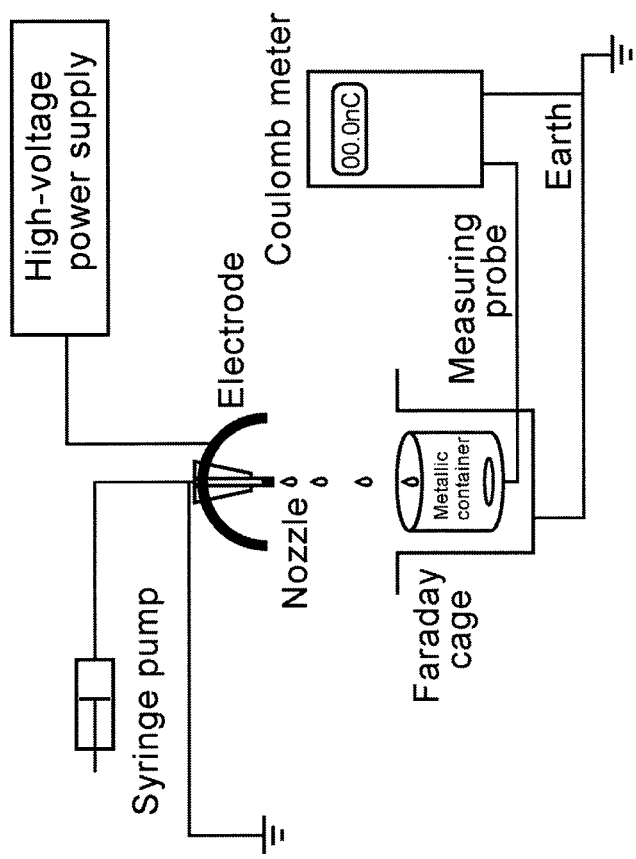
FIG. 20(a) schematically illustrates a system for measuring the amount of charge of a spinning solution in the apparatus of FIG. 1, and FIG. 20(b) schematically illustrates a system for measuring the amount of charge of a spinning solution in the apparatus of FIGS. 3, 4, and 13.
Figure 20A:
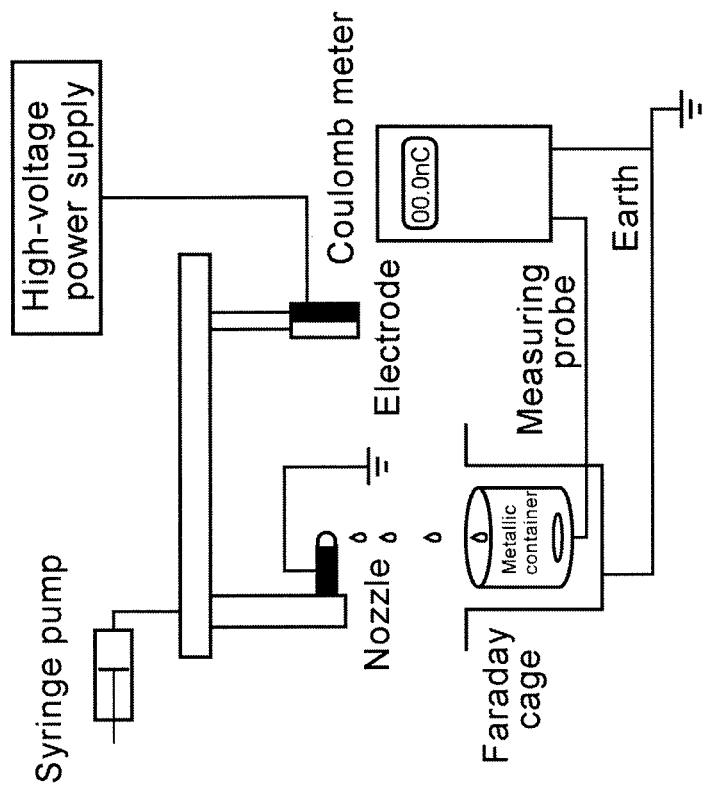

In the foregoing Examples and Comparative Examples, the amount of charge of water was measured using the measurement systems shown in FIG. 20 in accordance with the following procedures. The system of FIG. 20(*a*) was used to test the apparatus 10 in Examples 1 to 3 and 6 and Comparative Examples 1 to 4, and the system of FIG. 20(*b*) was used to test the apparatus 18 in Example 4.

The apparatus 10 was 90° turned and set so that the nozzle 13 extended horizontally as shown in FIG. 20(*a*). The apparatus 18 was set with the nozzle 20 extended vertically downward as shown in FIG. 20(*b*). A direct voltage of −5 kV was applied between the nozzle and the electrode using a high-voltage power supply (HAR-60R1-LF, available from Matsusada Precision Inc.), and water was jetted from the nozzle at a rate of 1 g/min. In this state, the charged water dripped down by gravity and was received in a metallic container placed in a Faraday cage (NQ-1400, available from Kasuga Electric Works, Ltd.). The amount of charge of the water collected for a given time (a few minutes) was measured with a coulomb meter (NK-1001, 1002, available from Kasuga Electric Works, Ltd.). At the same time, the mass of the collected water was measured using an analytical balance. The amount of charge of water per unit mass (nC/g) was calculated from the measured values. All the tests were conducted at an applied voltage of −5 kV because, when a voltage lower than −5 kV (when the absolute value of the voltage applied was greater than 5 kV) was applied between the nozzle and the electrode, the charged water was sometimes atomized and could not be collected in the metallic container.

Example 9

A nanofiber was produced using the apparatus 510 shown in FIG. 8 and a 15% aqueous solution of pullulan as a spinning solution. The spinning solution was jetted from the nozzle 13 at a rate of 1 g/min. The nozzle 13 had an inner diameter of 2 mm and a length of 50 mm. The flat surface (the side facing the nozzle 13) of the electrode 14 had an area of 81 cm$^2$ (9 cm by 9 cm) and was entirely covered with a covering 17 made of Bakelite and having a thickness of 10 mm. Air was jetted from the air jetting means 15A at a flow rate of 100 l/min. The holes 151A formed on the front of the air jetting means 15A were arranged in a staggered pattern in which three rows of holes 151A extending in the horizontal direction H were arrayed in the vertical direction V. The pitch of arrangement of the holes 151A was 10 mm in both the horizontal direction H and the vertical direction V. Each hole 151A was a columnar space with a diameter of 1 mm. The distance (shortest distance) between the tip of the nozzle 13 and the electrode 14 was 40 mm. A voltage of −30 kV was applied between the nozzle 13 and the electrode 14. A scanning electron micrograph (SEM image) of the resulting nanofiber is shown in FIG. 21(a).

Comparative Example 8

A nanofiber was produced using the apparatus 10 shown in FIG. 1 in which the electrode 14 was replaced by a spherical electrode (an electrode having a convex spherical surface) that was not covered with a covering 17. The spherical electrode had a diameter of 25 mm and was set with its center located vertically above the tip of the nozzle 13. The distance (shortest distance) between the tip of the nozzle 13 and the spherical electrode was 75 mm. The apparatus otherwise had the same structure as that used in Example 9. Electrospinning was performed under the same conditions as in Example 9. An SEM image of the resulting nanofiber is shown in FIG. 21(b).

As shown in FIG. 21, the nanofiber obtained in Example 9 (FIG. 21(a)) was as fine as having an average diameter of about 200 nm, while the nanofiber obtained in Comparative Example 8 (FIG. 21(b)) was as thick as having an average diameter of about 500 nm. In addition, the nanofiber of Example 9 was good quality, having less defects (solidified droplets of the spinning solution) than that of Comparative Example 8. Since Example 9 and Comparative Example 8 are equal in rate of jetting the spinning solution from the nozzle 13, it turned out that the apparatus of Example 9 was able to produce about 6.25 times the length of nanofiber produced by the apparatus of Comparative Example 8 per unit time, proving that productivity increases by the use of the apparatus of the invention. To put it another way, considering that a nanofiber generally increases in thickness with an increase of the rate of jetting a spinning solution from the nozzle, the apparatus of the invention turned out to be able to produce nanofibers of 500 nm in diameter at a spinning solution jetting rate higher than 1 g/min (even when more than one gram of a spinning solution is fed to the nozzle 13 per unit time). This also proves the improvement in productivity achieved by the apparatus of the invention.

Example 10

A nanofiber was produced using the apparatus 18 shown in FIGS. 3 and 4 and a 25% aqueous solution of pullulan as a spinning solution. The spinning solution was jetted from the nozzle 20 at a rate of 1 g/min. Air was jetted from the air jetting means 23 at a rate of 200 l/min. A voltage of −30 kV was applied between the nozzle 20 and the electrode 19. Electrospinning was carried out using the apparatus having otherwise the same structure as in Example 4. An SEM image of the resulting nanofiber is shown in FIG. 22.

In Example 10, despite the use of a high viscosity (7372.8 mPa·s) pullulan aqueous solution having a concentration increased to 25%, the resulting nanofiber was good quality with an average diameter of about 856 nm and smaller-sized defects (solidified droplets of the spinning solution). This is considered to be because the apparatus of the invention is capable of giving an increased amount of charge to the spinning solution. The thus charged spinning solution is attracted toward the electrode 19 (negative pole) with a greater force, which allows for spinning of a high viscosity solution (high concentration spinning solution). To use a high concentration spinning solution provides an increased solid content of the spinning solution, which also contributes to the improvement of productivity of the apparatus of the invention.

Examples 11 to 13

The ability of the electrospinning device 701 shown in FIGS. 13 and 14 to charge a spinning solution was evaluated as follows. Water was used as a model spinning solution of which the amount of charge was measured. The method for the measurement will be described. Because water does not form fibers, charged water is easy to collect and be subjected to the charge quantity measurement by the method described later. The rate of jetting water from the nozzle 720 was 1 g/min. The nozzle 720 was 2000 µm in inner diameter and 50 mm in length. The electrode 710 had a cylindrical shape with a length of 50 mm, an inner diameter of 45 mm, and a thickness of 3 mm (made of S45C, carbon steel for machine structures). The nozzle 720 was set with its tip 720a positioned in the plane containing the circle defined by the open end of the cylindrical concave curved surface 711. The direction in which the nozzle extended was coincident with the axis of the cylinder. In Example 11, the entire area of the concave curved surface 711 of the electrode 710 was covered with a 10 mm thick dielectric 730 (MONOMER CAST nylon, MC901 cut plate (blue), available from Hakudo Corp.) as shown in FIGS. 13 and 14. In Example 12, the edge face of the open end (of the side from which the spinning solution was jetted out) of the electrode 710 was also covered with the dielectric. In Example 13, the entire area of the outer peripheral surface of the electrode 710 was also covered with the dielectric, in addition to covering the edge face of the open end of the electrode 710 similarly to Example 12. In each of Examples 11 to 13, a direct voltage of −5 kV was applied to the electrode 710. The nozzle 720 was grounded.

Comparative Examples 9 and 10

In Comparative Example 9, the charge quantity of water was measured using the electrospinning device 701 shown in FIG. 13 in which the dielectric 730 covering the electrode 710 was disposed 15 mm away from the inner surface of the electrode 710. The dielectric 730 was a cylinder having an inner diameter of 30 mm. In Comparative Example 10, the charge quantity of water was measured using the electrospinning device 701 shown in FIG. 13 in which the electrode 710 was not covered with a dielectric 730. The other conditions for the measurement were the same as in Examples 11 to 13. The results obtained are shown in Table 7.

TABLE 7

|  | Dielectric Covering on Electrode | Charge Quantity (nC/g) −5 [kV] |
|---|---|---|
| Example 11 | inner surface | 60.5 |
| Example 12 | inner surface + edge face | 114.4 |
| Example 13 | inner surface + edge face + outer surface | 114.2 |
| Comparative Example 9 | not provided | 31.8 |
| Comparative Example 10 | not provided | 37.9 |

As is apparent from the comparison between Examples 11 to 13 and Comparative Examples 9 and 10 shown in Table 7, the charge quantities of water used as a model spinning solution in Examples were significantly higher than those in Comparative Examples.

Furthermore, a direct voltage (−20 kV, −30 kV, and −40 kV) was applied between the electrode 710 and the nozzle 720, and the current flowing from the electrode 710 and the nozzle 720 (leakage current) was measured while seeing if a discharge occurred. The leakage current was measured using an ammeter built in a high-voltage power supply (HAR-60R1-LF, available from Matsusada Precision Inc.) used as a voltage generating means. The spinning solution was not jetted so as to eliminate the influence of the spinning solution on the leakage current. The results obtained are shown in Table 8.

TABLE 8

|  |  | Leakage Current (μA) | | |
|---|---|---|---|---|
|  | Dielectric Covering | −20 [kV] | −30 [kV] | −40 [kV] |
| Example 11 | inner surface | 6 | discharge | discharge |
| Example 12 | inner surface + edge face | 0 | 3 | 18 |
| Example 13 | inner surface + edge face + outer surface | 0 | 2 | 12 |
| Comparative Example 9 | not provided | 11 | discharge | discharge |
| Comparative Example 10 | not provided | 19 | discharge | discharge |

As is apparent from the comparison between Examples 11 to 13 and Comparative Examples 9 and 10 shown in Table 8, it is seen that the leakage current was low even with a high voltage applied in Examples, indicating that the number of electrons flying from the electrode 710 to the nozzle 720 was small. In Comparative Examples 9 and 10, on the other hand, in which the electrode had no dielectric covering, the leakage current at a voltage of −20 kV was higher than that in Example 11, and a discharge took place at −30 kV and −40 kV.

In the foregoing Examples and Comparative Examples, the amount of charge of water was measured using the measurement system shown in FIG. 20(*b*) in accordance with the following procedure. The system of FIG. 20(*b*) was designed to test the apparatus 701 used in Examples 11 to 13 and Comparative Examples 9 and 10.

The apparatus 701 was set with the nozzle 720 extended vertically downward as shown in FIG. 20(*b*). A direct voltage of −5 kV was applied between the nozzle and the electrode using a high-voltage power supply (HAR-60R1-LF, available from Matsusada Precision Inc.), and water was jetted from the nozzle at a rate of 1 g/min. In this state, the charged water dripped down by gravity and was received in a metallic container placed in a Faraday cage (NQ-1400, from Kasuga Electric Works, Ltd.). The amount of charge of the water collected for a given time (a few minutes) was measured with a coulomb meter (NK-1001, 1002, available from Kasuga Electric Works, Ltd.). At the same time, the mass of the collected water was measured using an analytical balance. The amount of charge of water per unit mass (nC/g) was calculated from the measured values. All the tests were conducted at an applied voltage of −5 kV because, when a voltage lower than −5 kV (when the absolute value of the voltage applied was greater than 5 kV) was applied between the nozzle and the electrode, the charged water was sometimes atomized and could not be collected in the metallic container.

Examples 14 to 16

The amount of charge of water was measured using the electro spinning device 701 shown in FIGS. 13 and 14 in which the tip 720*a* of the nozzle 720 was located inward of the plane defined by the open end of the electrode 710 with respect to the axial direction of the electrode 710. Additionally, the same test was conducted except for using a spinning solution in place of water to see the degree of contamination of the electrode 710 and the dielectric 730 covering the electrode 710 with the spinning solution. The degree of contamination was rated according to the designations below. The conditions of the measurements were the same as in Examples 11 to 13, that is, (i) the inner surface of the electrode that faced the nozzle 720 was covered (the same as in Example 11), (ii) the inner surface of the electrode that faced the nozzle 720 and the open end edge face of the electrode were covered (the same as in Example 12), or (iii) the inner and the outer surface and the open end edge face of the electrode 710 were covered (the same as in Example 13). In Example 14, the tip 720*a* of the nozzle 720 was located in the plane defined by the open end of the electrode 710 similarly to Examples 11 to 13. In Example 15, the position of the tip 720*a* of the nozzle 720 was 16 mm inward of the plane defined by the open end of the electrode 710. In Example 16, the position of the tip 720*a* of the nozzle 720 was 32 mm inward of the plane defined by the open end of the electrode 710. The results obtained are shown in Table 9.

The degree of contamination of the electrode 710 and the dielectric 730 with the electrospun spinning solution was rated A, B, or C as follows.
A: Little contamination of the electrode 710 and the dielectric 730 with the spinning solution.
B: Slight contamination of the electrode 710 and the dielectric 730 with the spinning solution.
C: Much contamination of the electrode 710 and the dielectric 730 with the spinning solution.

Comparative Example 11

The amount of charge of water was measured using the electrospinning device 701 shown in FIGS. 13 and 14 in which the tip 720*a* of the nozzle 720 was located outward of the plane defined by the open end of the electrode 710 with respect to the axial direction of the electrode 710. Additionally, the same test was conducted except for using a spinning solution in place of water to evaluate the degree of contamination of the electrode 710 and the dielectric 730 covering the electrode 710 with the spinning solution. The conditions of the measurements were the same as in Examples 14 to 16, that is, (i) the inner surface of the electrode that faced the nozzle 720 was covered (the same as in Example 11), (ii) the inner surface of the electrode that faced the nozzle 720 and the open end edge face of the electrode were covered (the same as in Example 12), or (iii) the inner and the outer surface and the open end edge face of the electrode 710 were covered (the same as in Example 13). The position of the tip 720a of the nozzle 720 was 16 mm outward of the plane defined by the open end of the electrode 710. The results obtained are shown in Table 9.

TABLE 9

| Surface(s) | Example 14 | Example 15 | Example 16 | Comparative Example 11 |
|---|---|---|---|---|
| | Distance from Open End of Electrode to Nozzle Tip (mm) | | | |
| Covered with Dielectric | 0 | −16 | −32 | 16 |
| | Charge Quantity (nC/g) | | | |
| inner surface | 60.5 | 173.3 | 179.7 | 34.9 |
| inner surface + edge face | 114.4 | 287.4 | 306.0 | 50.1 |
| inner surface + edge face + outer surface | 114.2 | 226.3 | 296.5 | 47.8 |
| Degree of Contamination of Electrode and Dielectric | A | A | B | A |

As is apparent from the comparison between Examples 14 to 16 and Comparative Example 11 shown in Table 9, the charge quantities of water used as a model spinning solution in Examples 14 to 16 were significantly larger than that in Comparative Example 11.

As is clearly from the results shown in Table 9, little contamination of the electrode 710 and the dielectric 730 with the spinning solution was observed in Examples 14 and 15 and Comparative Example 11, while slight contamination was observed in Example 16.

It is seen from these results that the charge quantity increases when the tip 720a of the nozzle 720 is located inside the concave curved surface of the electrode 710. It is also seen that, when the tip 720a of the nozzle 720 is located close to the open end (of the side from which the spinning solution is jetted out) of the electrode 710, the spinning solution is less likely to adhere to the electrode 710 and the dielectric 730 and is thereby prevented from contaminating the electrode 710 and the dielectric 730.

Example 17

A nanofiber was produced using the electrospinning device 701 shown in FIG. 13 and a 15% aqueous solution of pullulan as a spinning solution. The surfaces covered with the dielectric were the same as those in Example 13. The spinning solution was jetted from the nozzle 720 at a rate of 1 g/min. Air was jetted from the air jetting means 723 at a rate of 150 l/min. A voltage of −20 kV was applied between the nozzle 720 and the electrode 710. The distance from the tip 720a of the nozzle 720 to the collector was 1200 mm. SEM images of the resulting nanofiber are shown in FIGS. 23(a) and 23(b).

Comparative Example 12

A nanofiber was produced using the electrospinning device 701 shown in FIG. 13 in which the electrode 710 was not covered with the dielectric 730. The apparatus otherwise had the same structure as that used in Example 17. Electrospinning was performed under the same conditions as in Example 17, except for changing the voltage applied to −10 kV, at which nanofiber production was possible. SEM images of the resulting nanofiber are shown in FIGS. 24(a) and 24(b).

Figure 23A:
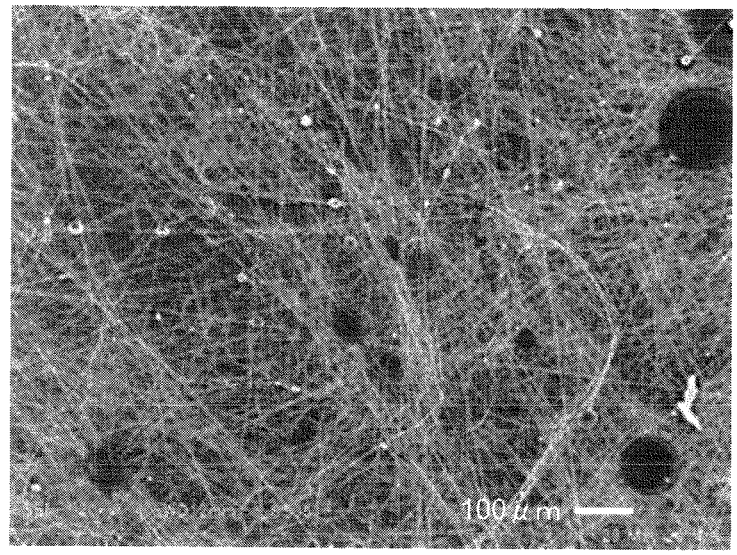
FIG. 23(a) is a scanning electron micrograph of the nanofibers obtained in Example 17.
Figure 23B:
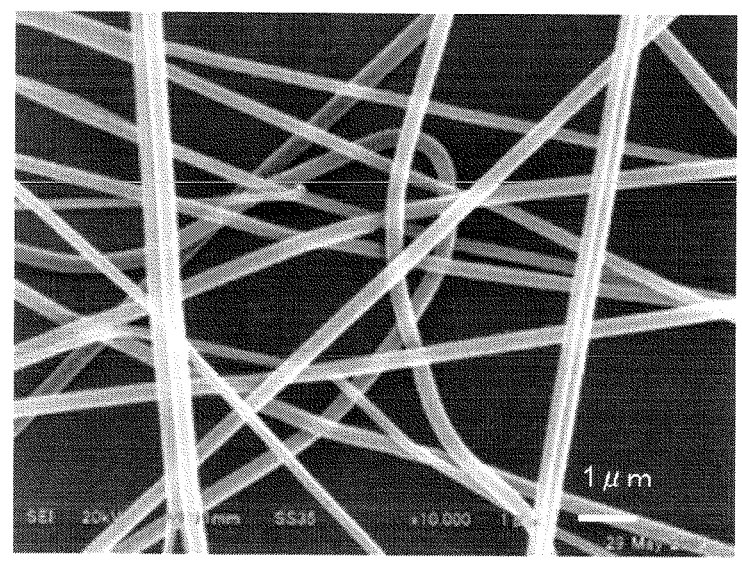
FIG. 23(b) is an enlarged image of FIG. 23(a).
Figure 24A:
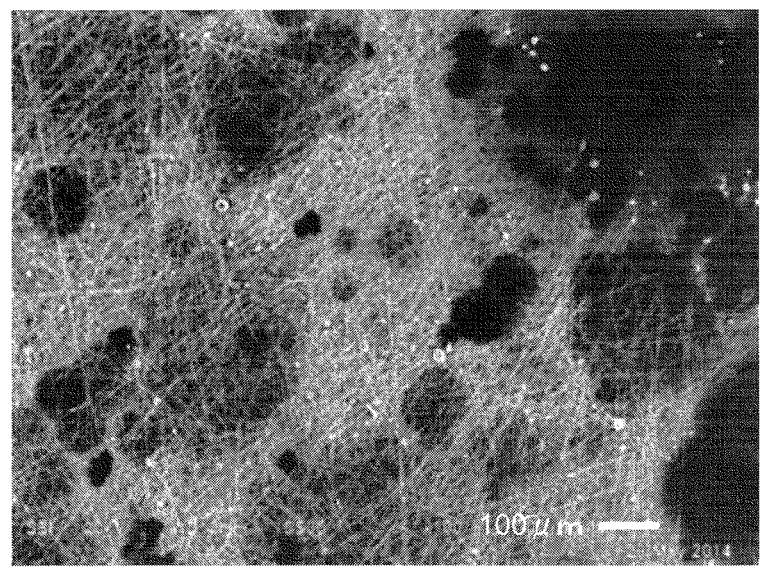
FIG. 24(a) is a scanning electron micrograph of the nanofibers obtained in Comparative Example 12.
Figure 24B:
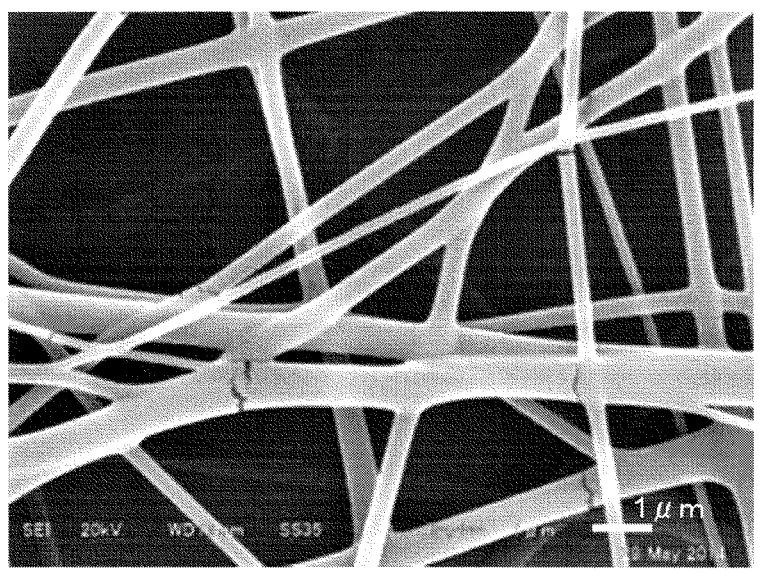
FIG. 24(b) is an enlarged image of FIG. 24(a).

The nanofiber obtained in Example 17 had an average diameter of 305 nm as shown in FIGS. 23(a) and 23(b), while the nanofiber obtained in Comparative Example 12 had an average diameter of 487 nm as shown in FIGS. 24(a) and 24(b). Moreover, the nanofiber of Example 17 was good quality, having less defects (solidified droplets of the spinning solution) than the nanofiber of Comparative Example 12. Seeing that Example 17 and Comparative Example 12 are equal in rate of jetting the spinning solution from the nozzle 720, it turned out that the apparatus of Example 17 was able to produce about 2.5 times the length of nanofiber produced by the apparatus of Comparative Example 12 per unit time, proving that productivity increases by the use of the apparatus of the invention. To put it another way, considering that a nanofiber generally increases in thickness with an increase of the rate of jetting a spinning solution from the nozzle, the apparatus of the invention turned out to be able to produce nanofibers having an average diameter of 487 nm at a spinning solution jetting rate higher than 1 g/min (even when more than one gram of a spinning solution is fed to the nozzle 720 per unit time). This also proves the improvement in productivity achieved by the apparatus of the invention.

The invention claimed is:

1. An apparatus for producing a nanofiber comprising:
 a spinning solution jetting means having a conductive nozzle for jetting a stock spinning solution for nanofiber production,
 an electrode located away from the nozzle,
 a voltage generating means generating a voltage between the nozzle and the electrode,
 an air jetting means located at such a position as to direct an air jet between the nozzle and the electrode, and
 a nanofiber collecting means,
 the voltage generating means generating a voltage in such a manner that the nozzle serves as a positive pole and the electrode as a negative pole,
 the electrode being covered, on almost the entire area of the side, facing the nozzle, of the electrode with a covering having a dielectric exposed on the surface of the covering, and
 wherein the dielectric exposed on the surface of the covering has a thickness of 8 mm or greater.

2. The apparatus for producing a nanofiber according claim 1, wherein the electrode is further covered, on part of or all of the other sides that do not face the nozzle, with a covering having a dielectric exposed on the surface of the covering.

3. The apparatus for producing a nanofiber according to claim 1, wherein the nozzle is covered, on almost the entire area of the outer side of the nozzle, with a covering having a dielectric exposed on the surface of the covering, and the covering extends beyond the tip of the nozzle.

4. The apparatus for producing a nanofiber according to claim 1, wherein the nanofiber collecting means has a collecting electrode, and the collecting electrode is covered, on almost the entire area of the collecting electrode, with a covering having a dielectric exposed on the surface of the covering.

5. The apparatus for producing a nanofiber according to claim 1, wherein the electrode has a concave spherical shape or a cylindrical shape.

6. The apparatus for producing a nanofiber according to claim 1, wherein the dielectric is at least one material selected from alumina, Bakelite, nylons, and vinyl chloride resins.

7. A method for producing a nanofiber comprising the steps of:
providing an apparatus, the apparatus comprising:
a spinning solution jetting means having a conductive nozzle for jetting a stock spinning solution for nanofiber production,
an electrode located away from the nozzle,
a voltage generating means generating a voltage between the nozzle and the electrode,
an air jetting means located at such a position as to direct an air jet between the nozzle and the electrode, and
a nanofiber collecting means,
the voltage generating means generating a voltage in such a manner that the nozzle serves as a positive pole and the electrode as a negative pole,
the electrode being covered, on almost the entire area of the side, facing the nozzle, of the electrode with a covering having a dielectric exposed on the surface of the covering, and
wherein the dielectric exposed on the surface of the covering has a thickness of 8 mm or greater,
jetting the stock spinning solution through the conductive nozzle, and
directing the air jet between the nozzle and the electrode.

8. An apparatus for producing a nanofiber comprising:
a spinning solution jetting means having a conductive nozzle for jetting a stock spinning solution for nanofiber production,
an electrode located away from the nozzle,
a voltage generating means generating a voltage between the nozzle and the electrode,
an air jetting means located at such a position as to direct an air jet between the nozzle and the electrode, and
a nanofiber collecting means,
the voltage generating means generating a voltage in such a manner that the nozzle serves as a negative pole and the electrode as a positive pole, and
the nozzle being covered, on almost the entire area of the outer side of the nozzle, with a covering having a dielectric exposed on the surface of the covering,
wherein the dielectric exposed on the surface of the covering has a thickness of 8 mm or greater.

9. The apparatus for producing a nanofiber according to claim 8, wherein the covering extends beyond the tip of the nozzle.

10. The apparatus for producing a nanofiber according to claim 8, wherein the electrode is covered, on almost the entire area of the side, facing the nozzle, of the electrode with a covering having a dielectric exposed on the surface of the covering.

11. The apparatus for producing a nanofiber according to claim 10, wherein the electrode is further covered, on part of or all of the other sides that do not face the nozzle, with a covering having a dielectric exposed on the surface of the covering.

12. An apparatus for producing a nanofiber comprising:
a spinning solution jetting means having a conductive nozzle for jetting a stock spinning solution for nanofiber production,
an electrode located away from the nozzle,
a voltage generating means generating a voltage between the nozzle and the electrode,
an air jetting means located at such a position as to direct an air jet between the nozzle and the electrode, and
a nanofiber collecting means,
the voltage generating means generating a voltage in such a manner that the nozzle serves as a negative pole and the electrode as a positive pole,
the electrode being covered, on almost the entire area of the side, facing the nozzle, of the electrode with a covering having a dielectric exposed on the surface of the covering, and
wherein the dielectric exposed on the surface of the covering has a thickness of 8 mm or greater.

13. The apparatus for producing a nanofiber according to claim 12, wherein the electrode is further covered, on part of or all of the other sides that do not face the nozzle, with a covering having a dielectric exposed on the surface of the covering.

14. The apparatus for producing a nanofiber according to claim 12, wherein the electrode has a concave spherical shape or a cylindrical shape.

15. An apparatus for producing a nanofiber comprising:
a spinning solution jetting means having a conductive nozzle for jetting a stock spinning solution for nanofiber production,
an electrode located away from the nozzle,
a voltage generating means generating a voltage between the nozzle and the electrode,
an air jetting means located at such a position as to direct an air jet between the nozzle and the electrode, and
a nanofiber collecting means,
the voltage generating means generating a voltage in such a manner that the nozzle serves as a positive pole and the electrode as a negative pole,
the nozzle being covered, on almost the entire area of the outer side of the nozzle, with a covering having a dielectric exposed on the surface of the covering, and the covering extending beyond the tip of the nozzle,
wherein the dielectric exposed on the surface of the covering has a thickness of 8 mm or greater.

* * * * *